(12) United States Patent
Pan et al.

(10) Patent No.: US 10,368,206 B2
(45) Date of Patent: Jul. 30, 2019

(54) MAP GENERATION SYSTEM AND METHOD

(71) Applicant: SHANG HAI PAN SHI TOU ZI GUAN LI YOU XIAN GONG SI, Shanghai (CN)

(72) Inventors: Zhongguang Pan, Shanghai (CN); Yanmei Teng, Shanghai (CN)

(73) Assignee: SHANG HAI PAN SHI TOU ZI GUAN LI YOU XIAN GONG SI, Shanghai (CN)

(*) Notice: Subject to any disclaimer, the term of this patent is extended or adjusted under 35 U.S.C. 154(b) by 0 days.

(21) Appl. No.: 15/685,698

(22) Filed: Aug. 24, 2017

(65) Prior Publication Data

US 2018/0063682 A1 Mar. 1, 2018
US 2018/0332437 A9 Nov. 15, 2018

(30) Foreign Application Priority Data

Aug. 24, 2016 (CN) .......................... 2016 1 0718747
Aug. 24, 2016 (CN) .......................... 2016 1 0718777
(Continued)

(51) Int. Cl.
H04W 24/00 (2009.01)
H04W 4/04 (2009.01)
(Continued)

(52) U.S. Cl.
CPC .............. *H04W 4/043* (2013.01); *G01C 3/32* (2013.01); *G06F 17/3087* (2013.01);
(Continued)

(58) Field of Classification Search
CPC .......... H04W 4/043; G01C 3/32; H04L 67/18; H04L 67/1021; G06F 17/3087
(Continued)

(56) References Cited

U.S. PATENT DOCUMENTS 6,208,935 B1 * 3/2001 Yamada ................. G01C 21/36
701/410
7,493,336 B2 2/2009 Noonan
(Continued)

FOREIGN PATENT DOCUMENTS

CN 1577362 A 2/2005
CN 101241177 8/2008
(Continued)

OTHER PUBLICATIONS

CN Office Action in application No. 2016107187770 dated Aug. 24, 2016.
(Continued)

*Primary Examiner* — Marceau Milord
(74) *Attorney, Agent, or Firm* — Maschoff Brennan

(57) ABSTRACT

Embodiments of the present application disclose a map generation system and method. By scanning or processing an article in an article shelf, the technical solution of an embodiment of the present application may take as a position of the article a position of a handheld terminal at the time of the scanning or the processing, or take as the position of the article a position of a wireless apparatus corresponding to the scanned or processed article, to generate a navigation map according to the position of each article. The embodiment of the present application realizes the automatic generation of the map and improves the accuracy of drawing the map.

15 Claims, 17 Drawing Sheets

(30) Foreign Application Priority Data

Feb. 20, 2017 (CN) .......................... 2017 1 0090396
Jun. 8, 2017 (CN) .......................... 2017 1 0429320

(51) Int. Cl.

| | | |
|---|---|---|
| G01C 3/32 | (2006.01) | |
| G06F 17/30 | (2006.01) | |
| H04L 29/08 | (2006.01) | |
| G06Q 10/08 | (2012.01) | |

(52) U.S. Cl.
CPC ....... *G06Q 10/087* (2013.01); *H04L 67/1021* (2013.01); *H04L 67/18* (2013.01)

(58) Field of Classification Search
USPC ............................................ 455/456.3, 11.1
See application file for complete search history.

(56) References Cited

U.S. PATENT DOCUMENTS

| | | | | |
|---|---|---|---|---|
| 8,600,989 | B2* | 12/2013 | Hull | G06F 17/30247 707/736 |
| 2005/0021561 | A1 | 1/2005 | Noonan | |
| 2006/0143091 | A1 | 6/2006 | Yuan et al. | |
| 2009/0300528 | A1* | 12/2009 | Stambaugh | G06F 3/04817 715/764 |
| 2011/0214050 | A1* | 9/2011 | Stambaugh | G06F 3/04817 715/234 |
| 2012/0069131 | A1* | 3/2012 | Abelow | G06Q 10/067 348/14.01 |
| 2012/0190386 | A1* | 7/2012 | Anderson | G01C 15/04 455/456.3 |
| 2012/0246003 | A1* | 9/2012 | Hart | G06Q 30/0241 705/14.57 |
| 2013/0048724 | A1 | 2/2013 | Burnside et al. | |
| 2013/0073859 | A1* | 3/2013 | Carlson | H04L 9/3247 713/176 |
| 2013/0132241 | A1 | 5/2013 | Sorensen | |
| 2013/0339151 | A1 | 12/2013 | Bottine et al. | |
| 2014/0006229 | A1 | 1/2014 | Birch et al. | |
| 2014/0180826 | A1* | 6/2014 | Boal | G06Q 30/0245 705/14.66 |
| 2014/0279294 | A1* | 9/2014 | Field-Darragh | G06Q 10/087 705/28 |
| 2016/0125466 | A1* | 5/2016 | Kulkarni | G06F 3/04883 705/14.58 |
| 2016/0171486 | A1* | 6/2016 | Wagner | G06Q 20/12 705/39 |

FOREIGN PATENT DOCUMENTS

| | | |
|---|---|---|
| CN | 103534721 A | 1/2014 |
| CN | 104182832 A | 12/2014 |
| CN | 104182881 A | 12/2014 |
| CN | 104469938 A | 3/2015 |
| CN | 105160537 A | 12/2015 |
| CN | 106323290 A | 1/2017 |
| CN | 106355427 A | 1/2017 |
| CN | 106372683 A | 2/2017 |
| CN | 106408365 A | 2/2017 |
| EP | 1501034 A1 | 1/2005 |
| JP | 2002-267485 A | 9/2002 |
| JP | 2007-204176 A | 8/2007 |
| JP | 2012-38035 A | 2/2012 |
| JP | 2013-050923 A | 3/2013 |
| JP | 2016-140368 A | 8/2016 |
| KR | 10-2009-0054501 A | 6/2009 |
| KR | 10-2010-0022892 A | 3/2010 |
| KR | 10-2012-0040404 A | 4/2012 |
| TW | 200622761 A | 7/2006 |
| TW | 201310362 A | 3/2013 |
| TW | 201407525 A | 2/2014 |
| TW | 201505942 A | 2/2015 |
| WO | 2013090603 A1 | 6/2013 |
| WO | 2015/156719 A1 | 10/2015 |

OTHER PUBLICATIONS

CN Office Action in application No. 201710429320.2 dated Apr. 27, 2018.
KR Office Action in application No. 10-2017-0100880 dated Aug. 9, 2017.
TW Office Action in application No. 10720246270 dated Mar. 20, 2018.
European Search Report in application No. EP 17187227.8 dated Feb. 16, 2018.
AU Office Action in application No. 2017218960 dated Apr. 3, 2018.
CA Office Action in application No. 2,977,094 dated Jun. 15, 2018.
TW Office Action in application No. 106128664 dated Mar. 20, 2018.
CN Office Action in application No. 201610718747.X dated May 3, 2018.
Tanba, K., et al., "An Autonomous Location Management Method for Products in Display Cabinet using Multiple Advance IC Tags", Proceedings of the 2011 IEICE General Conferencem, pp. 1-5 (2011).
JP Office Action dated Aug. 21, 2018 as received in Application No. 2017-159826.
CN Office Action dated Aug. 20, 2018 as received in Application No. 201610718747.
CN Office Action dated Jul. 24, 2018 as received in Application No. 201610718777.
CN Office Action dated Jul. 20, 2018 as received in Application No. 201710429320.

* cited by examiner

| commodity name | Commodity price | member price |
|---|---|---|
| 1 | ¥ 35.90 | ¥ 30.10 |
| 2 | | |
| 3 | | |
| Vodka (promotion) | | |

MAP GENERATION SYSTEM AND METHOD

CROSS REFERENCE TO RELATED APPLICATIONS

This application claims priority under 35 U.S.C. § 119(a) to Chinese Patent Application No. 201610718747X, filed Aug. 24, 2016, Chinese Patent Application No. 2016107187770, filed Aug. 24, 2016, Chinese Patent Application No. 2017100903967, filed Feb. 20, 2017, Chinese Patent Application No. 2017104293202, filed Jun. 8, 2017, the entire contents of which are hereby incorporated by reference.

TECHNICAL FIELD OF THE INVENTION

The present application relates to the field of computer technology, and more particularly, to a map generation system and a map generation method.

TECHNICAL BACKGROUND OF THE INVENTION

With economic development and the improvement of people's living standards, a shopping mall, a supermarket, a warehouse and other large-scale indoor places where articles may be stored gradually rise.

In the shopping mall, the supermarket, the warehouse and other indoor places, the types of the articles are various, and there are thousands of the articles with placing types which are not sure, causing users in these indoor places to often have to spend much time in finding the articles they need, therefore, a navigation map came into being, the users may first determine approximate positions of articles in the navigation map, which may help the users find the desired target articles.

However, the navigation map in the prior art is usually artificially drawn according to the positions of the articles in the indoor places, due to the large number of the articles in the indoor area, and because the types and places of the articles frequently are changed, the artificial drawing manner is very cumbersome, and not accurate enough.

SUMMARY OF THE INVENTION

In view of this, the present application provides a map generation system and method for solving technical problems where the drawing operation in the prior art is cumbersome, inefficient and not accurate.

In order to solve the above technical problems, in a first aspect, the present application provides a map generation system, including:
  wherein, a wireless apparatus is arranged in each article shelf, and each wireless apparatus corresponds to one article;
  a handheld terminal which is configured to scan each article in the article shelf and send scanning information to a server-side; and
  the server-side which is configured to take as a position of the article a position of the wireless apparatus corresponding to a scanned article according to the scanning information, and generate a navigation map according to the position of each article.

In a second aspect, the present application provides a map generation system including a server-side, a handheld terminal and a wireless apparatus;
  wherein, the wireless apparatus is arranged in each article shelf;
  the server-side is configured to scan each article in the article shelf; position a scanning position when the handheld terminal scans each time, according to a wireless signal of the wireless apparatus received at each time of scanning and according to a position of the wireless apparatus; take as the scanning position by the handheld terminal the scanning position when the handheld terminal scans each time, and upload the position of the article to the server-side.

The server-side is configured to generate a navigation map according to the position of each article.

In a third aspect, the present application provides a map generation system including a server-side, a handheld terminal and a wireless apparatus;
  wherein, the wireless apparatus is arranged in each article shelf,
  the handheld terminal is configured to scan each article in the article shelf, and upload to the server-side a wireless signal of the wireless apparatus received at each time of scanning;
  the server-side is configured to position a scanning position when the handheld terminal scans each time, according to the wireless signal of the wireless apparatus received when the handheld terminal scans each time and according to a position of the wireless apparatus; take as a position of the article scanned by the handheld terminal the scanning position when the handheld terminal scans each time, and generate a navigation map according to the position of each article.

In a fourth aspect, the present application provides a map generation system including a server-side, a handheld terminal and a monitoring terminal; the monitoring terminal is arranged in an indoor place with a known position;
  the handheld terminal is configured to transmit a wireless signal, process an article in an article shelf to obtain article processed information, and transmit to the server-side the article processed information;
  the monitoring terminal is configured to receive the wireless signal and transmit to the server-side the wireless signal;
  the server-side is configured to determine the article processed by the handheld terminal according to the article processed information; position a processed position of the handheld terminal according to the wireless signal transmitted when the handheld terminal processes the article and according to a position of the corresponding monitoring terminal; take as a position of the article the processed position of the handheld terminal; and generate a navigation map according to the position of the article.

In a fifth aspect, the present application provides a map generation system including a server-side, a handheld terminal and a monitoring terminal; the monitoring terminal is arranged in an indoor place with a known position;
  the handheld terminal is configured to transmit a wireless signal, process an article in an article shelf to obtain article processed information, and send to the server-side the article processed information;
  the monitoring terminal is configured to receive the wireless signal, calculate a distance between the monitoring terminal and the handheld terminal according to the wireless signal, and send the distance to the server-side;

the server-side is configured to determine the article processed by the handheld terminal according to the article processed information; position a processed position of the handheld terminal according to the distance corresponded when the handheld terminal processes the article and according to a position of the monitoring terminal sending the distance; take as a position of the article the processed position; and generate a navigation map according to the position of the article.

In a sixth aspect, the present application provides a map generation method used in a map generation system, the map generation system includes a server-side, a handheld terminal and a wireless apparatus; wherein, the wireless apparatus is arranged in each article shelf, each wireless apparatus corresponds to one article;

the method includes:
receiving, by the server-side, scanning information sent by the handheld terminal, wherein, the scanning information is obtained by the handheld terminal through scanning each article in the article shelf;
taking as a position of the article a position of the wireless apparatus corresponding to the scanned article according to the scanning information; and
generating a navigation map according to the position of each article.

In a seventh aspect, the present application provides a map generation method used in a map generation system, the map generation system includes a server-side, a handheld terminal and a wireless apparatus; wherein, the wireless apparatus is arranged in each article shelf;

the method includes:
scanning, by the handheld terminal, each article in the article shelf;
positioning the scanning position when the handheld terminal scans each time, according to a wireless signal of the wireless apparatus received at each time of scanning, and according to a position of the wireless apparatus;
taking as a position of the article to be scanned by the handheld terminal the scanning position when the handheld terminal scans each time;
uploading to the server-side the position of the article and generating, by the server-side, a navigation map according to the position of each article.

In an eighth aspect, the present application provides a map generation method used in a map generation system, the map generation system includes a server-side, a handheld terminal and a wireless apparatus; wherein, the wireless apparatus is arranged in each article shelf; the handheld terminal is configured to scan each article in the article shelf;

the method includes:
receiving, by the server-side, the position of the scanned article uploaded by the handheld terminal; wherein, the position of the scanned article is the scanning position when the handheld terminal scans each time, which is positioned and obtained by the handheld terminal according to a wireless signal of the wireless apparatus received at each time of scanning and according to the position of the wireless apparatus;
generating a navigation map according to the position of each article.

In a ninth aspect, the present application provides a map generation method used in a map generation system, the map generation system includes a server-side, a handheld terminal and a wireless apparatus; wherein, the wireless apparatus is arranged in each article shelf; the handheld terminal is configured to scan each article in the article shelf;

the method includes:
receiving, by the server-side, a wireless signal of the wireless apparatus sent by the handheld terminal and received at each time of scanning;
positioning the scanning position when the handheld terminal scans each time, according to the wireless signal of the wireless apparatus received when the handheld terminal scans each time, and according to a position of the wireless apparatus;
taking as a position of the article to be scanned by the handheld terminal the scanning position when the handheld terminal scans each time;
generating a navigation map according to the position of each article.

In a tenth aspect, the present application provides a map generation method, including:
receiving article processed information sent by the handheld terminal, wherein, the article processed information is obtained by processing an article in an article shelf;
receiving a wireless signal sent by the monitoring terminal, wherein, the wireless signal is transmitted by the handheld terminal;
determining the article processed by the handheld terminal according to the article processed information;
positioning a processed position of the handheld terminal, according to the wireless signal transmitted when the handheld terminal processes the article, and according to a position of the corresponding monitoring terminal and taking as a position of the article the processed position;
generating a navigation map according to the position of the article.

In an eleventh aspect, the present application provides a map generation method, including:
receiving article processed information sent by the handheld terminal, wherein, the article processed information is obtained by processing an article in an article shelf;
receiving a distance sent by the monitoring terminal; wherein, the distance is the distance between the monitoring terminal and the handheld terminal, and calculated according to the wireless signal transmitted by the handheld terminal;
determining the article processed by the handheld terminal according to the article processed information;
positioning a processed position of the handheld terminal, according to the distance corresponded when the handheld terminal processes the article, and according to the position of the monitoring terminal sending the distance, and taking as the position of the article the processed position;
generating a navigation map according to the position of the article.

Compared with the prior art, the present application may obtain the following technical effects:

By scanning or processing an article in an article shelf, the present application may take as the position of the article a position of a handheld terminal at the time of the scanning or the processing, or take as the position of the article a position of a wireless apparatus corresponding to the scanned or processed article, to be able to generate a navigation map according to the position of each article, so as to achieve the automatic generation of the map without artificial drawing, and improve the accuracy of the map.

BRIEF DESCRIPTION OF THE DRAWINGS

The drawings described herein are intended to provide a further understanding of the present application and constitute a part of this application, an illustrative embodiment of the present application and its description are intended to be illustrative of the present application and do not constitute an undue limitation to the present application. In the drawings.

EMBODIMENTS OF THE UTILITY MODEL

In the following, the embodiments of the present application will be described in detail with reference to the drawings and the embodiments, therefore, how the present application may be applied to solve technical problems and achieve technical utility will be readily understood and implemented.

The technical solution of the present application is mainly applied to a supermarket, a shopping mall, a warehouse and other indoor places where large quantities of articles are stored. In these indoor places, a large number of article shelves will be arranged, each article shelf is made up of a plurality of layers of brackets, and the articles are arranged specifically on the bracket. As the prior art requires that a man measures and artificially draws the articles at each layer of the brackets in the article shelf, the operation is very cumbersome, In order to solve the technical problems that the mapping operation in the prior art is cumbersome, inefficient and not accurate enough, the inventor has proposed the technical solution of the present application via a series of research to realize the automatic generation of a navigation map without artificial drawing and improve the accuracy of the map.

The technical solution of the present application will be described in detail below with combination of the accompanying drawings.

Figure 1:
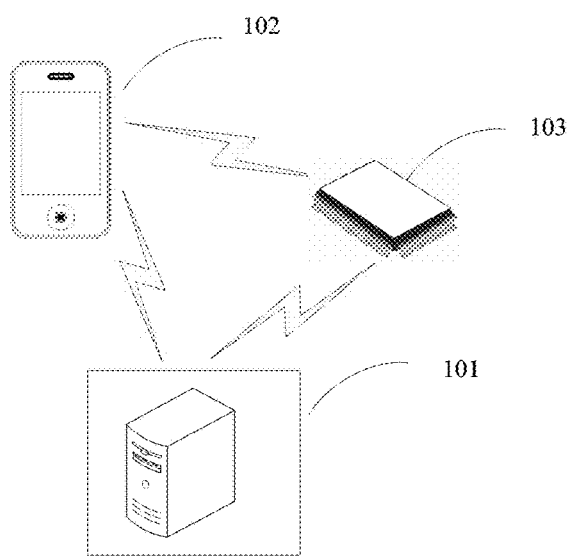
FIG. 1 is a schematic structural diagram of one embodiment of a map generation system according to an embodiment of the present application.

FIG. 1 is a schematic structural diagram of one embodiment of a map generation system according to an embodiment of the present application, the system may include a server-side 101, a handheld terminal 102, and a wireless apparatus 103;

wherein, the wireless apparatus 103 is arranged in each article shelf, each wireless apparatus 103 corresponds to one article;

it should be noted that FIG. 1 only illustratively shows one wireless apparatus. It will be understood by those skilled in the art that many articles are provided in the indoor places such as the shopping mall, the supermarket, the warehouse, and the like, and each article needs to correspond to one wireless apparatus, therefore, a plurality of the wireless apparatuses are provided.

Figure 2A:
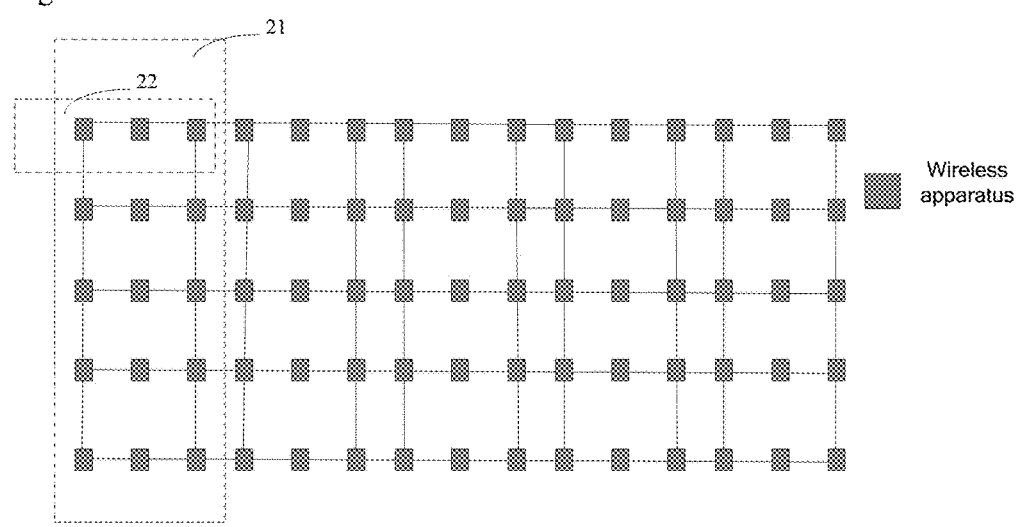
FIGS. 2*a* to 2*b* are arrangement schematic diagrams of a wireless apparatus in an embodiment of the present application, respectively.

In practical application, the article shelf usually consists of a plurality of layers of the brackets, multiple article shelves may be placed together. The articles are arranged in each layer of the brackets. FIG. 2a shows an arrangement diagram of the wireless apparatus in the article shelf, FIG. 2a includes five article shelves, each article shelf consists of five layers of the brackets, the wireless apparatus is specifically arranged in each layer of the brackets 22 of each article shelf 21.

The handheld terminal 102 is configured to scan each article in the article shelf and send scanning information to the server-side 101.

The server-side 101 is configured to take as a position of the article a position of the wireless apparatus 103 corresponding to each scanned article according to the scanning information, and generate a navigation map according to the position of each article.

Wherein, when the handheld terminal scans each article in the article shelf, it means that the handheld terminal specifically scans an article information code on the scanned article, therefore, scanning information may at least include the article information code, the article information code may be a one-dimensional code or a two-dimensional code, etc., and is an identification symbol for identifying the article, for example, the article information may refer to the one-dimensional code on an outer package bag of the article.

In the practical application, in order to facilitate a user to search the article and view related information on the article, such as a name, a price, etc., each article is usually provided with one label on the article shelf, the label is configured to display article-related information of the corresponding article. For example, in the supermarket, the shopping mall and other shopping sites, the label is a price label, every article is a commodity, the price label is configured to display related information of the article such as the name, the price and the like.

Therefore, as yet another embodiment, each wireless apparatus may correspond to one article and one label.

Wherein, the label may be a paper label or an electronic label. The electronic label refers to an electronic display device placed on the article shelf to replace a traditional paper label, may display the price, the information code, the trademark, inventory and other article-related information, and may modify the article-related information.

In the shopping area, the electronic label is an Electronic Shelf Label System (ESL).

When the label is an electronic label, the wireless apparatus corresponding to the electronic label may be integrated into the electronic label to form an integrated apparatus.

Figure 2B:
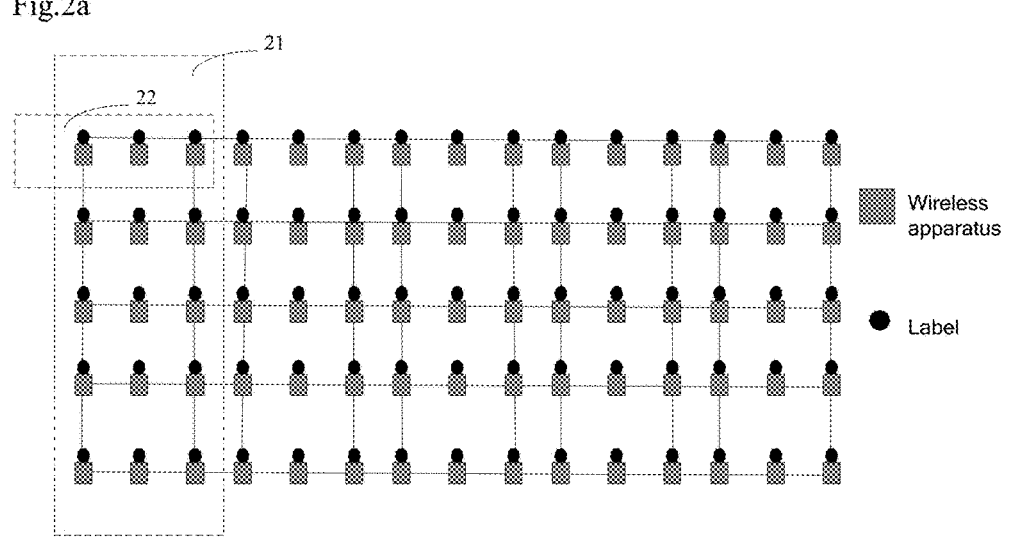

FIG. 2a shows another arrangement diagram of the wireless apparatus in the article shelf, FIG. 2b differs from FIG. 2a in that one wireless apparatus corresponds to one label from FIG. 2b. When the label is the electronic label, the electronic label and the wireless apparatus may be provided at the fixed position of the article shelf, the article is placed in the corresponding electronic label and wireless apparatus.

When the label is the electronic label, the article may also be bound to the electronic label. Each label is also provided with a label information code, such as a one-dimensional code or a two-dimensional code, for identifying the label.

Under the situation that the article is not bound to the label, the handheld terminal also scans the label corresponding to the article while scanning each article in the article shelf, so that the scanning information corresponding to each article may include the article information code and the label information code, the server-side may also search the article-related information of the article such as the name and/or the price according to the article information code in the scanning information and send the article-related information to the label corresponding to the label information code so that the label displays the article-related information of the corresponding article, the server-side stores the corresponding relation between the article information code and the label information code, and realizes the binding of the article and the electronic label.

In the case where the article and the label are bound, that is, the corresponding relation between the article information code and the label information code is stored in the server-side, as a further embodiment, the handheld terminal may scan the label corresponding to each article in the article shelf, and send the scanning information to the server-side. Therefore, the server-side may determine the corresponding article according to the label information code in the scanning information, and then determine the wireless apparatus corresponding to the article.

As the server-side may obtain the article-related information of each article according to the scanning information, the server-side may also display at least part of the article-related information of each article in the generated navigation map, for example, at least the article name and the like.

Wherein, the wireless apparatus 103 may be an apparatus that sends a wireless signal and/or receives the wireless signal, and may be an apparatus using Wi-Fi, Bluetooth, infrared, ultra-wideband, RFID, ZigBee, or ultrasonic wave or other technology, in the practical application, the wireless apparatus may be specifically a low power consumption Bluetooth apparatus, the wireless signal is a Beacon signal.

The wireless apparatus 103 may be a master-slave apparatus, that is, the wireless apparatus both may receive and send the wireless signal, of course, and may also include a master apparatus and a slave apparatus, the master apparatus may receive the wireless signal while the slave apparatus may send the wireless signal.

The handheld terminal 102 may send the wireless signal to the wireless apparatus 103 and/or receive the wireless signal sent by the wireless apparatus 103. In the practical application, the handheld terminal may be a portable mobile apparatus such as a mobile phone.

The server-side may consist of one or more servers.

In the present embodiment, one wireless apparatus corresponds to one article, since the handheld terminal scans the article, the server-side may determine the wireless apparatus corresponding to the scanned article according to the scanning information, so as to be able to take as the position of the article the position of the wireless apparatus corresponding to the scanned article. The navigation map is generated according to the position of each article. Through the map generation system of the present embodiment, the automatic generation of the navigation map is realized, and the navigation map accuracy is improved without manual drawing.

Wherein, the server-side determines according to the scanning information that the wireless apparatus corresponding to the scanned article has a plurality ways to achieve.

As a possible implementation, in the article shelf, each wireless apparatus corresponds to one article and one label;

the handheld terminal is still configured to scan the label corresponding to the article while scanning each article in the article shelf. The scanning information includes the article information code and the label information code.

The server-side takes as the position of the article the position of the wireless apparatus corresponding to the scanned article according to the scanning information, which is specific in the following:

searching the corresponding relation between different labels and different wireless apparatuses according to the scanning information, and taking as the position of the article the position of the wireless apparatus corresponding to the label of the scanned article.

The corresponding relation between different labels and different wireless apparatus may be preset in the server-side.

When the label is the electronic label, the wireless apparatus corresponding to the electronic label may be integrated into the electronic label to be an integrated apparatus. At this time, each wireless apparatus may upload to the server-side the corresponding relation between the wireless apparatus and the electronic label, which is specifically the identification of the wireless apparatus and the label information code of the electronic label. Therefore, the server-side may store the corresponding relation between each wireless apparatus and the electronic label. Wherein, the corresponding relation between each wireless apparatus and the electronic label includes the identification of each wireless apparatus and the corresponding label information code thereof.

Therefore, by searching the corresponding relation between different labels and different wireless apparatus, the corresponding relation between the article, the label and the wireless apparatus may be established to be able to search the corresponding apparatus according to the label information code in the scanning information, the position of the wireless apparatus corresponding the apparatus identification is taken as a position of the article corresponding the article information code.

As a further possible implementation, an apparatus information code may be provided in each wireless apparatus; the apparatus information code may be the one-dimensional code, the two-dimensional code, or the three-dimensional code, and may be provided on a housing of the wireless apparatus.

The handheld terminal is still configured to scan the wireless apparatus corresponding to the article while scanning each article in the article shelf; the scanning information may further include the apparatus information code;

the server-side takes as the position of the article the position of the wireless apparatus corresponding to the scanned article according to the scanning information, which is specific in the following:

taking as the position of the scanned article the position of the wireless apparatus corresponding to the apparatus information code according to the apparatus information code in the scanning information.

The scanned article may be determined according to the article information code or the label information code in the scanning information.

As a further embodiment, the article shelf generally consists of a plurality of layers of the brackets, and a plurality of the article shelves may be placed together to form an article shelf area and an article shelf passage area.

The wireless apparatus may be arranged in each layer of the brackets of the article shelf, and the server-side may also determine a position of the article shelf and a position of the bracket in the article shelf, according to the position of the wireless apparatus.

The wireless apparatus may be arranged in each layer of the brackets in the article shelf according to a layout rule so that the server-side may position the position of the bracket and the position of the article shelf according to the layout rule and the position of the wireless apparatus.

In the present embodiment, the layout rule is to arrange a plurality of the wireless apparatuses in each layer of the brackets, each of which corresponds to one article, at this time, the server-side may determine the position of the article shelf according to the position of each wireless apparatus, for example, the server-side may determine the position of the bracket according to the number of the arranged wireless apparatuses in each layer of the brackets and according to the position of the wireless apparatus, and further may obtain the position of the article shelf according to the position of the bracket.

Therefore, the server-side may first draw the article shelf and then the article in the article shelf so as to draw the navigation map according to the position of each article and the position of the article shelf.

As a further embodiment, the handheld terminal may receive the wireless signal sent by the wireless apparatus.

As the articles are placed in the indoor places, the places are usually left a position of an aisle, which may specifically refer to a position of the article shelf passage between the article shelves.

A position of the article shelf passage may be determined according to a position of the handheld terminal obtained when the handheld terminal does not scan.

Therefore, a possible implementation is as follows:

the handheld terminal may also be configured to position as a position of an article shelf passage the position of the handheld terminal obtained when the handheld terminal does not scan and upload to the server-side the position of the article shelf passage according to the wireless signal of the wireless apparatus received when the scanning is not performed and according to the position of the wireless apparatus.

Another possible implementation is as follows:

the handheld terminal is further configured to upload to the server-side the wireless signal of the wireless apparatus received when the scanning is not performed, and position as the position of the article shelf passage the position of the handheld terminal obtained when the handheld terminal does not scan, according to the wireless signal of the wireless apparatus received when the handheld terminal does not scan and according to the position of the wireless apparatus.

The server-side may generate the navigation map according to the position of each article and the position of the article shelf passage.

Alternatively, the server-side may generate the navigation map according to the position of each article shelf, the position of each article and the position of each article shelf passage.

In the above-mentioned two possible implementations, according to the wireless signal of the wireless apparatus received when the handheld terminal does not scan and according to the position of the wireless apparatus, positioning the position of the handheld terminal obtained when the handheld terminal does not scan may be calculated according to on the strength of the wireless signal of the wireless apparatus received by the handheld terminal and according to the position of the handheld terminal.

A distance between the handheld terminal and the wireless apparatus may be calculated according to the strength of the wireless signal of the wireless apparatus received by the handheld terminal, so as to be able to calculate the position of the handheld terminal according to the distance between the handheld terminal and the wireless apparatus and the position of the wireless apparatus.

Preferably, the scanned position of the handheld terminal may be calculated using a centroid algorithm according to the distance between the handheld terminal and the wireless apparatus and according to the position of the wireless apparatus. At this time, the handheld terminal may receive the wireless signals of a plurality of the wireless apparatuses, and the wireless signals of the N wireless apparatuses (N is greater than or equal to M+1) may be selected and calculated according to the order of the signal strength from the large to the small according to the spatial dimensions M of the coordinate space of the position, specifically, N may be equal to M+1. The position of the handheld terminal may be calculated using the centroid algorithm according to the distance between the handheld terminal and N wireless apparatuses and according to the positions of N wireless apparatuses.

In the embodiment of the present application, the navigation map may be specifically a three-dimensional map, which may be generated in a three-dimensional coordinate space.

As a possible implementation, according to the signal strength of the wireless signal of the wireless apparatus received by the handheld terminal, the distance between the handheld terminal and the wireless apparatus may be calculated according to the following formula:

$$d = 10^{\frac{|R|-A}{10*n}};$$

Where R represents the signal strength; D represents the distance between the handheld terminal and the wireless apparatus; A represents the signal strength of the wireless signal sent by a transmission apparatus and received by a receiving apparatus when the distance is 1 meter; N represents an environmental attenuation factor.

As another possible implementation, according to the signal strength of the wireless signal of the wireless apparatus received by the handheld terminal, the distance between the handheld terminal and the wireless apparatus may be calculated according to the following formula:

$$d^2 = C^2(R_0 - R)$$

wherein, R represents the signal strength of the wireless signal sent by the wireless apparatus and received by the handheld terminal, d represents the distance between the handheld terminal and the wireless apparatus, C is the scaling factor; R0 may use the international standard value, and may be the strength mean of the signal received by the receiving apparatus when the transmission apparatus is infinitely close to different types of the receiving apparatus.

Where C may select the initial preset value, Of course, in order to improve the accuracy of the calculation, the handheld terminal may also select Q effective apparatuses from the wireless apparatus corresponding to the received wireless signals, wherein, Q is greater than or equal to M+1, specifically, Q may be equal to M+1. The value of the scaling factor is adjusted using the Q effective apparatuses to find the correction value of the scaling factor, the correction value is centered on a position of each effective apparatus, the correction distance between each effective apparatus and the target apparatus is a radius, Q formed circles or balls have a unique intersection. And then the distance between the handheld terminal and the wireless apparatus is calculated using the obtained correction value of a conversion factor.

Of course, the present application is not limited to the two possible implementations described above, and the distance between the handheld terminal and the wireless apparatus may be calculated using the signal strength between the handheld terminal and the wireless apparatus, according to the practical application.

The position of the handheld terminal may be positioned when the handheld terminal does not scan, according to the distance between the handheld terminal and the wireless apparatus and the position of the wireless apparatus.

In the practical application, some indoor passages, such as stairs, an elevator, a fire passage, etc. are usually provided in indoor places, these indoor passages may be obtained from architectural drawings, the sizes and boundaries of the places may also be determined in the architectural drawings, to be able to determine the boundaries of the navigation map;

Therefore, the server-side may be specifically as follows: determining the boundaries of the navigation map, and generating the navigation map within the boundaries of the navigation map according to the position of each article shelf, the position of each article, the position of each article shelf passage and the position of an indoor passage.

Figure 3:
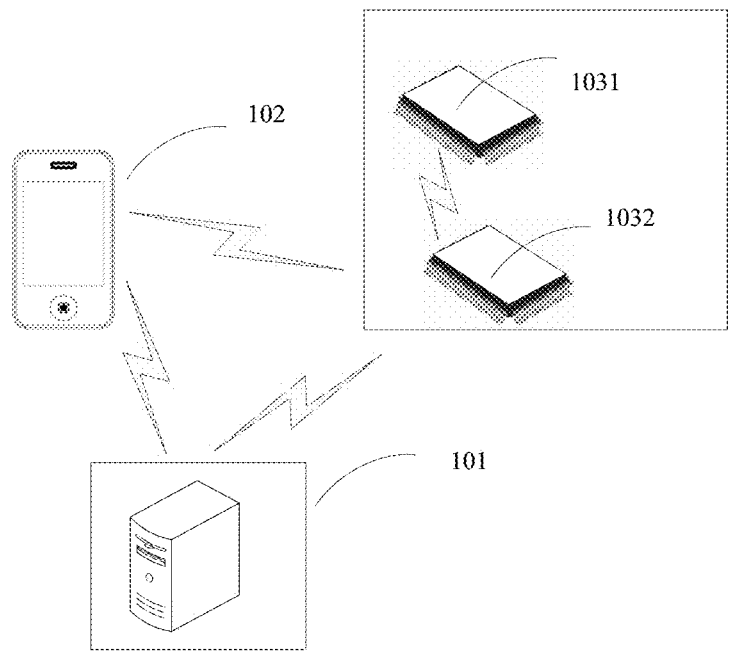
FIG. 3 is a schematic structural diagram of another embodiment of a map generation system according to an embodiment of the present application.

Wherein, the position of the wireless apparatus may be arranged in advance, and may also be obtained through the calculation, which will be described in detail in the following:

As shown in FIG. 3, as a further embodiment, FIG. 3 differs from the embodiment shown FIG. 1 in that in the map generation system, the wireless apparatus may include a first class apparatus 1031 and a second class apparatus 1032, a position of the first class apparatus 1031 is known; wherein, it should be noted that in the present embodiment, the number of the first class apparatuses 1031 and the number of the second class apparatuses 1032 are not limited to those shown in FIG. 3.

The server-side 101 is also configured to take as the known apparatuses the first class apparatus 1031 and/or the second class apparatus 1032 of which the position has been determined, position a position of the second class apparatus of any which the position is not determined, according to a position of the known apparatus and according to the wireless signal received by the known apparatus and sent by the second class apparatus of any which the position is not determined, determine the position of each article shelves according to the position(s) of the first class apparatus 1031 and/or the second class apparatus 1032, and generate the navigation map according to the position of each article shelf, the position of each article and the position of each article shelf passage.

Wherein, the first class apparatus may upload to the server-side the received wireless signal; the second class apparatus may upload to the server-side the received wireless signal.

Wherein, the first class apparatus may be arranged in the same indoor position, the second class apparatus may be arranged in the article shelf, the article shelf may be movable so as to position the position of the second class apparatus according to the first class apparatus of which the position is constant. Therefore, the server-side may determine the position of each article shelf according to the position of the second class apparatus.

The server-side may push to the handheld terminal the position of the first class apparatus and the position of the second class apparatus after the positions of the first class apparatus and the second class apparatus are both determined, and of course send to the handheld terminal the position of the requested wireless apparatus when receiving the obtained request of the first position of the handheld terminal.

Therefore, the handheld terminal positions as the position of the article shelf passage the position of the handheld terminal obtained when the handheld terminal does not scan, according to the wireless signal of the wireless apparatus received when the scanning is not performed and according to the position of the wireless apparatus, and uploads to the server-side the position of the article shelf passage, which may be specific as follows:

the server-side positions as the position of the article shelf passage the position of the handheld terminal obtained when the handheld terminal does not scan, according to the wireless signal(s) of the first class apparatus and/or the second class apparatus received when the scanning is not performed, and according to the position(s) of the first class apparatus and/or the second class apparatus obtained from the server-side, and uploads to the server-side the position of the article shelf passage.

Wherein, when a plurality of the first class apparatuses is provided, a plurality of the first class apparatuses is arranged in the indoor preset area and is not positioned on the same plane. For example, the first class apparatus may be provided in any of four indoor corner areas. In the case where the coordinate space of the position is in M dimensions, it is necessary to ensure that the number of the first class apparatuses is greater than or equal to M+1, specifically, M+1 first class apparatuses are provided to ensure that at least one second class apparatus may receive the signal sent by M+1 first class apparatuses at the same time, so as to more accurately achieve the positioning of the second class apparatus.

For example, when the position coordinates are three-dimensional coordinates, four first class apparatus may be provided in the same indoor preset position, and may not be all in the same plane and the same straight line to facilitate the determination of the coordinates in the X axis, the Y axis and the Z axis.

When the position coordinates are two-dimensional coordinates, three first class apparatuses may be provided.

When the position coordinates are one-dimensional coordinates, two first class apparatuses may be provided.

The second class apparatus is specifically arranged in each layer of the brackets of each article shelf, that is, the wireless apparatus arranged in the article shelf of FIG. 2 is specifically the second class apparatus.

When the label is the electronic label, the control module, such as the Micro Control Unit (MCU), may also be provided in the second class apparatus to control the corresponding electronic label thereof, the control module may manage the corresponding electronic label according to the control instructions by the server-side, and for example, modify the article-related information in the electronic label.

Figure 4:
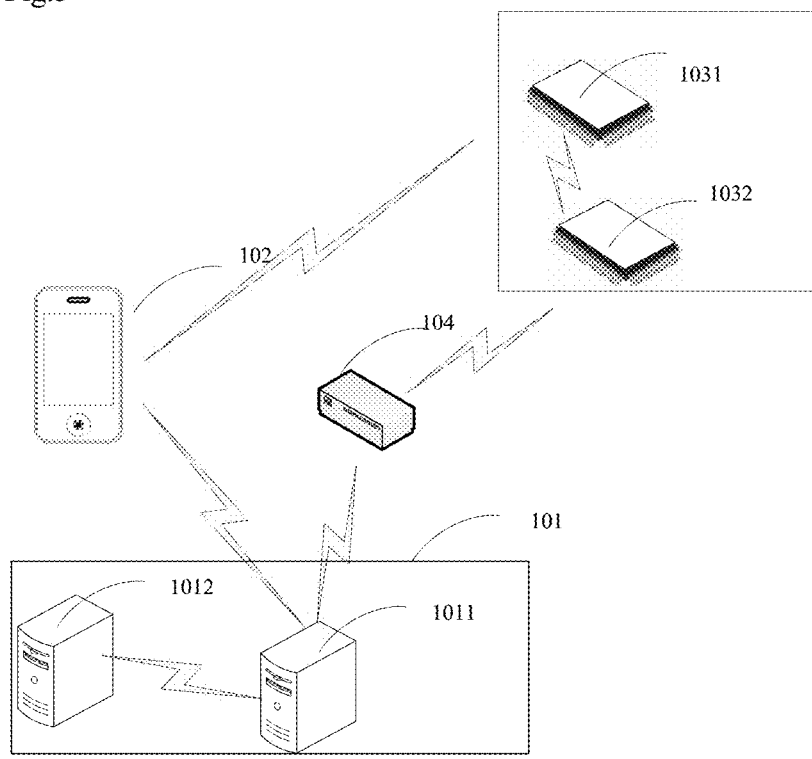
FIG. 4 is a schematic structural diagram of another embodiment of a map generation system according to an embodiment of the present application.

Wherein, in order to facilitate the service side to obtain the wireless signal of the wireless apparatus, as a further embodiment, an embodiment shown in FIG. 4 differs from that shown in FIG. 3 in that the device may also include a first control apparatus 104. Wherein, it should be noted that in the present embodiment, the number of the first control apparatuses 104 is not limited to that shown in FIG. 4.

The first class apparatus 1031 and the second class apparatus 1032 are configured to upload the received wireless signal to the first control apparatus;

the first control apparatus 104 is configured to upload to the server-side the wireless signals received by the first class apparatus 1031 and the second class apparatus 1032;

the server-side specifically takes as the known apparatus the first class apparatus and/or the second class apparatus of which the position has been determined, determines the wireless signal received by the known apparatus (the first class apparatus 1031 and/or the second class apparatus 1032) and sent by the second class apparatus 1032 of any which the position is not determined, from the wireless signal received by the first class apparatus 1031 and the second class apparatus 1032, and positions the position of the second class apparatus of any which the position is not determined, according to the position of the known apparatus and according to the wireless signal received by the known apparatus and sent by the second class apparatus of any which the position is not determined.

Wherein, the first control apparatus 104 may be arranged in an indoor ceiling according to a preset arrangement.

In the practical application, the first control apparatus may be a Wireless Access Point (AP).

Figure 5:
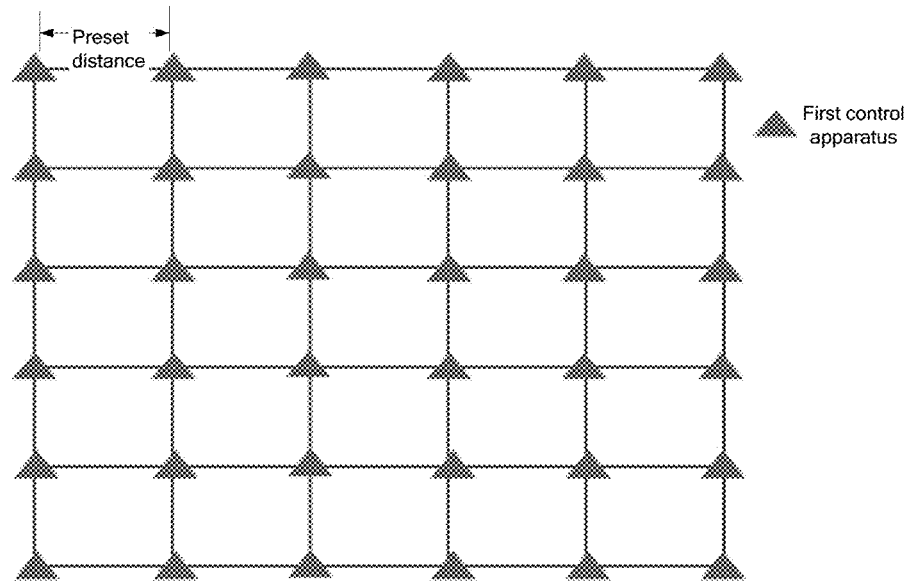
FIG. 5 is an arrangement diagram of a first control apparatus in an embodiment of the present application.

The first control apparatus is arranged in the indoor ceiling according to the preset arrangement; the preset arrangement may be determined according to indoor boundaries, FIG. 5 shows an arrangement diagram of the first control apparatus on the indoor ceiling, triggering from one corner of the indoor ceiling, horizontally and vertically at every preset distance, for example 8 meter, one control apparatus is arranged to form a grid like that shown in FIG. 5, the position coordinates of each master apparatus are manually arranged in advance. Of course, the first control apparatus may also be provided irregularly in the indoor ceiling, as long as the position coordinates are known.

As a further embodiment, as shown in FIG. 4, the server-side 101 may include a proximal server 1011 and a remote server 1012 for facilitating signal transmission, the proximal server 1011 may be provided in a store and positioned in the same local area network together with the first control apparatus, the wireless apparatus, and the like the remote server may be provided at a network side, and connected with the proximal server through a network side; The handheld terminal 102 may be provided in the local area network and connected with the proximal server 1011.

Therefore, the first control apparatus 104 specifically uploads to the remote server 1012 the wireless signals received by the first class apparatus 1031 or the second class apparatus 1032 through the proximal server 1011, respectively;

the handheld terminal 102 specifically uploads to the remote server 1012 the scanning information through the proximal server 1011, The remote server 1012 is configured to take as the known apparatus the first class apparatus 1031 and/or the second class apparatus 1032 of which the position has been determined, determine the wireless signal received by the known apparatus and sent by the second class apparatus of which the position is not determined, from the wireless signals received by the first class apparatus 1031 and the second class apparatus 1032 respectively, position the position of the second class apparatus 1032 of any which the position is not determined, according to the position of the known apparatus and according to the wireless signal received by the known apparatus and sent by the second class apparatus 1032 of any which the position is not determined, take as the position of the article the position of the second class apparatus 1032 corresponding to each scanned article, determine the position of each article shelf according to the position of each second class apparatus, and generate the navigation map according to the position of each article shelf, the position of each article, and the position of each article shelf passage.

Wherein, for the determination of the position of the article shelf passage, as a possible implementation, the handheld terminal may send to the remote server through the proximal server the wireless signal(s) sent by the first class apparatus and/or the second class apparatus and received when the scanning is not performed, the remote server positions as the position of the article shelf passage the position of the handheld terminal obtained when the handheld terminal does not scan, according to the wireless signal of the wireless apparatus received when the handheld terminal does not scan and according to the position of the wireless apparatus.

As another possible implementation, the handheld terminal positions as the position of the article shelf passage the position of the handheld terminal obtained when the handheld terminal does not scan, according to the wireless signal of the wireless apparatus received when the scanning is not performed, and uploads to the remote server the position of the article shelf passage through the proximal server according to the position of the article shelf passage.

Of course, as a further possible implementation, after the first control apparatus uploads to the proximal server the wireless signal received and sent by the known apparatus and sent by the second class apparatus of any which the position is not determined, the proximal server positions the position of the second class apparatus of any which the position is not determined, according to the wireless signal received by the known apparatus and sent by the second class apparatus of which the position is not determined and according to the position of the known apparatus, and uploads to the remote server the position of the second class apparatus; the remote server determines the position of each article shelf according to each second class apparatus.

In addition, the handheld terminal may also be connected with the remote server, so as to be able to send the scanning information directly to the remote server.

Figure 6:
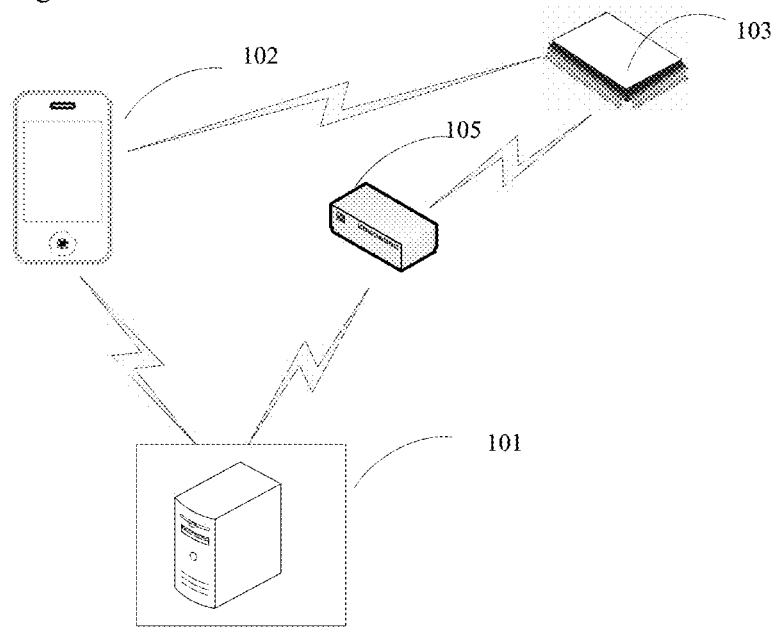
FIG. 6 is a schematic structural diagram of another embodiment of a map generation system according to an embodiment of the present application.

As a further embodiment, an embodiment shown in FIG. 6 differs from an embodiment described in FIG. 1 in that the apparatus may further include a second control apparatus 105;

The second control apparatus 105 is arranged on the indoor ceiling in a preset arrangement, the specific arrangement may refer to the arrangement of the first control apparatus in FIG. 5 which is the same as that of the first control apparatus, a position of the second control apparatus 105 is known.

The second control apparatus 105 is configured to upload to the server-side the wireless signal received by the second control apparatus 105 and sent by the wireless apparatus 103. Wherein, the wireless apparatus sends the wireless signal in a broadcast manner, and the second control apparatus receives the wireless signal in a monitoring manner.

The server-side 103 is further configured to position the position of the wireless apparatus 103 according to the wireless signal received by the second control apparatus 105 and sent by the wireless apparatus 103 and according to a position of the second control apparatus 105.

The server-side 103 is also configured to determine the position of each article shelf according to the position of each wireless apparatus;

The server-side may specifically generate the navigation map according to the position of each article shelf and the position of each article.

As a possible implementation, the handheld terminal 102 positions as the position of the article shelf passage the position of the handheld terminal obtained when the handheld terminal does not scan, according to the wireless signal of the wireless apparatus received when the scanning is not performed, and according to the position of the wireless apparatus obtained from the server-side, and uploads to the server-side the position of the article shelf passage.

The server-side 101 specifically generates the navigation map according to the position of each article shelf, the position of each article and the position of each article shelf passage.

Wherein, the server-side 101 may specifically include the proximal server and the remote server.

The handheld terminal specifically uploads to the remote server the scanning information and the position of the article shelf passage; The second control apparatus specifically uploads to the remote server through the proximal server the wireless signal received by the second control apparatus and sent by the wireless apparatus, the remote server positions the position of the wireless apparatus according to the wireless signal received by the second control apparatus and sent by the wireless apparatus and according to the position of the second control apparatus, positions the position of the article shelf according to the position of each wireless apparatus, takes as the position of the article the position of the wireless apparatus corresponding to the scanned article, and generates the navigation map according to the position of each article shelf, the position of each article, and the position of each article shelf passage.

Of course, after the second control apparatus may also upload to the proximal server the wireless signal received by the second control apparatus and sent by the wireless apparatus, the server positions the position of the wireless apparatus according to the wireless signal received by the second control apparatus and sent by the wireless apparatus and according to the position of the second control apparatus, uploads to the remote server the position of the wireless apparatus, the remote server positions the position of the article shelf according to the position of each wireless apparatus, and generates the navigation map according to the position of each article shelf, the position of each article, and the position of each article shelf passage.

As another possible implementation, the handheld terminal 102 is also configured to upload to the server-side 101 the wireless signal of the wireless apparatus received when the scanning is not performed, the server-side 101 specifically positions as the position of the article shelf passage the position of the handheld terminal obtained when the handheld terminal does not scan, according to the wireless signal of the wireless apparatus received when the handheld terminal does not scan and according to the position of the wireless apparatus, determines the position of each article shelf according to the position of each wireless apparatus, and generates the navigation map according to the position of each article shelf, the position of each article and position of each article shelf passage.

The server-side 101 may specifically include the proximal server and the remote server.

The handheld terminal specifically uploads to the remote server the scanning information and the wireless signal of the wireless apparatus received when the scanning is not performed.

The second control apparatus specifically uploads to the proximal server the wireless signal received by the second control apparatus and sent by the wireless apparatus, the proximal server positions the position of the wireless apparatus according to the wireless signal received by the second control apparatus and sent by the wireless apparatus and according to position of the second control apparatus, and uploads to the remote server the position of the wireless apparatus.

Of course, after the second control apparatus may also upload to the remote server the wireless signal received by the second control apparatus and sent by the wireless apparatus, the proximal server uploads the wireless signal to the remote server, the remote server positions the position of the wireless apparatus according to the wireless signal received by the second control apparatus and sent by the wireless apparatus and according to the position of the second control apparatus.

The remote server specifically takes as the position of the article the position of the wireless apparatus corresponding to the scanned article according to the scanning information, positions as the position of the article shelf passage the position of the handheld terminal obtained when the handheld terminal does not scan, according to the wireless signal of the wireless apparatus received when the handheld terminal does not scan and according to the position of the wireless apparatus, positions the position of the article shelf according to the position of each wireless apparatus, and generates the navigation map according to the position of each article shelf, the position of each article and the position of each article shelf passage.

Figure 7:
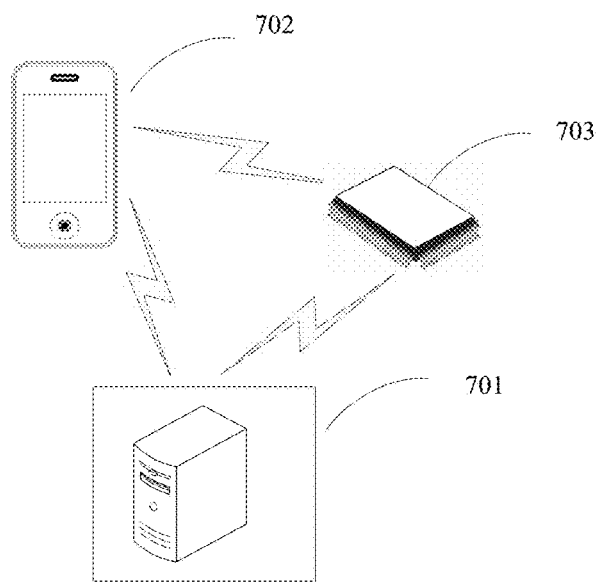
FIG. 7 is a schematic structural diagram of another embodiment of a map generation system according to an embodiment of the present application.

FIG. 7 is a schematic structural diagram of another embodiment of a map generation system according to an embodiment of the present application. The system may include the server-side 701, the handheld terminal 702, and the wireless apparatus 703.

The wireless apparatus 703 is arranged in each article shelf,

It will be appreciated by those skilled in the art that a plurality of the wireless apparatuses is usually provided.

Wherein, the server-side 701 may consist of one or more servers.

wherein, the handheld terminal 702 is configured to scan each article in the article shelf, position as the scanning position by the handheld terminal the scanning position when the handheld terminal scans each time, according to a wireless signal of the wireless apparatus received at each time of the scanning and according to the position of the wireless apparatus, and upload the position of the article to the server-side 701.

The server-side 701 is configured to generate a navigation map according to the position of each article.

The handheld terminal may upload to the server-side the scanning information obtained by scanning the article so that the server-side may distinguish the articles according to the scanning information.

When the handheld terminal scans each article in the article shelf, it means that the handheld terminal scans specifically the article information code on an article outer package on the article shelf. The article information code may be the one-dimensional code or the two-dimensional code, etc., for identifying an identification symbol of the article, for example, a one-dimensional code on an article outer bag.

The handheld terminal uploads to the server-side the position of the article, and may upload the article identification information of the article so that the service terminal may easily distinguish the positions of the different articles according to the article identification information. Wherein, the article identification information may be the article information code obtained when the handheld terminal scans the article.

As yet another embodiment, the label is arranged in the article shelf, and each label corresponds to one article.

Wherein, the label may be the paper label or the electronic label.

In the case where the article is not bound to the label, the handheld terminal also scans the electronic label corresponding to the article while scanning each article in the article shelf, so that the scanning information corresponding to each article may include the article information code and the label information code, the server-side realizes the binding of the article and the electronic label, the specific binding mode may be described in the above embodiment.

In the case where the article and the label are bound, that is, when the corresponding relation between the article information code and the label information code is stored in the server-side, the handheld terminal scans each article, and may scan the label corresponding to each article to obtain the label information code; the handheld terminal may also upload to the server-side the label information code so that the server-side may determine the corresponding article information code according to the label information code, to distinguish the positions of the different articles.

The server-side may find the article-related information of each article according to the article identification information so that the server-side may include at least part of the article-related information of each article in the generated navigation map, for example, the price, the name, and the like.

Wherein, the wireless apparatus may be an apparatus that sends and/or receives the wireless signal. The description of the wireless apparatus may be described in the embodiments described above and will not be described here again.

In the present embodiment, the scanning position when the handheld terminal is used to scan the article is taken as the position of the article scanned by the handheld terminal, the navigation map may be generated after the position of each article is determined. Through the map generation system of the present embodiment, the automatic generation of the navigation map is realized, and the accuracy of the navigation map is improved without manual drawing.

The handheld terminal positions the scanning position when the handheld terminal scans each time, according to the wireless signal of the wireless apparatus received each time of scanning, and according to the position of the wireless apparatus, which has a plurality of possible realization manners.

As a possible implementation, one wireless apparatus may be arranged in each layer of the brackets of each article shelf, thereby facilitating the handheld terminal to acquire the transmission signal of the wireless apparatus. The arrangement position of the wireless apparatuses may be the same or different in different brackets.

The handheld terminal may calculate the scanning position when the handheld terminal scans each time according to the signal strength of the wireless signal of the wireless apparatus received by the handheld terminal and according to the position of the wireless apparatus.

The distance between the handheld terminal and the wireless apparatus may be calculated according to the strength of the wireless signal of the wireless apparatus received by the handheld terminal, so as to be able to calculate the scanned position of the handheld terminal according to the distance between the handheld terminal and the wireless apparatus and according to the position of the wireless apparatus. Specifically, the scanned position of the handheld terminal may be calculated using a centroid algorithm according to the distance between the handheld terminal and the wireless apparatus and according to the position of the wireless apparatus.

The handheld terminal may receive the wireless signals of a plurality of the wireless apparatuses, and the wireless signals of the N wireless apparatuses (N is greater than or equal to M+1) may be selected and calculated according to the order of the signal strength from the large to the small according to the spatial dimensions M of the coordinate space of the position, specifically, N may be equal to M+1. The position of the handheld terminal may be calculated according to the distance between the handheld terminal and N wireless apparatuses and according to the positions of N wireless apparatuses.

Wherein, the distance between the handheld terminal and the wireless apparatus may be calculated according to the signal strength of the wireless signal of the wireless apparatus received by the handheld terminal, which may be described in the two possible implementations described in the above embodiment, and will not be repeated here again.

As a further possible implementation, when the wireless apparatus is arranged in the article shelf, each article in each article shelf may correspond to one wireless apparatus;

at this time, the handheld terminal positions the scanning position when the handheld terminal scans each time, according to the wireless signal of the wireless apparatus received each time of scanning, and according to the position of the wireless apparatus, which may be as follows:

the handheld terminal determines the wireless apparatus closest to the handheld terminal according to the wireless signal of the wireless apparatus received at each time of scanning, and positions the position closest to the wireless apparatus as the scanning position when the handheld terminal scans. That is, the position of the wireless apparatus closest to the handheld terminal is the position of the article scanned by the handheld terminal.

The wireless apparatus closest to the handheld terminal may be the wireless apparatus corresponding to the received wireless signal with the strongest signal strength.

In addition, as yet another embodiment, the wireless apparatus may be arranged in each layer of the brackets of the article shelf, and the server-side may also determine the position of the article shelf and the positions of each layer of the brackets in the article shelf, according to the position of the wireless apparatus.

The wireless apparatus may be arranged in each layer of the brackets in the article shelf according to the layout rule so that the server-side may position the position of the bracket and the position of the article shelf according to the layout rule and the position of the wireless apparatus.

The layout rule may be, for example, as follows: one wireless apparatus is arranged in each layer of the brackets, the wireless apparatus is arranged in the same position in different brackets; the wireless apparatus may be specifically arranged at one end of the bracket; the position of the wireless apparatus is a position of one bracket, the position of the article shelf may be obtained according to the position of the bracket. In the generation process of the navigation map, the size of the article shelf may also be determined according to the distance between the adjacent wireless apparatuses so as to be able to draw the article shelf.

For example, the layout rule may also be to arrange a plurality of the wireless apparatuses in each layer of the brackets, each wireless apparatus corresponds to one article, at this time, the server-side may also determine the position of the article shelf according to the position of each wireless apparatus, for example, the server-side may determine the position of the bracket according to the number of the arranged wireless apparatuses in each layer of the brackets and according to the position of the wireless apparatus, and further may obtain the position of the article shelf according to the position of the bracket.

In addition, as the articles are placed in the indoor places, the places are usually left a position of the aisle, which may specifically refer to the position of the article shelf passage between the article shelves.

Therefore, as still another embodiment, the handheld terminal may also be configured to position as the position of the article shelf passage the position of the handheld terminal obtained when the handheld terminal does not scan and upload to the server the position of the article shelf passage according to the wireless signal of the wireless apparatus received when the scanning is not performed and according to the position of the wireless apparatus.

The server-side may generate the navigation map according to the position of each article and the position of the article shelf passage.

Of course, alternatively, the server-side may generate the navigation map according to the position of each article shelf, the position of each article and the position of each article shelf passage.

Wherein, the position of the wireless apparatus may be manually arranged in advance, and may also be obtained through the calculation. As a further embodiment, the present embodiment differs from the embodiment shown in FIG. 7 in that in the map generation system, the wireless apparatus may include the first class apparatus and the second class apparatus, a position of the first class apparatus is known.

The server-side is also configured to take as the known apparatuses the first class apparatus and/or the second class apparatus of which the position is determined, position a position of the second class apparatus of any which the position is not determined, according to the position of the known apparatus and according to the wireless signal received by the known apparatus and sent by the second class apparatus of any which the position is not determined, determine the position of each article shelves according to the position(s) of the first class apparatus and/or the second class apparatus, and generate the navigation map according to the position of each article shelf, the position of each article and the position of each article shelf passage.

Wherein, the first class apparatus may upload to the server-side the received wireless signal; the second class apparatus may upload to the server-side the received wireless signal. Wherein, the first class apparatus may be arranged in the same indoor position, the second class apparatus may be arranged in the article shelf, the article shelf may be movable, so as to position the position of the second class apparatus according to the first class apparatus with the constant position. Therefore, the server-side may determine the position of each article shelf according to the position of the second class apparatus.

The server-side may push to the handheld terminal the position of the first class apparatus and the position of the second class apparatus after the positions of the first class apparatus and the second class apparatus are both determined, and of course send to the handheld terminal the position of the requested wireless apparatus when receiving the obtained request of the first position of the handheld terminal.

Alternatively, the handheld terminal may specifically position as the position of the article scanned by the handheld terminal the scanning position when the handheld terminal scans each time, according to the wireless signal(s) of the first class apparatus and/or the second class apparatus received at each time of the scanning and according to the position(s) of the first class apparatus and/or the second class apparatus obtained from the server, and upload to the server the position of the article.

Wherein, when the second class apparatus is specifically arranged in the article shelf, the handheld terminal may specifically position the scanning position when the handheld terminal scans each time according to the wireless signal of the second class apparatus received at each time of the scanning and according to the position of the second class apparatus obtained from the server-side. The server-side specifically determines the position of each article shelf according to the position of the second class apparatus.

Alternatively, the server-side may specifically position as the position of the article shelf passage the position of the handheld terminal obtained when the handheld terminal does not scan, according to the wireless signal(s) of the first class apparatus and/or the second class apparatus received when the scanning is not performed, and according to the position(s) of the first class apparatus and/or the second class apparatus obtained from the server-side, and upload to the server-side the position of the article shelf passage.

Wherein, when a plurality of the first class apparatuses is provided, a plurality of the first class apparatuses is arranged in the indoor preset area and is all not positioned on the same plane and the same straight line. For example, the first class apparatus may be provided in any of four indoor corner areas. In the case where the coordinate space of the position is in M dimensions, it is necessary to ensure that the number of the first class apparatuses is greater than or equal to M+1, specifically, M+1 first class apparatuses are provided to ensure that at least one second class apparatus may receive the signal sent by M+1 first class apparatuses at the same time, so as to more accurately achieve the positioning of the second class apparatus.

For example, when the position coordinates are three-dimensional coordinates, four first class apparatus may be provided in the same indoor preset position, and may not be all in the same plane and the same straight line to facilitate the determination of the coordinates in the X axis, the Y axis and the Z axis.

When the position coordinates are two-dimensional coordinates, three first class apparatuses may be provided.

When the position coordinates are one-dimensional coordinates, two first class apparatuses may be provided.

Figure 8A:
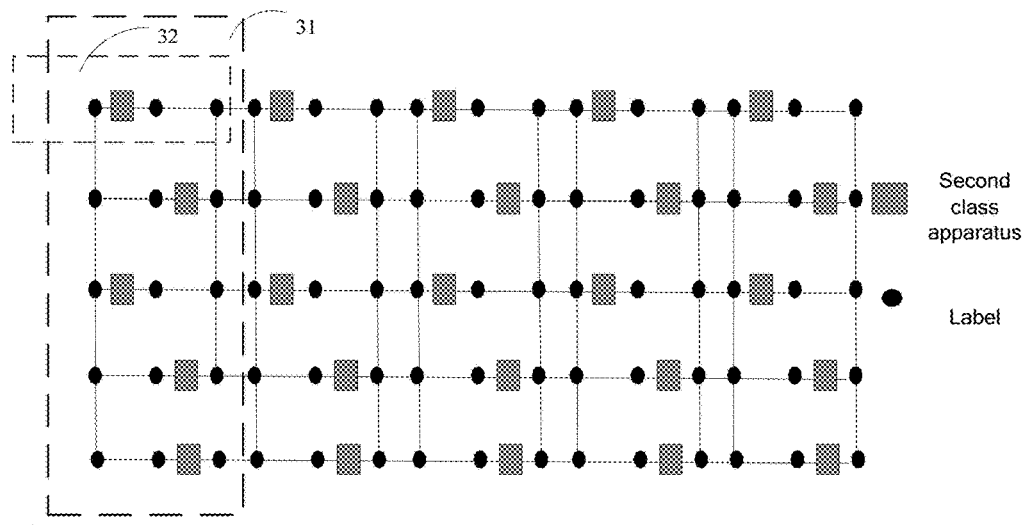
FIGS. 8*a* to 8*c* are arrangement schematic diagrams of a second class apparatus in an embodiment of the present application, respectively
Figure 8B:
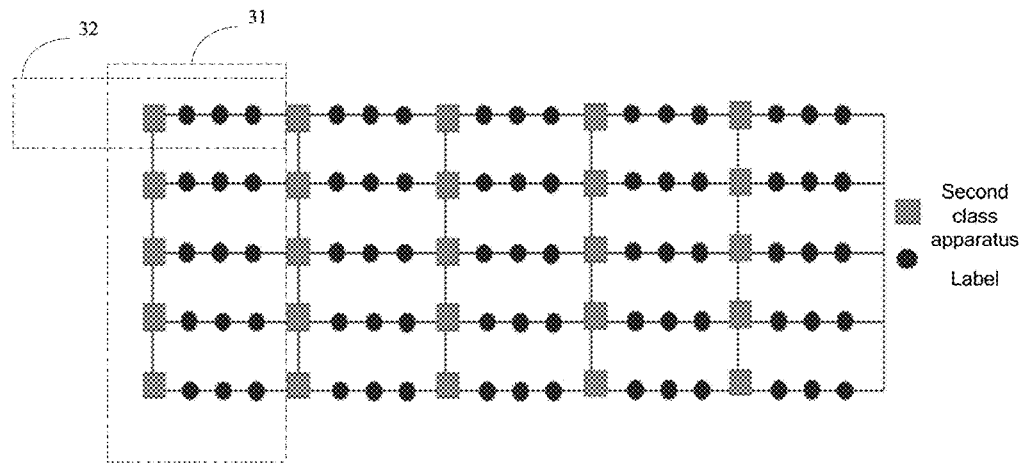
Figure 8C:
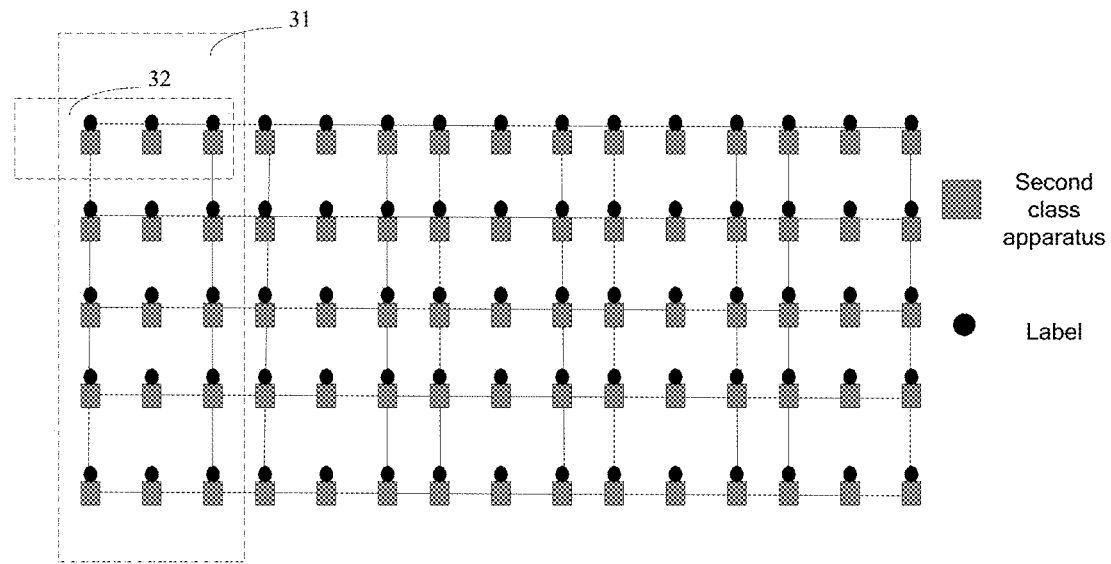

Wherein, FIG. 8a, FIG. 8b and FIG. 8c show the arrangement diagram of the second class apparatus in the article shelf, FIGS. 8a to 8c show five combined article shelves 81, the second class apparatus is arranged in each layer of the brackets 82 of the article shelf according to the different layout rules.

In FIGS. 8a and 8b, one wireless apparatus is arranged on each layer of the brackets of each article shelf, in practical application, preferably, the arrangement may b e performed as shown in the layout rule FIG. 8b, that is, one second class apparatus is arranged at the same end in each layer of the brackets of each article shelf. The position of one second class apparatus is the position of one bracket, the position of the article shelf may be obtained according to the position of the bracket.

Therefore, the server-side may accurately obtain the position of the article shelf according to the position of each second class apparatus.

In FIG. 8c, one second class apparatus is arranged at the position of each article corresponding to each layer of the bracket of each article shelf, so as to take as the position of the scanned article the position of the second class apparatus according to the wireless signal with the strongest signal strength received when the handheld terminal scans.

Of course, this application is not limited to the three arrangement manners shown in FIGS. 3a to 3c.

In the generation process of navigating the map, the length, width and/or height of the bracket may be determined according to the two second class apparatuses adjacent to each other in different directions, to further determine the size of the article shelf according to the size of the bracket, and draw the article shelf according to the position and the size of the article shelf.

Further, as shown in FIGS. 8a to 8c, the label may be arranged in the article shelf, and each label corresponds to one article. When the label is the electronic label, a control module, such as a Micro Control Unit (MCU), may be provided in the second class apparatus for managing a plurality of the electronic labels, a plurality of the electronic labels and the second class apparatus may be provided as the same apparatus. A control module may manage the corresponding electronic label according to control instructions of the server-side, and for example, modify the article-related information in the electronic label, etc. At this time, the second class apparatus and one set of the electronic labels may be provided as one apparatus, for example, one second class apparatus and the electronic labels in one layer of the brackets may be provided as one apparatus for managing a plurality of the electronic labels in one layer of the brackets, for example, in FIGS. 8a to 8c, the second class apparatus and the electronic label in the bracket 82 may be provided together as an integrated apparatus.

Wherein, in a further embodiment, in order to facilitate the server-side to obtain the wireless signal of the wireless apparatus, the device may further include the first control apparatus, the first class apparatus and the second class apparatus specifically upload to the first control apparatus the received wireless signal, respectively;

the first control apparatus is configured to upload to the server-side the wireless signals received by the first class apparatus and the second class apparatus, respectively.

the server-side specifically takes as the known apparatus the first class apparatus and/or the second class apparatus of which the position has been determined, determines the wireless signal received by the known apparatus (the first class apparatus and/or the second class apparatus) and sent by the second class apparatus of any which the position is not determined, from the wireless signal received by the first class apparatus and the second class apparatus respectively, and positions the position of the second class apparatus of any which the position is not determined, according to a position of the known apparatus and according to the wireless signal received by the known apparatus and sent by the second apparatus of any which the position is not determined.

Wherein, a plurality of the first control apparatuses may be provided and may be arranged in the indoor ceiling according to the preset arrangement.

In the practical application, the first control apparatus may be the Wireless Access Point (AP).

The first control apparatus may be arranged in the indoor ceiling according to the preset arrangement; the preset arrangement may be determined according to the indoor boundaries, as shown in FIG. 5, of course, the first control apparatus may also be provided irregularly on the indoor ceiling as long as the position coordinates are known.

As a further embodiment, in order to facilitate signal transmission, the server-side may include the proximal server and the remote server, the proximal server may be provided in the store, and together with the first control apparatus, the first class apparatus and the second class apparatus, is positioned at the same local area network, the remote server is provided in the network side, and connected with the proximal server through the Internet;

The handheld terminal may be provided in the local area network and connected with the proximal server.

Therefore, the first control apparatus specifically uploads to the remote server through the proximal server the wireless signals received by the first class apparatus and the second class apparatus, respectively;

the handheld terminal specifically uploads to the remote server through the proximal server the position of the article and the position of the article shelf passage;

the remote server is specifically configured to take as the known apparatus the first class apparatus and/or the second class apparatus of which the position has been determined, determine the wireless signal received by the known apparatus and sent by the second class apparatus of any which the position is not determined, from the wireless signal received by the first class apparatus and the second class apparatus respectively, and position the position of the second class apparatus of any which the position is not determined, according to the position of the known apparatus and according to the wireless signal received by the known apparatus and sent by the second apparatus of any which the position is not determined, and generate the navigation map according to the position of each article shelf, the position of each article and the position of each article shelf passage.

Of course, as a further possible implementation, after the first control apparatus uploads to the proximal server the wireless signal received by the first class apparatus and the second class apparatus respectively, the proximal server takes as the known apparatus the first class apparatus and/or the second class apparatus of which the position has been determined, determines the wireless signal received by the known apparatus and sent by the second class apparatus of which the position is not determined, from the wireless signal received by the first class apparatus and the second class apparatus respectively, positions the position of the second class apparatus of any which the position is not determined, according to the wireless signal received by the known apparatus and sent by the second class apparatus of any which the position is not determined and according to the position of the known apparatus, and uploads to the remote server the position of the second class apparatus, the remote server determines the position of each article shelf according to each second class apparatus.

In addition, the handheld terminal may also be connected with the remote server so as to directly upload to the remote server the position of the article and the position of the article shelf passage.

As a further embodiment, the present embodiment differs from an embodiment of FIG. 8 in that the apparatus may further include a second control apparatus;

The second control apparatus is arranged on the indoor ceiling in the preset arrangement, the specific arrangement may refer to the arrangement of the first control apparatus in FIG. 5, which is the same as that of the first control apparatus, the position of the second control apparatus is known.

The wireless apparatus is specifically provided in each layer of the brackets of the article shelf, and the arrangement manner thereof in the article shelf may be the same manner as that of the second class apparatus, as shown in FIG. 8a or 8b.

The second control apparatus is configured to upload to the server-side the wireless signal received by the second control apparatus and sent by the wireless apparatus. Wherein, the wireless apparatus sends the wireless signal in the broadcast manner, and the second control apparatus receives the wireless signal in the monitoring manner.

The server-side is further configured to position the position of the wireless apparatus according to the wireless signal received by the second control apparatus and sent by the wireless apparatus and according to a position of the second control apparatus.

The handheld terminal specifically positions as the position of the article scanned by the handheld terminal the scanning position when the handheld terminal scans each time, according to the wireless signal of the wireless apparatus received at each time of the scanning and according to the position of the wireless apparatus obtained from the server-side, and uploads to the server-side the position of the article.

In addition, the handheld terminal is also configured to position as the position of an article shelf passage the position of the handheld terminal obtained when the handheld terminal does not scan, and upload to the server-side the position of the article shelf passage according to the wireless signal of the wireless apparatus received when the scanning is not performed and according to the position of the wireless apparatus;

the server-side specifically determines the position of each article shelf according to the position of each wireless apparatus, and generates the navigation map according to the position of each article shelf, the position of each article and the position of each article shelf passage.

Wherein, the server-side may specifically include the proximal server and the remote server.

The handheld terminal may specifically upload to the remote server through the proximal server the position of the article and the position of the article shelf passage;

The second control apparatus may specifically upload to the remote server through the proximal server the wireless signal received by the second control apparatus and sent by the wireless apparatus, the remote server positions the position of the wireless apparatus according to the wireless signal received by the second control apparatus and sent by the wireless apparatus and according to the position of the second control apparatus, determines the position of the article shelf according to the position of each wireless apparatus, and generates the navigation map according to the position of each article shelf, the position of each article and the position of each article shelf passage.

Of course, as a further possible implementation, after the second control apparatus uploads to the proximal server the wireless signal received by the second control apparatus and sent by the wireless apparatus, the proximal server may also position the position of the wireless apparatus according to the wireless signal received by the second control apparatus and sent by the wireless apparatus, and upload to the remote server the position of the position of the wireless apparatus. The remote server determines the position of the article shelf according to the position of each wireless apparatus, and generates the navigation map according to the position of each article shelf, the position of each article and the position of each article shelf passage.

Figure 9:
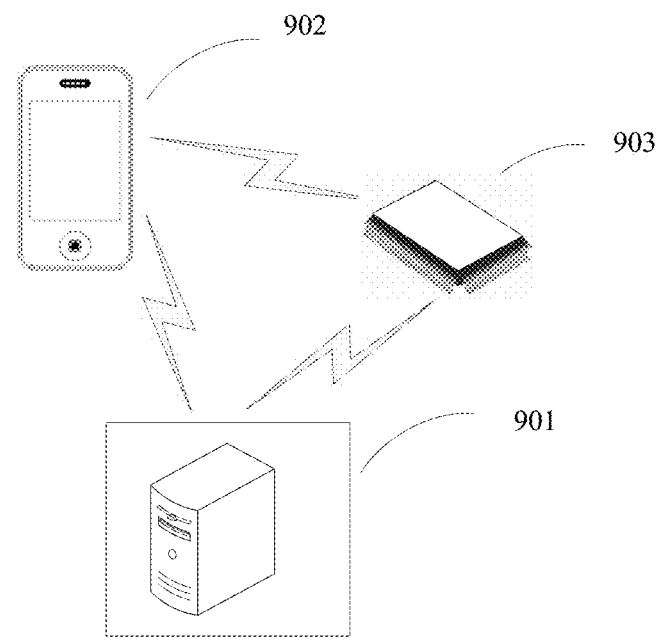
FIG. 9 is a schematic structural diagram of another embodiment of a map generation system according to an embodiment of the present application.

FIG. 9 is a schematic structural diagram of another embodiment of a map generation system according to an embodiment of the present application, the system may include the server-side 901, the handheld terminal 902, and the wireless apparatus 903;

wherein, the wireless apparatus 903 is arranged in each article shelf;

the handheld terminal 902 is configured to scan each article in the article shelf, and upload to the server-side 901 the wireless signal of the wireless apparatus received at each time of scanning;

the server-side 901 is configured to position as the position of the article scanned by the handheld terminal the scanning position when the handheld terminal 902 scans each time, according to the wireless signal of the wireless apparatus 903 received when the handheld terminal scans each time and according to the position of the wireless apparatus 903, and generate the navigation map according to the position of each article.

The present embodiment differs from the system shown in FIG. 8 in that the handheld terminal uploads to the server-side the received wireless signal, the server-side positions the scanned position of the handheld terminal, and a long connection between the handheld terminal and the server-side may be established, the signal may be sent in real time. Through the present embodiment, the automatic generation of the navigation map is realized, and the accuracy of the navigation map is improved without manual drawing.

As a further embodiment, each article in the article shelf corresponds to one wireless apparatus;

Therefore, the server-side may determine the wireless apparatus closest to the handheld terminal, according to the wireless signal of the wireless apparatus received when the handheld terminal scans each time, and position as the scanning position when the handheld terminal scans each time the position closest to the wireless apparatus.

As a further embodiment, the handheld terminal is further configured to upload to the server-side the wireless signal of the wireless apparatus received when the scanning is not performed;

the server-side may also position as the position of the article shelf passage the position of the handheld terminal obtained when the handheld terminal does not scan, according to the wireless signal of the wireless apparatus received when the handheld terminal does not scan and according to the position of the wireless apparatus;

Therefore, the server-side specifically generates the navigation map according to the position of each article and the position of the article shelf passage.

In addition, the server-side may determines the position of each article shelf according to the position of each wireless apparatus, and generate the navigation map according to the position of each article shelf, the position of each article and the position of each article shelf passage. The article shelf may be drawn according to the position of the article shelf and the position of the article shelf passage, and the article in the article shelf may further be drawn according to the position of each article. The article shelf is drawn by combining the article shelf passage to be able to improve the drawing accuracy of the article shelf.

Wherein, the position of the wireless apparatus may be arranged in advance, and may also be obtained through the calculation.

In each of the above-described embodiments, since many articles are stored in the indoor places, the articles may be classified according to the attributes of the articles in practical use, and the articles are placed according to different categories, classification requirements are different in different places, for example, in the supermarket, the articles may be classified according to the fresh, grain and oil, seasonings, drinks and scouring articles, daily articles and home articles, stylistics and home appliances, etc. the articles may also be classified according to shampoos, towels, televisions, washing machines and so on.

Therefore, the server-side generates the navigation map according to the position of each article shelf, the position of each article and the position of each article shelf passage, which may include:

generating a category distribution sub-map according to the position of each article and the category of each article; wherein, the article category may be divided according to the actual demand and the article attribute. In the place where the articles are placed, the articles are usually arranged according to the article category, so the category distribution sub-map may be generated first.

drawing the article shelf and the article shelf passage and generating the article-shelf distribution sub-map, according to the position of the article shelf and the position of the article shelf passage, for each article category in the category distribution sub-map;

generating the article distribution sub-map corresponding to each article shelf, according to the position of each article, for each article shelf in the article-shelf distribution sub-map;

establishing an associated relation among the category distribution sub-map, the article-shelf distribution sub-map, and the article distribution sub-map to generate the navigation map.

Wherein, the article distribution sub-map may also include article information, such as the name, the price, the drawing and so on. That is, specifically, according to the position of each article and the article information, the article distribution sub-map corresponding to each article shelf is generated;

Wherein, the category of the article to which the article shelf belongs may also be marked in the article-shelf distribution sub-map.

As the article category may be further divided, each article category may not only correspond to one article shelf, and each article shelf may also correspond to a plurality of the article categories.

It is assumed that the article category may be further divided into different types of articles, for example, the daily articles may be further divided into shampoos, towels and so on.

Therefore, the article shelf and the article shelf passage are drawn according to the position of the article shelf and the position of the article shelf passage, for each article category in the category distribution sub-map, and the article-shelf distribution sub-map is generated, which may be as follows:

drawing the article shelf and the article shelf passage according to the position of the article shelf and the position of the article shelf passage, for each article category in an article category distribution sub-map, and generating the article-shelf distribution sub-map.

Wherein, the navigation map boundaries may be determined first when the navigation map is generated; wherein, the boundaries of the navigation map may be determined according to the building sizes marked on an interior architectural drawing;

Therefore, specifically, the article category distribution sub-map is generated according to the position of each article and the article category of each article within the boundaries of the navigation map.

When the article shelf and the article shelf passage are drawn, the indoor passage, for example, the stairs, the elevator and the fire passage, may be determined in the architecture drawing.

Therefore, the article shelf and the article shelf passage are drawn according to the position of the article shelf and the position of the article shelf passage, for each article category in the article category distribution sub-map, and the article-shelf distribution sub-map is generated, which may be as follows:

The article shelf, the article shelf passage and the indoor passage are drawn according to the position of the article shelf, the position of the article shelf passage, and the position of the indoor passage, for each article category in the article category distribution sub-map, and the article-shelf distribution sub-map is generated.

The article shelf may be drawn according to the position of the article shelf, the size of the article shelf and the position of the article passage.

Wherein, the size of the article shelf and the size of the article shelf passage may be determined according to the distance between the wireless apparatuses in the article shelf.

Wherein, in FIG. 8b, the second class apparatus is specifically arranged in the article shelf. When the second class apparatus is arranged according to the layout rule in FIG. 8b, according to the layout rule, the position of one second class apparatus is the position of one bracket, the length, width and/or height of the bracket may be determined according to two second class apparatuses adjacent to each other in different directions. Furthermore, the size of the article shelf may be determined according to the size of the bracket. The article in the article shelf may be drawn according to the position of the article in the article shelf, specifically, the position of the article in each layer of the brackets in the article shelf.

The indoor places such as the supermarket, the shopping mall, the warehouse or the like may include a plurality of rooms, different rooms may be arranged on the same floor or on different floors, the wireless apparatus may be arranged in the article shelf of each room, the label may be provided in each article shelf, each label corresponds to one article; the categories of the articles in each room may be different, for example, the daily articles are placed in the first floor, the home category articles may be placed in the second floor.

The server-side may determine the position of article in each room according to the position of the wireless apparatus.

The service-side generates the article category distribution sub-map according to the position and the category of each article, which may be as follows:

the category distribution sub-map is generated according to the position and the category of each article in each room.

The corresponding distribution article shelf sub-map, the article distribution sub-maps and the like may be generated for the category distribution sub-map of each room.

Wherein, handover prompt information may be drawn in the category distribution sub-map, the article-shelf distribution sub-map, or the article distribution sub-map of each room, the handover prompt information is configured to prompt the user to switch to the article category distribution sub-map, the article-shelf distribution sub-map or article distribution sub-map of the corresponding shopping room.

For example, when the category distribution sub-map of any of the shopping rooms is outputted, the user may request to switch and output the category distribution sub-map of another shopping room according to the switching prompt information; when the article-shelf distribution sub-map of any of the shopping rooms is output, the user may request to switch and output the article-shelf distribution sub-map of another shopping room according to the switching prompt information. When the article category distribution sub-map in any of the shopping rooms is output, the user may request to switch and output the article distribution sub-map of another shopping room according to the handover prompt information.

Figure 10A:
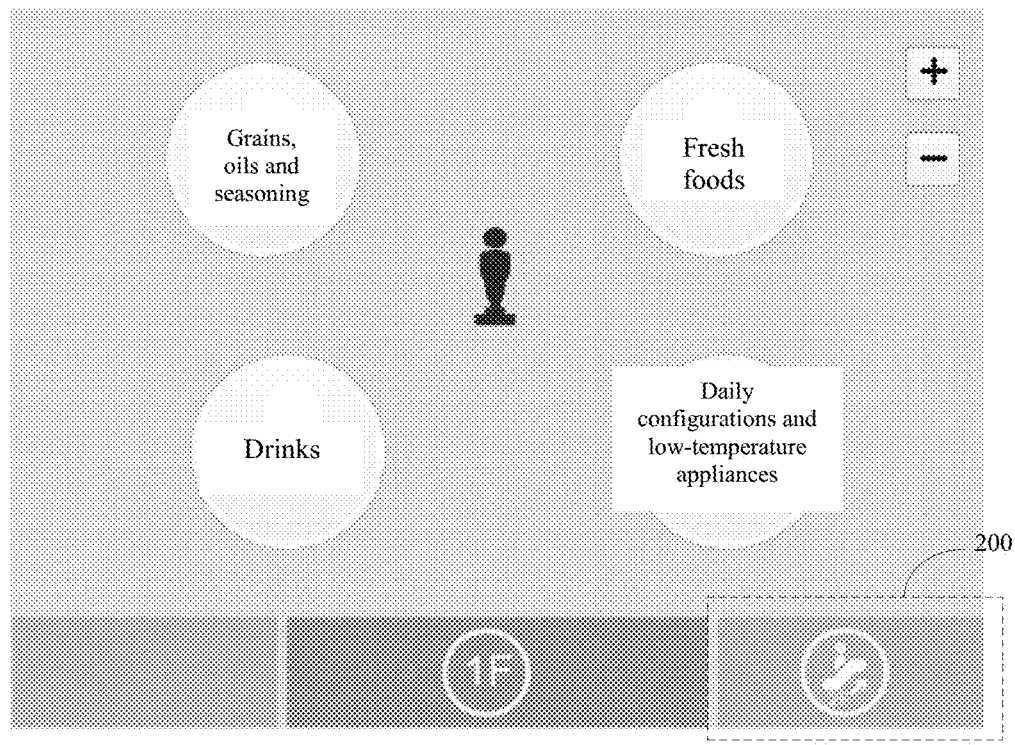
FIGS. 10*a* to 10*d* are schematic diagrams of a navigation map in an embodiment of the present application, respectively.
Figure 10B:
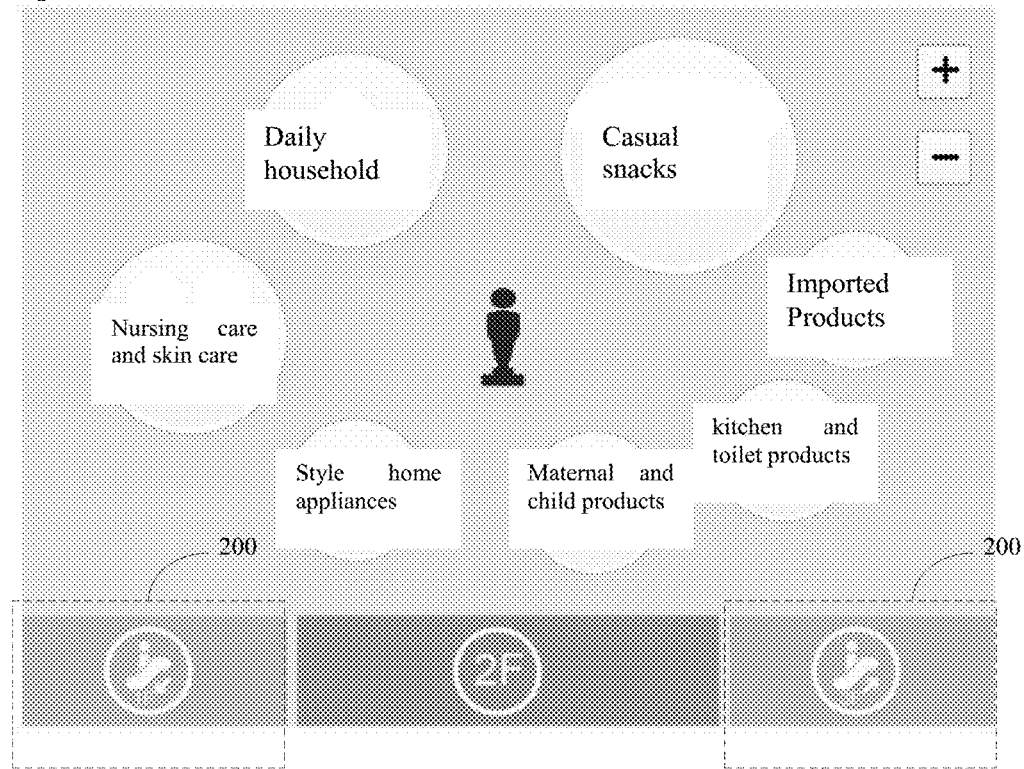
Figures 10C, 10D:
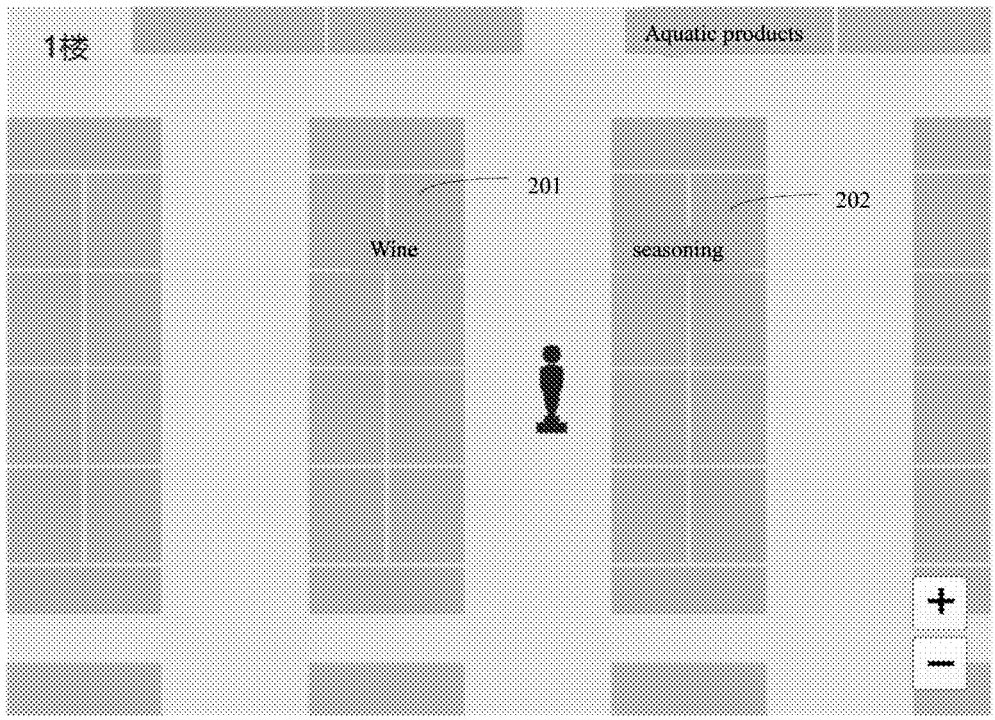

For example, if the indoor place is the supermarket, as shown in FIG. 10a-10d, FIGS. 10a and 10b are schematic diagrams of the article category distribution sub-map, respectively, and FIG. 10a is the category distribution sub-map corresponding to the first floor, and FIG. 10b is the category distribution sub-map corresponding to the room in the second floor, the category distribution sub-map includes the places where different articles are placed and still includes the handover prompt information 200 which may be a virtual control, by operating the virtual control, the category distribution sub-map of the shopping room corresponding to the handover prompt information 200 may be output;

FIG. 10c is a schematic diagram of the article-shelf distribution sub-map, Wherein, the category of the article to which each article shelf belongs may also be marked in the article-shelf distribution sub-map. In FIG. 10c, the category of the article to which the article shelf 201 belongs are marked as alcohol, The category of the article to which the article shelf 202 belongs is the seasoning.

FIG. 10d is a schematic diagram of the article distribution sub-map, specifically the article distribution sub-map corresponding to the article shelf 201, the article distribution sub-map may include the distribution position and article information of each article in the article shelf.

It should be noted that after each sub-map is output, the sub-map may be enlarged and reduced, so as to be able to view the different accuracy of the map.

Figure 11:
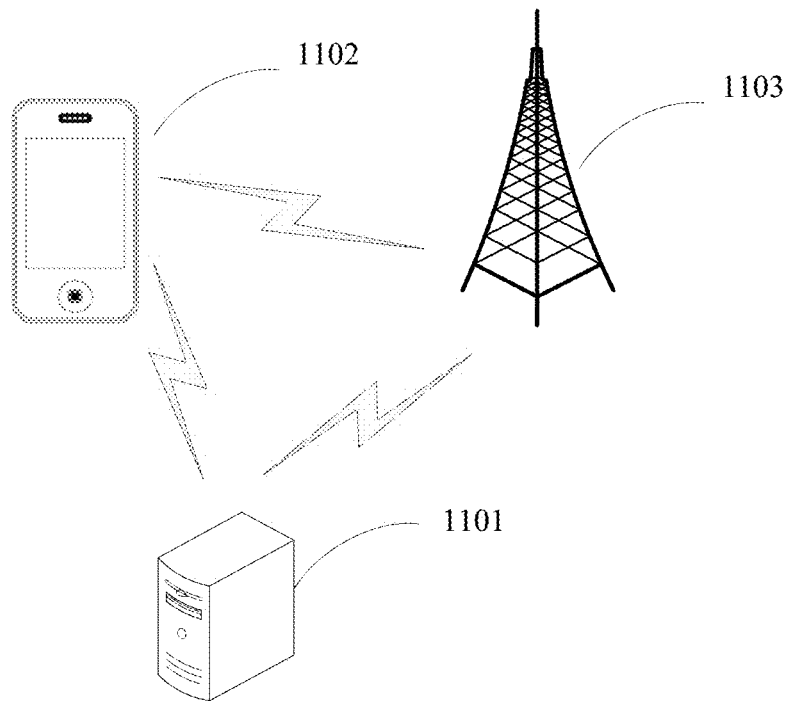
FIG. 11 is a schematic structural diagram of another embodiment of a map generation system according to an embodiment of the present application.

FIG. 11 is a schematic structural diagram of another embodiment of a map generation system according to an embodiment of the present application, the system may include the server-side 1101, the handheld terminal 1102, and the wireless apparatus 1103;

Wherein, the monitoring terminal 1103 is arranged at a preset position of the indoor place, alternatively, the monitoring terminal 1103 may be specifically arranged on the ceiling of the indoor place which position is known.

Wherein, the handheld terminal 1102 may transmit the wireless signal while the monitoring terminal 1103 may receive the wireless signal transmitted by the handheld terminal 1102. A plurality of the monitoring terminals 1103 may be provided to ensure that the monitoring terminal may be provided to receive the wireless signal transmitted by a mobile terminal 1102 at any position in the indoor place.

Specifically:
the handheld terminal 1102 is configured to transmit the wireless signal, process the article in the article shelf to obtain article processed information, and transmit to the server-side the article processed information;
the monitoring terminal 1103 is configured to receive the wireless signal and transmit to the server-side 1101 the wireless signal;
the server-side 1101 is configured to determine the article processed by the handheld terminal 1102 according to the article processed information, position as the position of the article the processed position of the handheld terminal according to the wireless signal transmitted when the handheld terminal 1102 processes the article and according to a position of the corresponding monitoring terminal, and generate a navigation map according to the position of the article.

Wherein, the wireless signal transmitted when the mobile terminal processes an article shelf object is forwarded to the server-side by the monitoring terminal.

Wherein, the handheld terminal may constantly transmit the wireless signal at a higher frequency, the monitoring terminal constantly receives the wireless signal and reports to the server-side, to ensure to obtain the wireless signal transmitted when the handheld terminal processes the article shelf object.

The monitoring terminal corresponded when the handheld terminal processes the article shelf object may receive the wireless signal transmitted when the handheld terminal processes the article shelf object. And the received wireless signal is forwarded to the server-side by the corresponding monitoring terminal.

Therefore, the server-side may specifically position the processed position of the handheld terminal according to the wireless signal transmitted when the handheld terminal processes the article shelf object and according to the position of the monitoring terminal receiving the wireless signal transmitted when the handheld terminal processes the article shelf object.

The object processed information transmitted by the handheld terminal may still include processing time, and the wireless signal transmitted by the monitoring terminal may include the receiving time. Therefore, alternatively, the wireless signal corresponded when the handheld terminal processes the article shelf object may be determined according to the processing time and the reception time of the wireless signal, the corresponding wireless signal of which the receiving time is identical to the processing time or has the error within a preset range may be taken as the wireless signal correspondingly transmitted when the handheld terminal processes the article shelf object. The monitoring terminal corresponded when the handheld terminal processes the article shelf object may refer to the monitoring terminal of which the receiving time is identical to the processing time or has the error within the preset range.

Wherein, a plurality of the monitoring terminals of the wireless signal transmitted when the handheld terminal processes the article shelf object may be provided, the monitoring terminal closest to the handheld terminal receives the wireless signal with the strongest signal strength. Therefore, alternatively, in order to improve the computational accuracy, the monitoring terminal corresponded when the handheld terminal processes the article shelf object may refer to the corresponding monitoring terminal determined according to the order of the signal strength of the received wireless signal from the strong to the weak.

In the present embodiment, the wireless signal may be specifically a high frequency signal, and alternatively, may be the high frequency signal, an Ultra Wideband (UWB) signal, and a low power consumption signal.

In order to facilitate indoor positioning, the wireless signal may be a close wireless communication signal, the monitoring side is arranged in the indoor place, when the handheld terminal is positioned in the indoor place, the handheld terminal may be guaranteed to transfer the wireless signal with the monitoring terminal.

The handheld terminal may be provided with a transmitting component for transmitting the wireless signal. In a possible implementation, the transmitting component may be an UWB chip, the monitoring end may be a UWB base station, and the wireless signal is a UWB signal.

The UWB is a kind of wireless carrier communication technology, the UWB signal is transmitted in a pulsed manner, because the UWB signal is in UWB, the UWB signal may be transmitted continuously, the transmission speed is fast and the calculation speed is fast too, which may guarantee the positioning accuracy, improve the positioning efficiency, further improve the drawing efficiency of the map, and improve the accuracy of drawing.

Of course, the transmitting component may also be capable of transmitting radar, sonar, laser, or Beacon signal, and the embodiment of the present application does not specifically limit the transmitting component.

However, the server-side is usually arranged in a remote position, the handheld terminal and the monitoring terminal may establish network connection with the server-side, to achieve information transmission.

Wherein, the server-side may distinguish the different articles processed by the handheld terminal according to the article processed information, specifically, the article processed information may include article identification information, the server-side may correspondingly store the positions of each article and the article identification information the generated navigation map may distinguish different articles by article identification information. The article identification information may specifically refer to the name of the article.

Alternatively, as a further embodiment, the handheld terminal processes the articles in an article shelf to obtain article processed information, which may be as follows:

The article in the article shelf article is scanned to obtain article processed information, which is also the scanning information obtained by scanning. The scanning information may include the article identification information so that the server-side may identify the different articles processed by the handheld terminal according to the article processed information.

One possible implementation for the handheld terminal to scan the article in the article shelf may be to scan the article information code on the outer package of the article. The article information code may be the one-dimensional code or the two-dimensional code, etc., and is the identification symbol for identifying the article. The article information code may include the article identification information, a production place and/or the price, and other article-related information of the article, the article identification information is the article information code.

As another possible implementation, each article may be correspondingly provided with one label in the article shelf. The label may be specifically the electronic label.

Each label may be provided with a label information code, which may be the one-dimensional code or the two-dimensional code.

In the case where the label and the article are not bound, the article in the article shelf scanned by the handheld terminal may include the article information code of the scanned article in the article shelf and the label information code where the article corresponds to the label, the article processed information includes the label information code and the article information code so that the server-side realizes the binding of the article and the label; meanwhile, the scanned position of the handheld terminal may also be positioned according to the wireless signal corresponded when the handheld terminal scans. Therefore, when the article and the label are bound, the position of the article may be positioned, which is easy to operate without additional cumbersome steps and further improve the efficiency of drawing.

Of course, as another possible implementation, in the case where the label and the article are bound, the server-side stores the corresponding relation between the article information code and the label information code. The article in the article shelf article scanned by the handheld terminal may be the label information code on the label corresponding to the scanned article, the scanning information includes the label information code. After the server-side receives the label information code, the server-side may determine the article information code corresponding to the label information code, so as to be able to know which article is scanned.

As a further embodiment, the handheld terminal processes the article in an article shelf to obtain article processed information, which may be specifically as follows:
  the article in the article shelf is collected to obtain the article processed information, the article processed information is an image of the article;
  the server-side is also configured to identify the image of the article to determine the article identification information of the article so that different articles may be distinguished.

The server-side may store the images of different articles so that the article may be identified according to the images collected by the handheld terminal to determine the article identification information of the article.

Of course, the image of the article may be collected by the handheld terminal for the identification area of the article, since the outer package of the article usually is marked with the name of the article, the article information code of the article, etc., the identification area may be the area where the article information code is positioned in the outer package of the article, the area where the article identification information is positioned, and so on, so that the article identification information may be obtained by the server-side through an image recognition technique.

As a further embodiment, the handheld terminal processes the articles in an article shelf to obtain article processed information, which may be specifically as follows:
  collecting the article in the article shelf to obtain the image of the article; and
  identifying the image of the article to obtain article processed information, which may be article identification information of the article.

That is, the image recognition may be performed by the handheld terminal to obtain the article processed information.

As another embodiment, in the case where the article and the label are bound, the server-side stores the corresponding relation between the article information code and the label information code.

The label may transmit a specific signal which may be received only when the handheld terminal is close to the label, the specific signal may carry the label information code, so that the handheld terminal processes the article in the article shelf to obtain article handling information, which is specifically as follows:

The handheld terminal receives the specific signal transmitted by the label corresponding to the article in the article shelf to obtain the article processed information, which is the label information code.

The server-side may find the corresponding article information code according to the label information code to determine the article identification information of the article.

Wherein, the specific signal may be a Near Field Communication (NFC) signal.

In the present embodiment, the handheld terminal is configured to transmit the wireless signal and may process the article in the article shelf to obtain article processed information, and transmit the article processed information to the server-side; the monitoring terminal may receive the wireless signal and send the wireless signal to the server-side; the server-side may position as the position of the article the processed position of the handheld terminal to generate the navigation map according to the position of the article, the embodiment of the present application realizes the automatic generation of the map, and improves the accuracy of the navigation map without the manual drawing.

In the practical application, the staffs only need to operate the handheld terminal to scan the article in the article shelf, and achieve the automatically generated navigation map.

In the indoor place, the article is arranged in the article shelf, and the article shelf passage is usually provided between the article shelves to facilitate the user's action.

Therefore, in some embodiments, the server-side is further configured to position as the position of an article shelf passage the unprocessed position by the handheld terminal, according to the wireless signal transmitted when the handheld terminal does not process the article, and according to the position of the corresponding monitoring terminal;
  wherein, the monitoring terminal corresponded when the handheld terminal does not process the article shelf object may receive the wireless signal transmitted when the handheld terminal does not process the article shelf object.

Therefore, the server-side specifically positions the unprocessed position of the handheld terminal according to the wireless signal transmitted when the handheld terminal does not process the article shelf object and according to the position of the monitoring terminal receiving the wireless signal transmitted when the handheld terminal does not process the article shelf object.

Alternatively, the corresponding monitoring terminal may be selected to position the unprocessed position of the handheld terminal in accordance with the order of the signal strength of the received wireless signal from the strong to the weak.

The server-side generates the navigation map according to the position of the article, which may be specific as follows:

the navigation map is generated according to the position of the article and the position of the article shelf passage.

In addition, the server-side may also first determine the position of the article shelf according to the position of each article, so as to be able to draw the position of the article shelf passage first according to the position of the article shelf, draw the article shelf, further draw the position of the article, draw the article in the article shelf to generate the navigation map.

Wherein, the positioning algorithm may be achieved in a variety of ways.

The server-side may position the position of the handheld terminal using the Time of Arrival (TOA) algorithm or the Time Difference of Arrival (TDOA) algorithm. If the wireless signal is transmitted when the handheld terminal processes the article, the calculated handheld terminal position is the processed position, and if the wireless signal is transmitted when the handheld terminal does not process the article, the calculated handheld terminal position is the unprocessed position.

The two-dimensional coordinates are taken as an embodiment, it is assumed that the position coordinates of the handheld terminal are (x, y), the position coordinates of the monitoring end are $(x_i, y_i)$, the formula using the TOA algorithm may be:

$$r_i = (t_i - t_0)c;$$

$$r_i^2 = (x_i - x)^2 + (y_i - y)^2;$$

Where c is the speed of light, $r_i$ is the distance between the handheld terminal and the i-th monitoring terminal, and $t_i$ is the arrival time of the wireless signal transmitted by the handheld terminal to the i-th monitor terminal. $T_0$ expresses the arrival time of the wireless signal to the handheld terminal, usually being 0.

Using the above TOA formula, at least two monitoring terminals are needed for two-dimensional coordinates, then the position coordinates of the handheld terminal may be calculated.

The calculation formula using the TDOA algorithm may be as follows:

$$r_{ij} = (t_i - t_j)c$$

$$r_{ij}^2 = r_i^2 - r_j^2$$
$$= (x_i - x)^2 + (y_i - y)^2 - (x_j - x)^2 - (y_j - y)^2$$

Where c is the speed of light, $r_i$ is the distance between the handheld terminal and the i-th monitoring terminal, and $r_j$ is the distance between the handheld terminal and the j-th monitoring terminal. $t_i$ is the arrival time of the wireless signal transmitted by the handheld terminal to the i-th monitoring terminal. $t_j$ is the arrival time of the wireless signal transmitted by the handheld terminal to the j-th monitoring terminal. $(t_i-t_j)$ is the time difference between the arrival time of the wireless signal transmitted by the handheld terminal to the i-th monitoring terminal and the arrival time of the wireless signal transmitted by the handheld terminal to the j-th monitoring terminal, where i is not equal to j, j=1, 2, 3 . . . .

Using the above TDOA formula, at least three monitoring terminals are needed for two-dimensional coordinates, then the position coordinates of the handheld terminal may be calculated.

Wherein, the use of TDOA may avoid the time error, to further improve the calculation accuracy.

In some embodiments, the wireless signal transmitted by the handheld terminal may be the UWB signal, the radar signal, a sonar signal, a laser signal, etc.

In addition, due to the large indoor place, in order to ensure the precise positioning of the position of the handheld terminal, a plurality of the monitoring terminals may be provided, the appropriate number of the monitoring terminals is selected at each time of positioning according to the order of the signal strength from the strong to the weak, to position the position of the handheld terminal.

In the practical application, the navigation map is specifically a three-dimensional electronic map, so the position of the handheld terminal obtained by positioning may be three-dimensional coordinates.

In addition, when the TOA algorithm is configured to position the position of the handheld terminal, each monitoring terminal may also calculate the distance between the monitoring terminal and the handheld terminal according to the arrival time, and then upload the distance to the server-side, the server-side calculates the position of the handheld terminal according to the distance and a distance formula.

Therefore, as yet another embodiment, the embodiment of the present application provides a map generation system. The system may include a server-side, a handheld terminal, and a wireless apparatus. The connection relation of each component may be shown in FIG. 1.

Wherein, a monitoring terminal is arranged at a preset position of an indoor place, alternatively, the monitoring terminal may be specifically arranged on a ceiling of the indoor place.

Wherein, a plurality of the monitoring terminals is provided. The handheld terminal may transmit the wireless signal while the monitoring terminal may receive a wireless signal transmitted by the handheld terminal.

Specifically:
the handheld terminal is configured to transmit the wireless signal, process an article in an article shelf to obtain article processed information, and transmit to the server the article processed information;
the monitoring terminal is configured to receive the wireless signal, calculate a distance between the monitoring terminal and the handheld terminal according to the wireless signal, and send the distance to the server-side;
the server-side is configured to position as a position of the article the processed position of the handheld terminal, according to the distance corresponded when the handheld terminal processes the article, and according to a position of the monitoring terminal sending the distance, and generate a navigation map according to the position of the article.

In the present embodiment, the distance between the monitoring terminal and the handheld terminal may be first calculated by the monitoring terminal, and the server-side may position the processed position of the handheld terminal according to the distance and a distance formula.

Wherein, the distance between the monitoring terminal and the handheld terminal may be calculated using the arrival time, and it is of course possible to calculate the distance using other calculation methods such as signal strength. The present embodiment is not specifically limited thereto.

The article processed information transmitted by the handheld terminal may still carry processing time, and the distance transmitted by the monitoring terminal may include receiving time of the received wireless signal. Therefore, alternatively, the distance corresponded when the handheld terminal processes the article may be determined according to the processing time and the receiving time of the wireless signal, the corresponding distance of which the receiving time is identical to the processing time or has the error within a preset range may be determined as the distance corresponded when the handheld terminal processes the article. The processed position of the handheld terminal may be positioned by combining the position of the monitoring terminal of which the receiving time is identical to the processing time or has the error within a preset range.

In the present embodiment, the handheld terminal transmits the wireless signal and may process the article in the article shelf to obtain the article processed information, calculate the distance between the monitoring terminal and the handheld terminal, and send the distance to the server-side; the server-side may position as the position of the article the processed position of the handheld terminal according to the position corresponded when the handheld terminal processes the article, and generate the navigation map according to the position of the article. The embodiment of the present application realizes the automatic generation of the map, and improves the accuracy of the navigation map without manual drawing.

In addition, the server-side may also position as a position of an article shelf passage the unprocessed position of the handheld terminal, according to the wireless signal corresponded when the handheld terminal does not process the article;

therefore, the server-side generates the navigation map according to the position of the article and the position of the article shelf passage.

Therefore, as yet another embodiment, the embodiment of the present application provides a map generation system. The system includes a server, a handheld terminal and a monitoring terminal; the monitoring terminal is arranged at a preset position in an indoor place, and specifically arranged in an indoor ceiling, of which the position is known.

The monitoring terminal is configured to transmit a wireless signal;
the handheld terminal is configured to receive the wireless signal, send the wireless signal to the server-side, process an article in an article shelf to obtain article processed information, and send the article processed information to the server-side;
the server-side is configured to position as a position of the article the processed position of the handheld terminal, according to the wireless signal received when the handheld terminal processes the article, and according to a position of the corresponding monitoring terminal, and generate a navigation map according to the position of the article.

Wherein, in the preset embodiment, the monitoring terminal corresponded when the handheld terminal processes an article shelf object may transmit the wireless signal received when the handheld terminal processes the article shelf object.

The handheld terminal may receive a plurality of the wireless signals transmitted by the monitoring terminal obtained when the handheld terminal processes the article shelf object, the corresponding wireless signal and the position of the monitoring terminal transmitting the corresponding wireless signal may be selected according to the order of the signal strength from the strong to the weak, to position the processed position of the handheld terminal.

In the present embodiment, the wireless signal is transmitted by the monitoring terminal, the handheld terminal receives the wireless signal transmitted by the monitoring terminal and transmits the wireless signal to the server-side, if the article processed information is obtained, the article processed information is transmitted to the server-side. The server-side may distinguish the different articles according to the article processed information so as to b e able to position as the position of the article the processed position of the handheld terminal according to the wireless signal received when the handheld terminal processes the article; and generate the navigation map. The automatic generation of the map is realized, and the accuracy of the navigation map is improved without manual drawing.

In addition, the server-side may still position as a position of the article shelf passage the unprocessed position of the handheld terminal according to the wireless signal corresponded when the handheld terminal does not process the article, so that the server-side specifically generates the navigation map according to position of the article and the position of an article shelf passage.

Therefore, as yet another embodiment, the embodiment of the present application provides a map generation system, the system includes a server, a handheld terminal and a monitoring terminal; the monitoring terminal is arranged in an indoor preset position, and specifically arranged in an indoor ceiling, of which a plurality of the positions is known and provided.

The monitoring terminal is configured to transmit a wireless signal;

The handheld terminal is configured to process an article in an article shelf to obtain the article processed information, position as the position of the article the processed position of the handheld terminal according to the wireless signal received at the time of processing the article and according to the position of the corresponding monitoring terminal, and send to the server-side the position of the article and the article processed information;
the server-side is configured to generate a navigation map according to the position of the article.
the monitoring terminal corresponded when the handheld terminal processes an article shelf object may transmit the wireless signal received when the handheld terminal processes the article shelf object.

Wherein, the handheld terminal may receive a plurality of the wireless signals transmitted by the monitoring terminal obtained when the handheld terminal processes the article shelf object, the corresponding wireless signal and the position of the monitoring terminal transmitting the corresponding wireless signal may be selected according to the order of the signal strength from the strong to the weak, to position the processed position of the handheld terminal.

In the present embodiment, the wireless signal is transmitted by the monitoring terminal, the handheld terminal receives the wireless signal transmitted from the monitoring terminal, the handheld terminal positions as the position of the article the processed position of the handheld terminal according to the wireless signal received at the time of processing the article, and sends the processed position to the server-side; the server-side may distinguish different articles according to the article processed information of the article, to generate the navigation map according to the position of each article. The automatic generation of the navigation map is realized, and the accuracy of the navigation map is improved without manual drawing.

In addition, the handheld terminal may also position as the position of an article shelf passage the unprocessed position of the handheld terminal according to the wireless signal received when the handheld terminal does not process the article and according to the position of the corresponding monitoring terminal, and sends to the server-side the position of the article shelf passage, so that the server-side may generate the navigation map according to the position of the article and the position of the article shelf passage.

Wherein, in some of the embodiments described above, the server-side generates the navigation map according to the position of the article and the position of the article shelf, which may be specific as follows:

determining the boundaries of the navigation map; and
generating the navigation map within the boundaries of the navigation map according to the position of the article and the position of the article shelf passage.

The boundaries of the navigation map may be determined according to the building sizes marked in an interior architectural drawing.

In the practical application, the indoor place usually also includes some indoor passages, such as stairs, an elevator, a fire passage, and so on, these indoor passages may be obtained from the architectural drawings, the size and boundaries of the place may also be determined from the architectural drawing, so as to be able to determine the boundaries of the navigation map;

therefore, the server-side may generate the navigation map within the boundaries of the navigation map according to the position of the article, the position of the article shelf passage, and a position of the indoor passage.

In some embodiments, the server-side generates the navigation map according to the position of the article and the position of the article shelf, which may include:

generating a category distribution sub-map according to the category to which the article belongs and the position of the article; specifically, determining a position of the article category according to the position of the article in the same article category, to further generate the category distribution sub map according to the position of each article category;
drawing the article shelf according to the position of the article, and drawing the article shelf passage according to the position of the article shelf passage, to generate an article-shelf distribution sub-map corresponding to each article category, for each article category in the category distribution sub-map;
generating an article distribution sub-map corresponding to each article shelf according to the position of the article, for each article shelf in the article-shelf distribution sub-map, that is, drawing the article in each article shelf to generate the article distribution sub-map; and
establishing an associated relation among the category sub-map, the article-shelf distribution sub-map, and the article distribution sub-map to generate the navigation map.

Wherein, the article distribution sub-map may also include article-related information of each article, such as the name, the price, the drawing and so on. That is, alternatively, the article distribution sub-map corresponding to each article shelf is generated according to the position of the article and the article-related information; the category distribution sub-map also generates the category name of each article; the article-shelf distribution sub-map also generates the name of the article category to which each article belongs.

In some embodiments, as the article category may be further divided, each article category may not only correspond to one article shelf, and each article shelf may also correspond to a plurality of the article categories.

It is assumed that the article category may be further divided into a plurality of article categories, for example, daily articles may be further divided into shampoos, towels and so on.

Therefore, the article shelf is drawn according to the position of the article, and the article shelf passage is drawn according to the position of the article shelf passage, for each article category in the category distribution sub-map, to generate the article-shelf distribution sub-map corresponding to each article category, which may be as follows:

drawing the article shelf according to the position of the article, and drawing the article shelf passage according to the position of the article shelf passage, to generate an article-shelf distribution sub-map, for each article category in the category distribution sub-map.

Wherein, the position of the article for drawing the article-shelf distribution sub-map corresponding to any article category is the position of the article under the article category, the position of the article shelf passage is the position of the article shelf passage corresponding to the article category.

Since the boundaries of the navigation map may be determined first when the navigation map is generated, the category distribution sub-map may be generated according to the position of each article and the article category to which each article belongs, within the boundaries of the navigation map.

When the article shelf and the article shelf passage are drawn, the indoor passage, for example, the stairs, the elevator and the fire passage, may be determined in the architecture drawing.

Therefore, the article shelf is drawn according to the position of the article, the article shelf passage is drawn according to the position of the article shelf passage, and the indoor passage is drawn according to a position of the indoor passage, for each article category in the category distribution sub-map, to generate the article-shelf distribution sub-map corresponding to each article category;

Wherein, the drawing of the article shelf may be performed with the combination with the size of the article shelf, the size of the article shelf may be preset.

The indoor places such as a supermarket, a shopping mall, a warehouse or the like may include a plurality of rooms, different rooms may be arranged on the same floor or on different floors, the categories of the articles in each room may be different, for example, daily articles are placed in the first floor, the home category articles may be placed in the second floor.

The monitoring terminal may be arranged in each room so that the server-side may obtain the position of the article of each room, the position of the article shelf passage, etc.

Therefore, in some embodiments, the server-side generates a category distribution sub-map according to the position of the article and the category to which the article belongs, which may be as follows:

The category distribution sub-map of each room is generated according to the position of the article in each room and the category of the article.

The corresponding distribution article shelf sub-map, the article distribution sub-maps and the like may be generated for the category distribution sub-map of each room.

Wherein, the handover prompt information may be drawn in the category distribution sub-map, the article shelf distribution sub-map, or the article distribution sub-map of each room, the handover prompt information is configured to prompt the user to switch to the article category distribution sub-map, the article shelf distribution sub-map or article distribution sub-map of the corresponding room.

For example, when the category distribution sub-map of any room is output, the user may request to switch and output the article category distribution sub-map of the article in another room according to the corresponding handover prompt information; when the article-shelf distribution sub-map of any room is output, the user may request to switch and output the article-shelf distribution sub-map of another room according to the corresponding handover prompt information, when the article distribution sub-map of any room is output, the user may request to switch and output the article distribution sub-map of another room according to the corresponding handover prompt information.

Wherein, in order to facilitate the transmission and control for the signal, the server-side may at least include a proximal server and a remote server, the proximal server and the monitoring terminal are arranged in the same LAN while the remote server is arranged in a network-side, and connected with the proximal server through the Internet.

Therefore, the monitoring terminal may specifically transmit to the remote server through the proximal server the wireless signal or the distance from the handheld terminal calculated according to the wireless signal; the remote server may position as the position of the article the processed position of the handheld terminal, and generate the navigation map according to the position of each article, etc.

According to the navigation map systems provided by the above-described various embodiments, the navigation map generated by the technical solution of the embodiments of the present application may have a plurality of applications, and several possible implementations will be enumerated in the following embodiments, of course, the embodiments of the preset application is not limited hereto.

In some embodiments, the server-side may be further configured to transmit the navigation map to a user terminal such that the user terminal outputs the category distribution sub-map after receiving the navigation map, output the corresponding article distribution sub-map when receiving the output request of the article shelf for any article category in the category distribution sub-map, and output the article distribution sub-map corresponding to the request when receiving the output request of the article for any article shelf in the article-shelf distribution sub-map.

Wherein, each of the output requests may be triggered by the user, the user may trigger an output request by performing a click or other specific operation for any of the article categories or any article shelf in the sub-map.

In the article distribution sub-map, when content output request for any article in the article distribution sub-map is received, the article-related information of the article may be output, including details such as a name, a price, a production place of the article, so that users may understand the article without entering the indoor place.

In some embodiments, the server-side is further configured to transmit the navigation map to the user terminal for outputting the navigation map by the user terminal, receive a navigation request by the user terminal, which includes article identification information of at least one target article, check a position of at least one target article according to the article identification information of at least one target article, generate navigation prompt information according to the position of at least one target article and a position of the user terminal, and trigger the user terminal to output the navigation prompt information in the navigation map.

The navigation prompt information may include navigation route information, the server-side may plan navigation route according to the position of each article to prompt the user to find the target article according to the navigation route.

In some embodiments, the server-side is further configured to send the navigation map to the user terminal for outputting the navigation map by the user terminal, and send to the user terminal related recommendation information of the article matching a position of the terminal for outputting the related recommendation information by the user terminal.

According to the change in a position of the user terminal, different related recommendation information may be pushed.

When the user carries the user terminal and moves in the indoor place, the article closest to the terminal position may be searched according to the terminal position, that is, the related recommendation information of the article may be pushed to the user terminal, the related recommendation information may be, for example, promotional information or a preferential document of the article or the article related information of other article similar to the article, etc.

In some embodiments, the server-side is further configured to transmit the navigation map to the user terminal for outputting the navigation map by the user terminal, receive article search request of the user terminal, which includes article identification information of an article to be searched, determine the position of the article to be searched according to the article identification information of the article to be searched, and trigger the user terminal to output the search prompt information at the position of the article to be searched in the navigation map.

In the navigation map output by the user terminal, the user may also search article to trigger the article search request, so that the server-side may trigger the user terminal to output the search prompt information at the position of the article to be searched in the navigation map, so as to mark the article to be searched and facilitate the user to find the article.

The user may trigger the content output request according to the search prompt information, so that the server-side may send to the user terminal the article related information of the article for the output by the user terminal.

Of course, the user may trigger navigation request according to the search prompt information, so that the server-side may generate navigation prompt information according to the position of the current user terminal and the position of the article to be searched, and trigger the output by the user terminal. According to the navigation prompt information, the user may quickly find the article.

As described above, it may be seen that the navigation map generated by the technical solution of the embodiment of the present application may easily search the article, in the practical application, when the navigation map is a map of a shopping area, such as an indoor map of a supermarket, through the navigation map, the user may conveniently find the position of the article he wants to buy, the navigation map may push a discount coupon and other related information, the navigation may also facilitate the staff or suppliers to find the position where the article is needed to be replenished or replaced. Of course, the application of the navigation map of the embodiment of the present application is not limited hereto.

Figure 12:
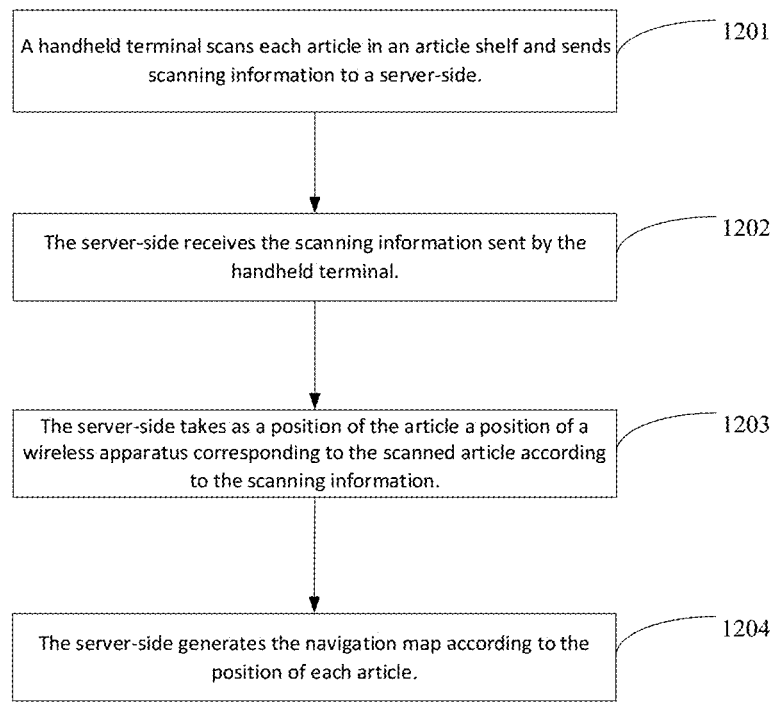
FIG. 12 is a flow chart of one embodiment of a map generation method according to an embodiment of the present application.

Corresponding to the map generation system provided by the embodiment shown in FIG. 1, FIG. 12 is a flow chart of an embodiment of a map generation method provided by the embodiment of the present application, the method may include the following steps:

In step 1201: the handheld terminal scans each article in the article shelf and sends scanning information to the server-side.

The scanning information may at least include article information code.

In step 1202: the server-side receives the scanning information sent by the handheld terminal.

In step 1203: the server-side takes as the position of the article a position of the wireless apparatus corresponding to the scanned article according to the scanning information.

In step 1204: the server-side generates the navigation map according to the position of each article.

In the present embodiment, one wireless apparatus corresponds one article and scans the article through the handheld terminal, the server-side may determine the wireless apparatus corresponding to the scanned article according to the scanning information so that the position of the wireless apparatus corresponding to the scanned article may take as the position of the article. The navigation map is generated according to the position of each article. Through the map generation system of the present embodiment, the automatic generation of the navigation map is realized, and the accuracy of the navigation map is improved without manual drawing.

As a possible implementation, each wireless apparatus corresponds to one article and one label, the handheld terminal scans each article in the article shelf, and the method may further include:

scanning a label information code corresponding to the article. At this time, the label information may also include the label information code;

the server-side takes as the position of the article the position of the wireless apparatus corresponding to the scanned article according to the scanning information, which may include:

searching the corresponding relation between different labels and different wireless apparatuses according to the scanning information, and taking as the position of the article the position of the wireless apparatus corresponding to the label of the scanned article.

Wherein, the corresponding relation between different labels and different wireless apparatus may be preset in the server-side.

When the label is an electronic label, the wireless apparatus corresponding to the electronic label may be integrated into the electronic label to be an integrated apparatus.

As a further possible implementation, an apparatus information code may be provided in each wireless apparatus in the map generation system; the apparatus information code may be a one-dimensional code, a two-dimensional code, or a three-dimensional code, and may be provided on a housing of the wireless apparatus.

The handheld terminal scans each article in the article shelf, the method may further include:

scanning the wireless apparatus corresponding to the article;

wherein, the apparatus information code may also be included in the scanning information.

Then, the server-side takes as the position of the article the position of the wireless apparatus corresponding to the scanned article according to the scanning information, which may include:

taking as the position of the scanned article the position of the wireless apparatus corresponding to the apparatus information code according to the apparatus information code in the scanning information.

As a further embodiment, before the server-side may generate the navigation map according to the position of the article, the method may further include:

determining the position of the article shelf according to the position of each wireless apparatus; and generating the navigation map according to the position of each article, which includes: drawing first the article shelf and then the article in the article shelf so as to draw the navigation map according to the position of each article and a position of the article shelf.

As the articles are placed in the indoor places, the places are usually left a position of an aisle, which may specifically refer to the position of the article shelf passage between the article shelves.

The position of the article shelf passage may be determined according to the position of the handheld terminal obtained when the handheld terminal does not scan.

Wherein, as a possible implementation, the method may further include:

receiving the position of the article shelf passage sent by the handheld terminal; wherein, the position of the article shelf passage is the position of the handheld terminal obtained when the handheld terminal does not scan, which is positioned by the handheld terminal according to the wireless signal of the wireless apparatus received when the scanning is not performed and according to the position of the wireless apparatus;

generating the navigation map according to the position of each article, which may include:

generating the navigation map according to the position of the article and the position of each article shelf passage.

Another possible implementation is as follows:

the method may further include:

receiving, by the handheld terminal, the wireless signal of the wireless apparatus sent by the handheld terminal and received when the scanning is not performed; and positioning as the position of the article shelf passage the position of the handheld terminal obtained when the handheld terminal does not scan, according to the wireless signal of the wireless apparatus received when the handheld terminal does not scan and according to the position of the wireless apparatus.

Wherein, the position of the wireless apparatus may be arranged in advance, and may also be obtained through the calculation.

As a further embodiment, according to the map generation system shown in FIG. 3, the wireless apparatus in the system may include a first class apparatus and a second class apparatus, the position of the first class apparatus is known.

The method may further include:

taking, by the server-side, as a known apparatus the first class apparatus and/or the second class apparatus of which the position has been determined, and positioning, by the server-side, the position of the second class apparatus of any which the position is not determined, according to the position of the known apparatus and according to the wireless signal received by the known apparatus and sent by the second class apparatus of any position is not determined.

the server-side takes as the position of the article the position of the wireless apparatus corresponding to each scanned article according to the scanning information, which may include the following:

taking as the position of the article the position of the first class apparatus or the second class apparatus corresponding to each scanned article according to the scanning information.

The server-side generates the navigation map according to the position of each article, which may include:
 determining the position of each article shelf according to the position of the first class apparatus and/or the second class apparatus; and
 generating the navigation map according to the position of each article shelf, the position of each article and the position of each article shelf passage.

Wherein, when a plurality of the first class apparatuses is provided, a plurality of the first class apparatuses is arranged in an indoor preset area but is not positioned on the same plane; the second class apparatus is specifically arranged in each layer of brackets in each article shelf;
 the server-side takes as the position of the article the position of the wireless apparatus corresponding to each scanned article according to the scanning information, which may include:
 taking, by the server-side, as the position of the article the position of the second class apparatus corresponding to each scanned article according to the scanning information.
 wherein, in order to facilitate the server-side to obtain the wireless signal of the wireless apparatus, according to the map generation system shown in FIG. 4, the map generation system further includes a first control apparatus, the first control apparatus is configured to upload to the server-side the wireless signal sent and received by the known apparatus and sent by any second class apparatus;
 therefore, the position of any second class apparatus is positioned according to the position of the known apparatus and according to the wireless signal of any second class apparatus received by the known apparatus, which may include:
 positioning the position of any second class apparatus according to the wireless signal uploaded by the first control apparatus, received by the known apparatus and sent by any second class apparatus.

As a further embodiment, according to the map generation system shown in FIG. 6, the system may further include a second control apparatus, the second control apparatus is configured to upload to the server-side the wireless signal received by the second control apparatus and sent by the wireless apparatus;
 then, before the position of the article is taken as the position of the wireless apparatus corresponding to the scanned article according to the scanning information, the method further includes:
 positioning the position of the wireless apparatus according to the wireless signal received by the second control apparatus and sent between the wireless apparatuses and according to the position of the second control apparatus.

In each of the above-described embodiments, the server-side generates the navigation map according to the position of each article shelf, the position of each article and the position of each article shelf passage, which may include:
 generating the article category distribution sub-map according to the position and the category of each article;
 drawing the article shelf and the article shelf passage, according to the position of the article shelf and the position of the article shelf passage, for each article category in the article category distribution sub-map, and generating the article-shelf distribution sub-map corresponding to each article category;
 generating the article distribution sub-map corresponding to each article shelf, according to the position of each article, for each article shelf in the article-shelf distribution sub-map;
 establishing an associated relation among the article category sub-map, the article-shelf distribution sub-map, and the article distribution sub-map to generate the navigation map.

As yet another embodiment, after the associated relation among the article category sub-map, the article-shelf distribution sub-map, and the article distribution sub-map is established, and after the navigation map is generated, the method may further include:
 sending the navigation map to the user terminal such that the user terminal outputs the category distribution sub-map after receiving the navigation map, output the article-shelf distribution sub-map corresponding the requested article when receiving the output request of the article shelf for any article category in the category distribution sub-map, and output the article distribution sub-map corresponding to the requested article shelf when receiving the output request of the article for any article shelf in the article-shelf distribution sub-map.

Figure 13:
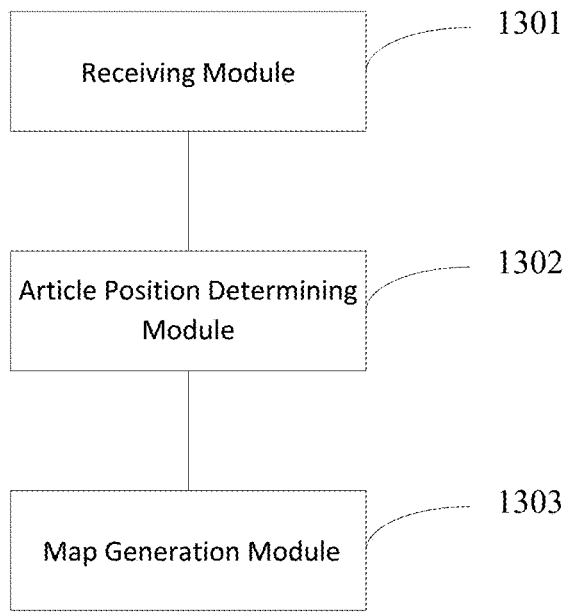
FIG. 13 is a schematic structural diagram of one embodiment of a map generation device according to an embodiment of the present application.

FIG. 13 is a schematic structural diagram of one embodiment of a map generation device according to an embodiment of the present application, the device may be arranged in the server-side in the map generation system shown in FIG. 1, as shown in FIG. 13, the apparatus may include:
 a receiving module 1301 which is configured to receive the scanning information sent by the handheld terminal;
 an article position determining module 1302 which takes as the position of the article the position of the wireless apparatus corresponding to the scanned article according to the scanning information; and
 a map generation module 1303 which is configured to generate the navigation map according to the position of each article.

As a possible implementation, the article position determining module is specifically configured to:
 searching the corresponding relation between different labels and different wireless apparatuses according to the scanning information, and taking as the position of the article the position of the wireless apparatus corresponding to the label of each scanned article.

As a further possible implementation, an apparatus information code is provided in each wireless apparatus; the apparatus information code may be the one-dimensional code, the two-dimensional code, or the three-dimensional code, and may be provided on the housing of the wireless apparatus.

The handheld terminal is still configured to scan the wireless apparatus corresponding to the article while scanning each article in the article shelf; the scanning information may further include the apparatus information code, the article information code and/or the label information code;
 the article position determining module is specifically configured to:
 take as the position of the scanned article the position of the wireless apparatus corresponding to the apparatus information code according to the apparatus information code in the scanning information.

As yet another embodiment, the device may further include:

an article shelf position determining module which is configured to determine the position of the article shelf according to the position of each wireless apparatus.

The map generation module is specifically configured to: draw first the article shelf and then the article in the article shelf so as to draw the navigation map according to the position of each article and the position of the article shelf.

As yet another embodiment, the device may further include:
a position acquisition module which is configured to receive the position of the article shelf passage sent by the handheld terminal; wherein, the position of the article shelf passage is the position of the handheld terminal obtained when the handheld terminal does not scan, which is positioned by the handheld terminal according to the wireless signal of the wireless apparatus received when the scanning is not performed and according to the position of the wireless apparatus;
as yet another embodiment, the device may further include:
a passage position determining module which is configured to receive the wireless signal of the wireless apparatus sent by the handheld terminal and received when the scanning is not performed, and position as the position of the article shelf passage the position of the handheld terminal obtained when the handheld terminal does not scan, according to the wireless signal of the wireless apparatus received when the handheld terminal does not scan, and according to the position of the wireless apparatus;
wherein, in still another embodiment, the map generation module is specifically configured to determine the boundaries of the navigation map, and generate the navigation map within the boundaries of the navigation map according to the position of each article shelf, the position of each article, the position of each article shelf passage and the position of the indoor passage.

Wherein, the position of the wireless apparatus may be arranged in advance, and may also be obtained through the calculation.

As a further embodiment, the wireless apparatus in the system may include the first class apparatus and the second class apparatus, a position of the first class apparatus is known.

The device may further include:
a first apparatus position determining module is configured to take as the known apparatus the first class apparatus and/or the second class apparatus of which the position has been determined, and position a position of the second class apparatus of which any one position is not determined, according to a position of the known apparatus and according to the wireless signal received by the known apparatus and sent by the second class apparatus of which any one position is not determined.

Wherein, the wireless signal received by the known apparatus and sent by the second class apparatus of any which the position is not determined may be uploaded by the first control apparatus. Therefore, the first apparatus position determining module is specifically configured to position the position of the second class apparatus of any which the position is not determined, according to the wireless signal uploaded by the first control apparatus, received by the known apparatus and sent by the second class apparatus of any position is not determined, and according to the position of the known apparatus.

As a further embodiment, the map generation system may further include the first control apparatus, the first class apparatus and the second class apparatus are configured to upload to the first control apparatus the received wireless signal, respectively; the first control apparatus is configured to upload to the server-side the wireless signals received by the first class apparatus and the second class apparatus, respectively;
the position determining module of the first class apparatus is specifically configured to take as the known apparatus the first class apparatus and/or the second class apparatus of which the position has been determined, determine the wireless signal received by the known apparatus and sent by the second class apparatus of any which the position is not determined, from the wireless signal received by the first class apparatus and the second class apparatus respectively, and position the position of the second class apparatus of any which the position is not determined, according to the position of the known apparatus and according to the wireless signal received by the known apparatus and sent by the second apparatus of any which the position is not determined.

As a further embodiment, when the map generation system may further include the second control apparatus, the second control apparatus is configured to upload to the server-side the wireless signal received by the second control apparatus and sent by the wireless apparatus;
the device may further include:
a position determining module of the second class apparatus which is configured to position the position of the wireless apparatus according to the wireless signal received by the second control apparatus and sent by the wireless apparatus and according to the position of the second control apparatus.

Wherein, as yet another embodiment, the map generation module may be specifically configured to:
generate the category distribution sub-map according to the position of each article and the category of each article; wherein, the article category may be divided according to the actual demand and the article attribute. In the place where the articles are placed, the articles are usually arranged according to the article category, so the article category distribution sub-map may be generated first;
draw the article shelf and the article shelf passage according to a position of the article shelf and the position of the article shelf passage, for each article category in the article category distribution sub-map; and generate the article-shelf distribution sub-map;
generate the article distribution sub-map corresponding to each article shelf, according to the position of each article, for each article shelf in the shelf distribution sub-map;
establish the associated relation among the article category distribution sub-map, the shelf distribution sub-map, and the article distribution sub-map to generate the navigation map.

In this case, the device may further include:
a map output module which is configured to send the navigation map to the user terminal such that the user terminal outputs the article category sub-map after receiving the navigation map, outputs the article distribution sub-map corresponding to the requested article category when receiving the output request of the shelf for any article category in the article category sub-map, and outputs the article distribution sub-map corresponding to the requested article shelf when receiving the output request of the article for any article shelf in the shelf distribution sub-map.

In one practical application, the server-side in the map generation system may include the proximal server and the remote server, and the map generation apparatus described in FIG. 13 may be specifically arranged in the remote server.

The receiving module is specifically configured to receive the scanning information sent by the handheld terminal through the proximal server.

An embodiment of the present application also provides a map generation device which is specifically applied to a handheld terminal in a map generation system shown in FIG. 1, the device may include:
- a scanning module which is configured to scan each article in an article shelf; and
- an information sending module which is configured to send scanning information to a server-side; the server-side takes as a position of the article a position of a wireless apparatus corresponding to the scanned article according to the scanning information, and generate a navigation map according to the position of each article.

as yet another embodiment, the device may further include:
- a positioning module which is configured to upload to the server-side a wireless signal of the wireless apparatus received when scanning is not performed, position as a position of an article shelf passage a position of the handheld terminal obtained when the handheld terminal does not scan, according to according to the wireless signal of the wireless apparatus received when the scanning is not performed and according to the position of the wireless apparatus, and generate the navigation map according to the position of each article and the position of each article shelf passage.

As yet another embodiment, the device may further include:
- a position sending module which is configured to upload to the server-side the wireless signal of the wireless apparatus received when the scanning is not performed, and position as a position of the article shelf passage a position of the handheld terminal obtained when the handheld terminal does not scan, according to the wireless signal of the wireless apparatus received when the handheld terminal does not scan and according to the position of the wireless apparatus, and generate the navigation map according to the position of each article and the position of each article shelf passage.

Figure 14:
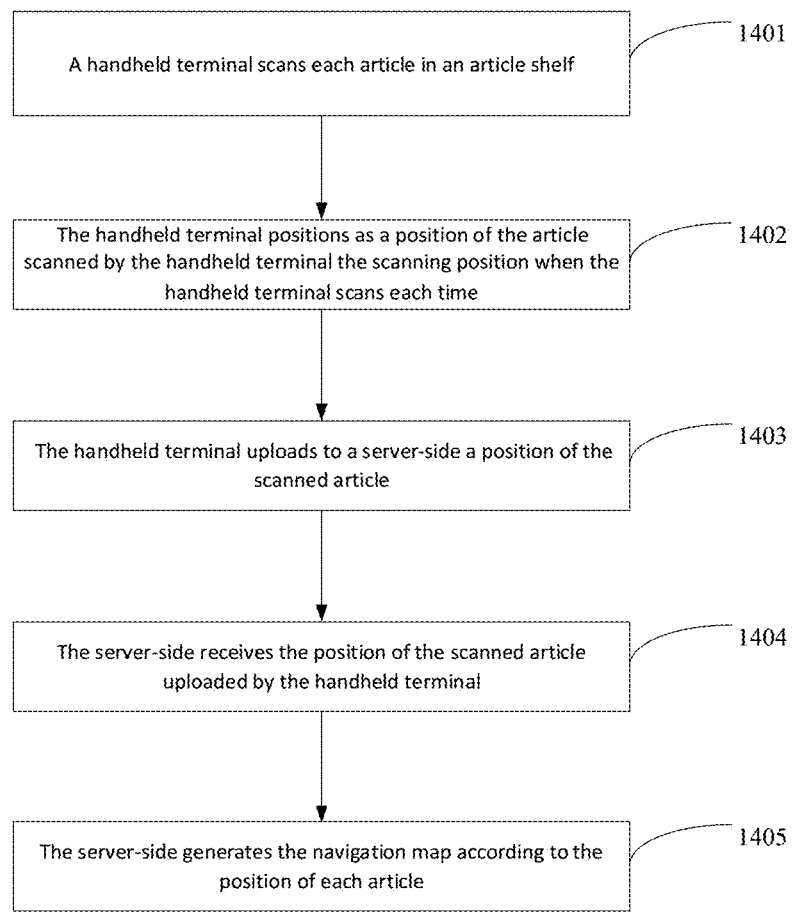
FIG. 14 is a flow chart of another embodiment of a map generation method according to an embodiment of the present application.

Corresponding to the map generation system provided by the embodiment shown in FIG. 7, FIG. 14 is a flow chart of another embodiment of a map generation method provided by the embodiment of the present application, the method may include the following steps:
- in step 1401: the handheld terminal scans each article in the article shelf;
- in step 1402: the handheld terminal positions as the position of the article scanned by the handheld terminal the scanning position when the handheld terminal scans each time, according to the wireless signal of the wireless apparatus received at each time of the scanning and according to the position of the wireless apparatus;
- in step 1403: the handheld terminal uploads to the server-side the position of the scanned article;
- in step 1404: the server-side receives the position of the scanned article uploaded by the handheld terminal;
- in step 1405: the server-side generates the navigation map according to the position of each article.

In the present embodiment, the scanning position when the handheld terminal scans the article may be taken as the position of the scanned article, and the navigation map may be generated after the position of each article is determined. Through the map generation system of the present embodiment, the automatic generation of the navigation map is realized, and the accuracy of the navigation map is improved without manual drawing.

As a further embodiment, each article in the article shelf corresponds to one wireless apparatus;
- the handheld terminal positions the scanning position when the handheld terminal scans each time, according to the wireless signal of the wireless apparatus received each time of scanning, and according to the position of the wireless apparatus, which may include:
- determining the wireless apparatus closest to the handheld terminal according to the wireless signal of the wireless apparatus received when the handheld terminal scans each time; and
- positioning as the scanning position when the handheld terminal scans each time the position of the closest wireless apparatus.

Wherein, as yet another embodiment, the device may further include:
- the handheld terminal positions as the position of the article shelf passage the position of the handheld terminal obtained when the handheld terminal does not scan, according to the wireless signal of the wireless apparatus received when the handheld terminal does not scan and according to the position of the wireless apparatus;
- the handheld terminal uploads to the server-side the position of the article shelf passage;
- the server-side generates the navigation map according to the position of each article, which may include:
- determining, by the server-side, the position of each article shelf according to the position of each wireless apparatus; and
- generating the navigation map according to the position of each article shelf, the position of each article and the position of each article shelf passage.

The article shelf is drawn by combining the article shelf passage to be able to improve the drawing accuracy of the article shelf.

Wherein, in yet another embodiment, the wireless apparatus may include a first class apparatus and a second class apparatus, a position of the first class apparatus is known.

The method may further include:
- the server-side takes as the known apparatus the first class apparatus and/or the second class apparatus of which the position is determined;
- the server-side positions a position of the second class apparatus of any which the position is not determined, according to a position of the known apparatus and according to the wireless signal received by the known apparatus and sent by the second class apparatus of any which the position is not determined;
- the server-side determines the position of each article shelf according to the position of the second class wireless apparatus;
- the handheld terminal positions the scanning position when the handheld terminal scans each time, according to the wireless signal of the wireless apparatus received at each time of scanning, and according to the position of the wireless apparatus, which may include:

the handheld terminal positions the scanning position when the handheld terminal scans each time, according to the wireless signal of the wireless apparatus received at each time of scanning, and according to the position of the first class apparatus and/or the second class apparatus obtained from the server-side.

Therefore, before the server-side receives the position of the scanned article uploaded by the handheld terminal, the method may further include:

the server-side requests the obtained position of the wireless apparatus to be sent to the handheld terminal obtained when receiving the obtained request of the first position of the handheld terminal. The handheld terminal specifically positions the scanning position when the handheld terminal scans each time, according to the wireless signal(s) of the first class apparatus and/or the second class apparatus received at each time of scanning, and according to the position(s) of the first class apparatus and/or the second class apparatus requested to be obtained by the server-side.

Wherein, the second class apparatus is specifically arranged in each article shelf;

the server-side determines the position of each article shelf according to the position of each wireless apparatus, which specifically is as follows:

the server-side determines the position of each article shelf according to the position of the second class apparatus;

Wherein, the first class apparatus and the second class apparatus are respectively configured to upload the received wireless signal to the first control apparatus when the map generation system may further include a first control apparatus;

the first control apparatus is configured to upload to the server-side the wireless signals received by the first class apparatus and the second class apparatus, respectively;

the server-side positions the position of the second class apparatus of any which the position is not determined, according to the position of the known apparatus and according to the wireless signal received by the known apparatus and sent by the second class apparatus of any which the position is not determined, which may be as follows:

determining the wireless signal received by the known apparatus and sent by the second class apparatus of any which the position is not determined, according to the wireless signal uploaded by the first control apparatus and received by the first class apparatus and the second class apparatus respectively; and positioning the position of the second class apparatus of any which the position is not determined, according to the position of the known apparatus and according to the wireless signal received by the known apparatus and sent by the second class apparatus of any which the position is not determined.

Wherein, as a further embodiment, the server generates the navigation map according to the position of each article shelf, the position of each article and the position of each article shelf passage, which is specific as follows:

determining the boundaries of the navigation map, and generating the navigation map within the boundaries of the navigation map according to the position of each article shelf, the position of each article, the position of each article shelf passage and the position of an indoor passage.

Wherein, as a further embodiment, the server-side generates the navigation map according to the position of each article shelf, the position of each article and the position of each article shelf passage, which may include:

generating a category distribution sub-map according to the position of each article and the category of each article; wherein the article category may be divided according to the actual demand and the article attribute. In the place where the article is placed, the article is usually arranged according to the article category, so an article category distribution sub-map may be generated first.

drawing the article shelf and the article shelf passage, according to the position of the article shelf and the position of the article shelf passage, for each article category in the category distribution sub-map, and generating an article-shelf distribution sub-map corresponding to each article category;

generating an article distribution sub-map corresponding to each article shelf, according to the position of each article, for each article shelf in the article-shelf distribution sub-map;

establishing an associated relation among the category distribution sub-map, the article-shelf distribution sub-map, and the article distribution sub-map to generate the navigation map.

As the article category may be further divided, each article category may not only correspond to one article shelf, and each article shelf may also correspond to a plurality of the article categories.

Therefore, the article shelf and the article shelf passage are drawn according to the position of the article shelf and the position of the article shelf passage, for each article category in the article category distribution sub-map, and the article-shelf distribution sub-map is generated, which may be as follows:

drawing the article shelf and the article shelf passage according to the position of the article shelf and the position of the article shelf passage, for each article category in the article category distribution sub-map, and generating the article-shelf distribution sub-map.

Wherein the navigation map boundary may be determined first when the navigation map is generated; wherein the boundaries of the navigation map may be determined according to the building sizes marked on an interior architectural drawing;

therefore, specifically, the article category distribution sub-map is generated according to the position of each article and the article category of each article within the boundaries of the navigation map.

As a further embodiment, the map generation system may further include a second control apparatus, the second control apparatus is configured to upload to the server-side the wireless signal received by the second control apparatus and sent by the wireless apparatus;

before the server-side receives the position of the scanned article uploaded by the handheld terminal, the method may further include:

positioning the position of the wireless apparatus according to a wireless signal uploaded and received by the second control apparatus and sent by the wireless apparatus and according to the position of the second control apparatus; and determining the position of each article shelf according to the position of each wireless apparatus.

the server-side generates the navigation map according to the position of each article, which may be as follows:

generating the navigation map according to the position of the article and the position of each article shelf.

Figure 15:
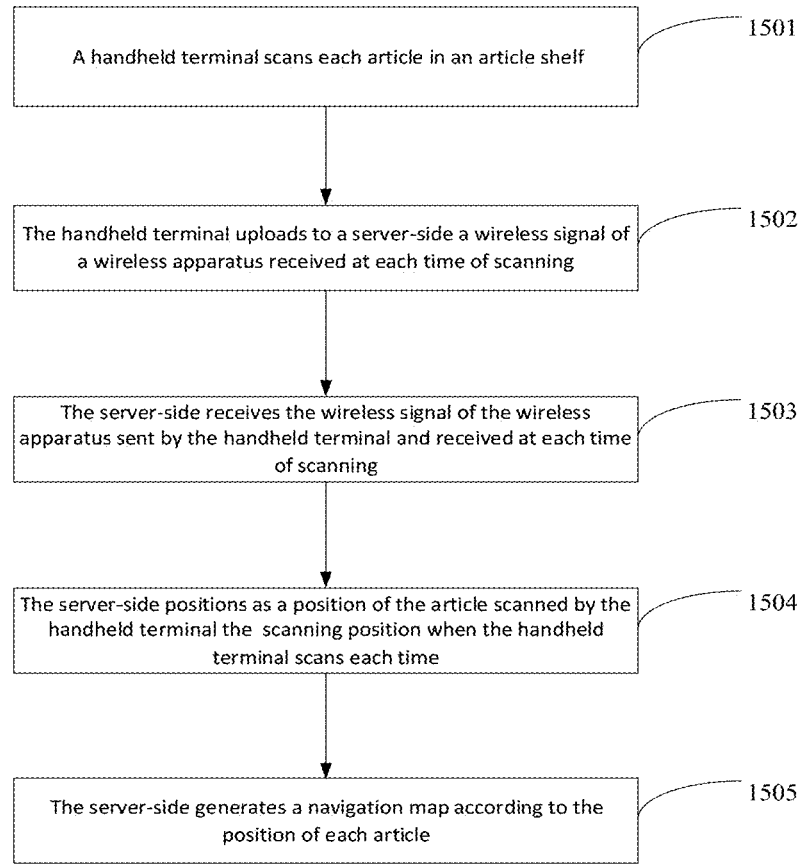
FIG. 15 is a flow chart of another embodiment of a map generation method according to an embodiment of the present application.

Corresponding to the map generation system shown in FIG. 9, FIG. 15 is a flow chart of another embodiment of a map generation method provided by the embodiment of the present application, the method may include the following steps:

in step 1501: the handheld terminal scans each article in the article shelf;

in step 1502: the handheld terminal uploads to the server-side the wireless signal of the wireless apparatus received at each time of scanning;

in step 1503: the server-side receives the wireless signal of the wireless apparatus sent by the handheld terminal and received at each time of scanning;

in step 1504: the server-side positions as the position of the article scanned by the handheld terminal the scanning position when the handheld terminal scans each time, according to the wireless signal of the wireless apparatus received when the handheld terminal scans each time and according to the position of the wireless apparatus;

in step 1505: the server-side generates the navigation map according to the position of each article.

In the present embodiment, the handheld terminal uploads the received wireless signal to the server-side, the server-side positions the scanned position of the handheld terminal, the handheld terminal and the server-side may establish a long connection therebetween and transfer a signal in real time. Through the present embodiment, the automatic generation of the navigation map is realized, and the accuracy of the navigation map is improved without manual drawing.

Figure 16:
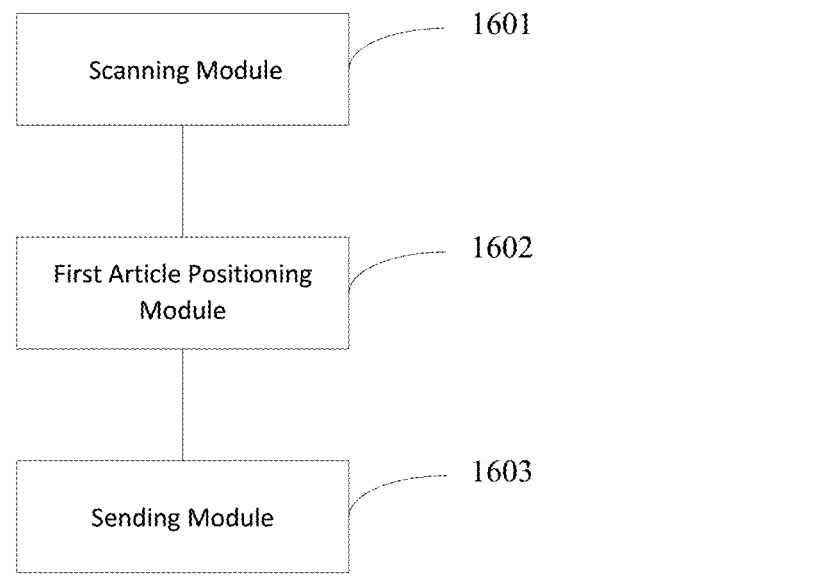
FIG. 16 is a schematic structural diagram of another embodiment of a map generation device according to an embodiment of the present application.

An embodiment of the present application also provides another embodiment of a map generation device which is specifically arranged in a handheld terminal in a map generation system shown in FIG. 7, as shown in FIG. 16, the device may include:

a scanning module 1601 which is configured to scan each article in an article shelf;

a first article positioning module 1602 which is configured to position as a position of the article scanned by a handheld terminal the scanning position when the handheld terminal scans each time, according to a wireless signal of a wireless apparatus received at each time of scanning and according to a position of the wireless apparatus; and a sending module 1603 which is configured to upload to a server-side the position of the article, wherein the server-side generates a navigation map according to the position of each article.

Wherein, as a further embodiment, each article in an article shelf corresponds to one wireless apparatus;

the first article positioning module is specifically configured to determine the wireless apparatus closest to the handheld terminal according to the wireless signal of the wireless apparatus received at each time of scanning, and position the position closest to the wireless apparatus as the scanning position when the handheld terminal scans.

Wherein, in still another embodiment, the first article positioning module is further configured to position as a position of an article shelf passage a position of the handheld terminal obtained when the handheld terminal does not scan, according to the wireless signal of the wireless apparatus received when the scanning is not performed and according to the position of the wireless apparatus;

the sending module is further configured to upload to the server-side a position of the article shelf passage, and the server-side generates the navigation map according to the position of the article shelf, the position of each article, and the position of each article shelf passage. Wherein, the server-side determines the position of the article shelf according to the position of each wireless apparatus.

Figure 17:
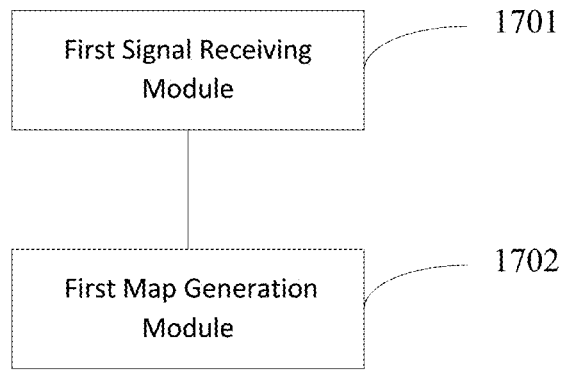
FIG. 17 is a schematic structural diagram of another embodiment of a map generation device according to an embodiment of the present application.

The present application also provides another embodiment of a map generation device which is specifically arranged in a server-side in a map generation system shown in FIG. 7, as shown in FIG. 17, the device may include:

a first signal receiving module 1701 which is configured to receive a position of an scanned article uploaded by a handheld terminal, wherein the position of the scanned article is the scanned position when the handheld terminal scans each time, which is positioned and obtained by the handheld terminal, according to a wireless signal of the wireless apparatus received at each time of scanning, and according to a position of the wireless apparatus;

a first map generation module 1702 which is configured to generate a navigation map according to the position of each article.

Wherein, as still another embodiment, the first signal receiving module is further configured to receive a position of an article shelf passage uploaded by the handheld terminal;

the device may further include:

a first article shelf positioning module which is configured to determine the position of each article shelf according to a position of each wireless apparatus;

the first map generation module is specifically configured to generate the navigation map according to the position of each article shelf, the position of each article and an article position of each article shelf passage.

Wherein, in yet another embodiment, the wireless apparatus in a shopping guide generation system may include a first class apparatus and a second class apparatus, a position of the first class apparatus is known;

the device may further include:

a first apparatus positioning module which is configured to take as a known apparatus the first class apparatus and/or the second class apparatus of which the position is determined, and position a position of the second class apparatus of which any one position is not determined, according to a position of the known apparatus and according to the wireless signal received by the known apparatus and sent by the second class apparatus of which any one position is not determined;

the handheld terminal specifically positions as the position of the article scanned by the handheld terminal the scanned position when the handheld terminal scans each time, according to the wireless signal of the first class apparatus and/or the second class apparatus received at each time of scanning and according to the position of the first class apparatus and/or the second class apparatus obtained from the server-side, and uploads to the server-side the position of the article.

The article shelf positioning module is specifically configured to determine the position of each article shelf according to the position of the second class apparatus.

As a further embodiment, when the shopping guide generation system may further include a first control apparatus, the first class apparatus and the second class apparatus are configured to upload to the first control apparatus the received wireless signal, respectively; the first control apparatus is configured to upload to the server-side the wireless signals received by the first class apparatus and the second class apparatus, respectively;

the first apparatus positioning module is specifically configured to determine the wireless signal received by the known apparatus and sent by the second class apparatus of any which the position is not determined, according to the wireless signal received by the first class apparatus and the second class apparatus respectively, and position the position of the second class apparatus of any which the position is not determined, according to the position of the known apparatus and the wireless signal received by the known apparatus and sent by the second class apparatus of any which the position is not determined.

As yet another embodiment, the first map generation module is specifically configured to:

generate an article category distribution sub-map according to an article position of each article and the category of each article;

draw the article shelf and the article shelf passage, according to the position of the article shelf and the position of the article shelf passage, for each article category in the category distribution sub-map, and generate an article-shelf distribution sub-map corresponding to each article category;

generate an article distribution sub-map corresponding to each article shelf, according to the position of each article, for each article shelf in the article-shelf distribution sub-map;

establish an associated relation among the article category sub-map, the article-shelf distribution sub-map, and the article distribution sub-map to generate the navigation map.

In one practical application, the map generation apparatus shown in FIG. 17 may be specifically arranged in a remote server in the server-side in the shopping guide generation system;

the first signal receiving module is specifically configured to receive the position of the scanned article uploaded by the handheld terminal.

Figure 18:
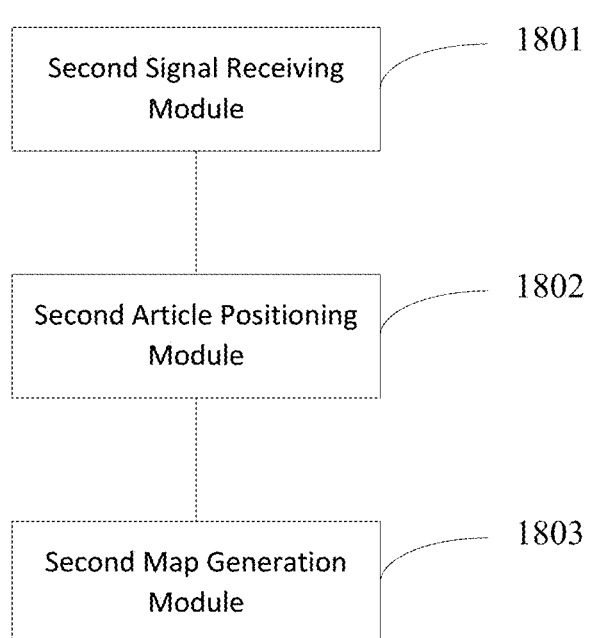
FIG. 18 is a schematic structural diagram of another embodiment of a map generation device according to an embodiment of the present application.

The present application also provides another embodiment of a map generation device which is specifically arranged in a handheld terminal in a map generation system shown in FIG. 9, as shown in FIG. 18, the device may include:

a second signal receiving module 1801 which is configured to receive a wireless signal of a wireless apparatus sent by the handheld terminal and received at each time of scanning;

a second article positioning module 1802 which is configured to position as a position of the article scanned by the handheld terminal the scanning position when the handheld terminal scans each time, according to the wireless signal of the wireless apparatus received when the handheld terminal scans each time, and according to a position of the wireless apparatus; and a second map generation module 1803 which is configured to generate a navigation map according to the position of each article.

As a further embodiment, the second signal receiving module is further configured to receive the wireless signal of the wireless apparatus received when the handheld terminal does not scan;

the device may further include:

a second article shelf positioning module which is configured to position as a position of an article shelf passage a position of the handheld terminal obtained when the handheld terminal does not scan, according to the wireless signal of the wireless apparatus received when the handheld terminal does not scan and according to the position of the wireless apparatus.

The second map generation module is specifically configured to generate the navigation map according to the position of each article shelf, the position of each article and the position of each article shelf passage.

Wherein, in yet another embodiment, the wireless apparatus may include a first class apparatus and a second class apparatus, the device may further include:

a second apparatus positioning module which is configured to take as a known apparatus the first class apparatus and/or the second class apparatus of which the position is determined, and position a position of the second class apparatus of which any one position is not determined, according to a position of the known apparatus and according to the wireless signal received by the known apparatus and sent by the second class apparatus of which any one position is not determined;

The second article-shelf positioning module is specifically configured to determine the position of each article shelf according to the position of the first class apparatus and/or the second class apparatus.

The first class apparatus may be arranged in the same indoor position, the second class apparatus may be arranged in the article shelf, as the article shelf may be moved, the position of the second class apparatus may be positioned according to the first class apparatus of which the position is constant. The server-side may therefore determine the position of each article shelf, according to the position of the second class apparatus.

Wherein, in a further embodiment, in order to facilitate the server-side to obtain the wireless signal of the wireless apparatus, the map generation system may further include a third control apparatus, the third control apparatus is configured to upload to the server-side the wireless signal received by the first class apparatus and the second class apparatus respectively.

the second apparatus positioning module is specifically configured to determine the wireless signal received by the known apparatus and sent by the second class apparatus of any which the position is not determined, according to the wireless signal received by the first class apparatus and the second class apparatus respectively, and position the position of the second class apparatus of any which the position is not determined, according to the position of the known apparatus and the wireless signal received by the known apparatus and sent by the second class apparatus of any which the position is not determined.

Figure 19:
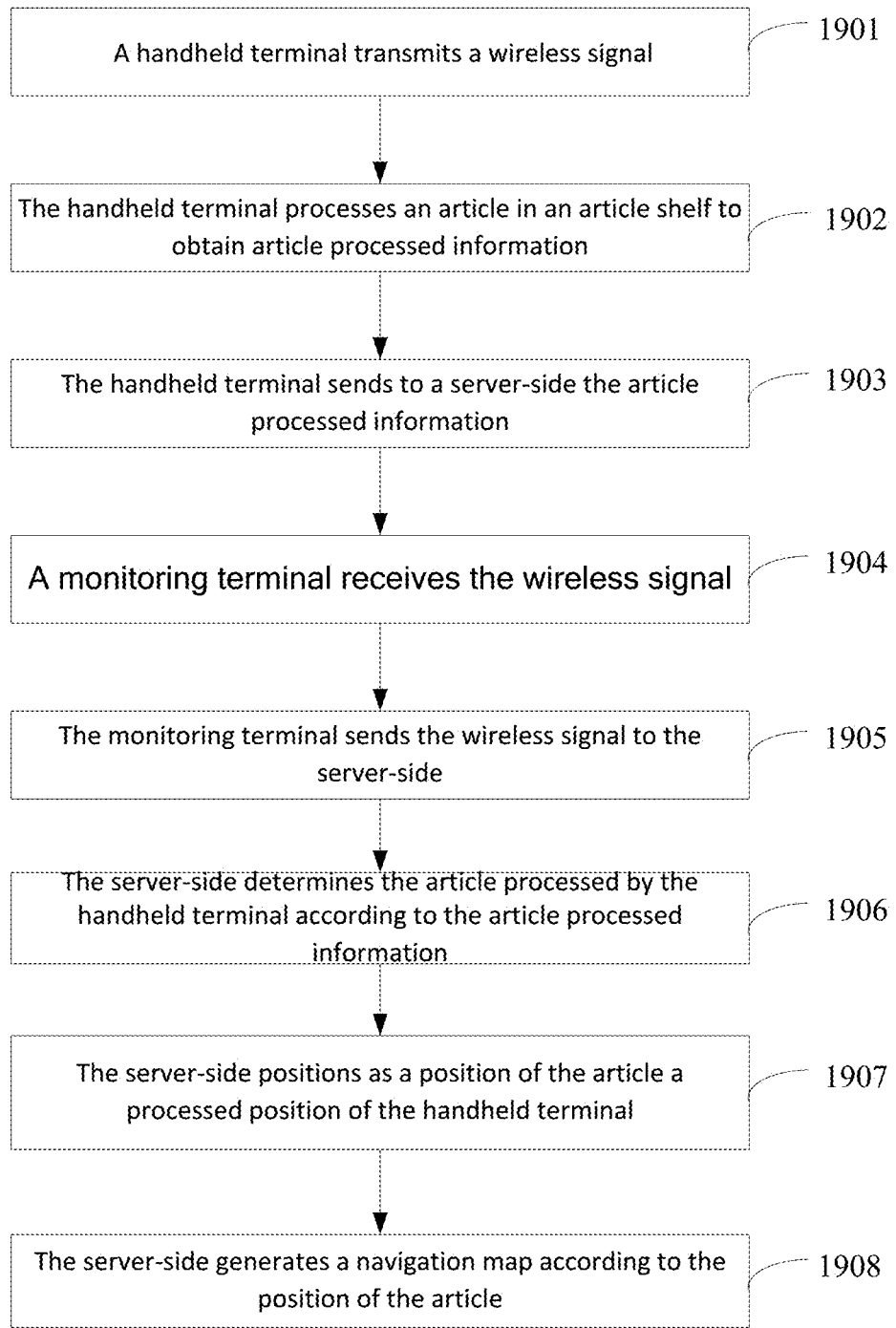
FIG. 19 is a flow chart of another embodiment of a map generation method according to an embodiment of the present application.

In one practical application, the map generation apparatus shown in FIG. 18 may be specifically arranged in a remote server in the server-side in a shopping guide generation system;

the second signal receiving module is specifically configured to receive a wireless signal of a wireless apparatus sent by the handheld terminal through a proximal server and received at each time of the scanning;

Corresponding to the map generation system provided by the embodiment shown in FIG. 11, FIG. 19 is a flow chart of another embodiment of a map generation method provided by the embodiment of the present application, the method may include the following steps:

in step 1901: the handheld terminal transmits the wireless signal;

in step 1902: the handheld terminal processes the article in the article shelf to obtain an article processed information;

the article processed information includes article identification information;

in step 1903: the handheld terminal sends to the server-side the article processed information;

in step 1904: a monitoring terminal receives the wireless signal;

in step 1905: the monitoring terminal sends the wireless signal to the server-side;

in step 1906: the server-side determines the article processed by the handheld terminal according to the article processed information;

in step 1907: the server-side positions as the position of the article the processed position of the handheld terminal, according to the wireless signal transmitted when the handheld terminal processes the article, and according to a position of the corresponding monitoring terminal; and in step 1908: the server-side generates the navigation map according to the position of the article.

Wherein, the handheld terminal processes the article in the article shelf to obtain the scanned article processed information, which may be as follows:

the article in the shelf article is scanned to obtain the article processed information, which is also the scanning information obtained by scanning.

It is also possible to collect the article in the article shelf to obtain the article processed information, the article processed information is an image of the article;

At this time, the server-side is further configured to identify the image of the article to determine article identification information of the article.

This may also be as follows:

collecting the article in the article shelf to obtain the image of the article; and identifying the image of the article to obtain article processed information, which may be article identification information for the article.

This may also be as follows:

the handheld terminal receives the specific signal transmitted by a label corresponding to the article in the article shelf to obtain the article processed information, which is a label information code.

The server-side may find the corresponding article information code according to the label information code to determine the article identification information of the article.

Wherein, the specific signal may be a Near Field Communication (NFC) signal. A NFC chip may be arranged both in the handheld terminal and a label.

Some embodiments may also include:

the server-side positions as the position of an article shelf passage the unprocessed position by the handheld terminal, according to the wireless signal transmitted when the handheld terminal does not process the article, and according to the position of the corresponding monitoring terminal;

therefore, the server-side generates the navigation map according to the position of the article, which may include:

generating the navigation map according to the position of the article and the position of the article shelf passage.

In some embodiments, the server-side generates the navigation map according to the position of the article and the position of the article shelf passage, which is specific as follows:

determining the boundaries of the navigation map; and generating the navigation map within the boundaries of the navigation map according to the position of the article and the position of the article shelf passage.

In some embodiments, the server-side generates the navigation map according to the position of the article and the position of the article shelf passage, which is specific as follows:

generating a category distribution sub-map according to the position of the article and the category of the article;

drawing the article shelf according to the position of the article, and drawing the article shelf passage according to the position of the article shelf passage, for each article category in the category distribution sub-map, to generate an article-shelf distribution sub-map corresponding to each article category;

generating an article distribution sub-map corresponding to each article shelf, according to the position of the article, for each article shelf in the shelf distribution sub-map; and establishing an associated relation among a category sub-map, the article-shelf distribution sub-map, and the article distribution sub-map to generate the navigation map.

In some embodiments, the method may further include:

the server-side is further configured to send the navigation map to a user terminal such that the user terminal outputs the category sub-map after receiving the navigation map, output the corresponding article-shelf distribution sub-map when receiving the output request of the article shelf for any article category in the category sub-map, and output the corresponding article distribution sub-map when receiving the output request of the article for any article shelf in the article shelf distribution sub-map.

In some embodiments, the method may further include:

sending the navigation map to the user terminal for outputting the navigation map by the user terminal;

receiving a navigation request of the user terminal, wherein the navigation request includes article identification information of at least one target article;

searching a position of at least one target article according to the article identification information of at least one target article;

generating navigation prompt information according to the position of at least one target article and a position of the user terminal;

triggering the user terminal to output the navigation prompt information in the navigation map.

In some embodiments, the method may further include:

sending the navigation map to the user terminal for outputting the navigation map by the user terminal;

sending to the user terminal related recommendation information of the article matching the position of the terminal according to the position of the user terminal, to output the related recommendation information by the user terminal.

In some embodiments, the method may further include:

sending the navigation map to the user terminal for outputting the navigation map by the user terminal;

receiving an article search request for the user terminal, wherein the article search request includes article identification information of the article to be searched;

determining the position of the article to be searched according to the article identification information of the article to be searched;

triggering a user apparatus to output search prompt information at the position of the article to be searched in the navigation map.

Figure 20:
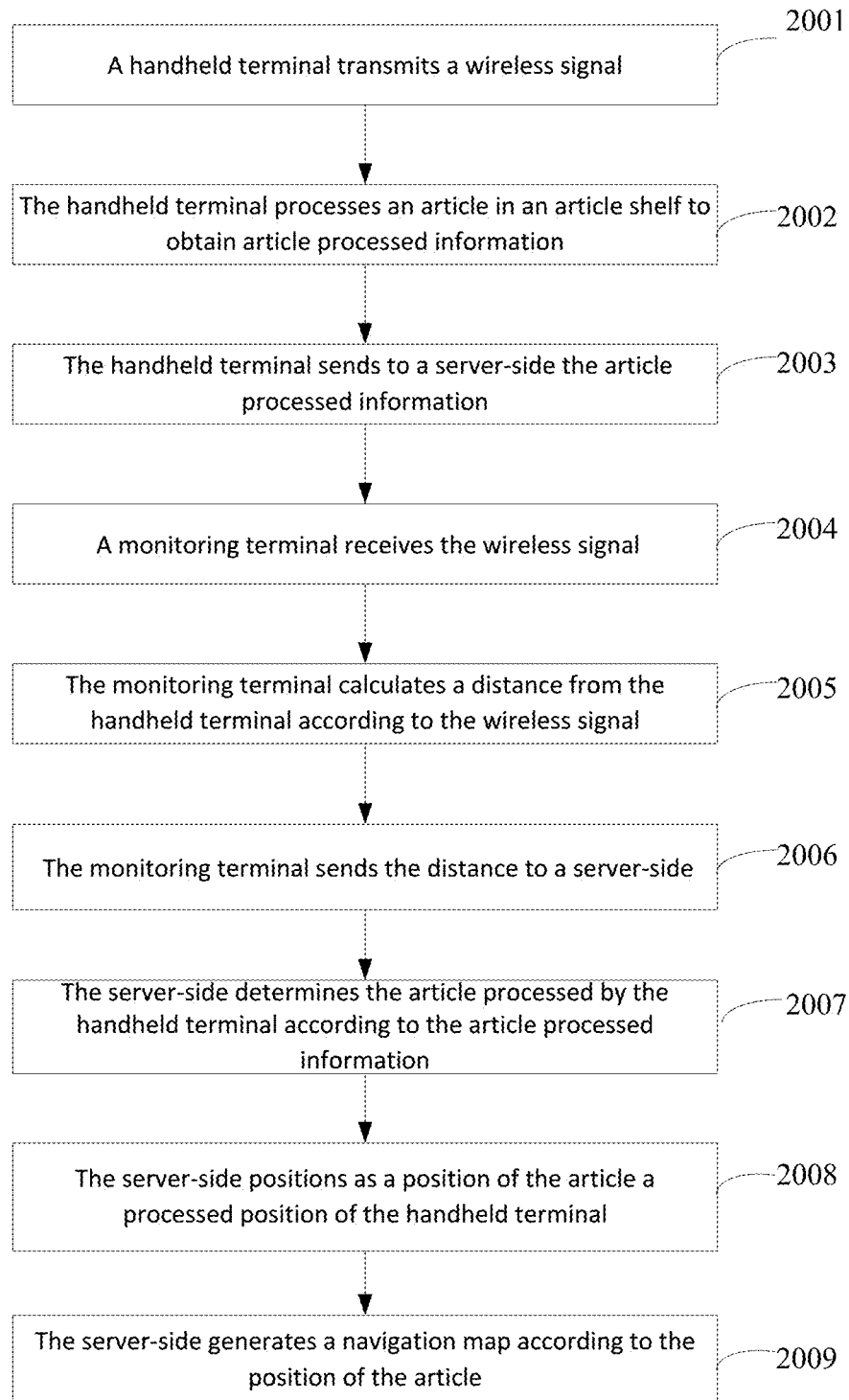
FIG. 20 is a flow chart of another embodiment of a map generation method according to an embodiment of the present application.

FIG. 20 is a flow chart of another embodiment of a map generation method provided by an embodiment of the present application, the method includes the following steps:

in step 2001: the handheld terminal transmits the wireless signal;

in step 2002: the handheld terminal processes the article in the article shelf to obtain the article processed information; the article processed information includes the article identification information;

in step 2003: the handheld terminal sends to the server-side the article processed information;

in step 2004: the monitoring terminal receives the wireless signal;

in step 2005: the monitoring terminal calculates a distance from the handheld terminal according to the wireless signal;

in step 2006: the monitoring terminal sends the distance to the server-side;

in step 2007: the server-side determines the article processed by the handheld terminal according to the article processed information;

in step 2008: the server-side positions as the position of the article the processed position of the handheld terminal, according to the distance corresponded when the handheld terminal processes the article, and according to the position of the monitoring terminal sending the distance; and in step 2009: the server-side generates the navigation map according to the position of the article.

The embodiment shown in FIG. 20 differs from the embodiment shown in FIG. 19 in that the monitoring terminal calculates the distance from the handheld terminal and uploads the distance to the server-side, the server-side positions the processed position of the handheld terminal according to the distance, etc. Other steps may be described in the above-described embodiments and will not be repeated here again.

Figure 21:
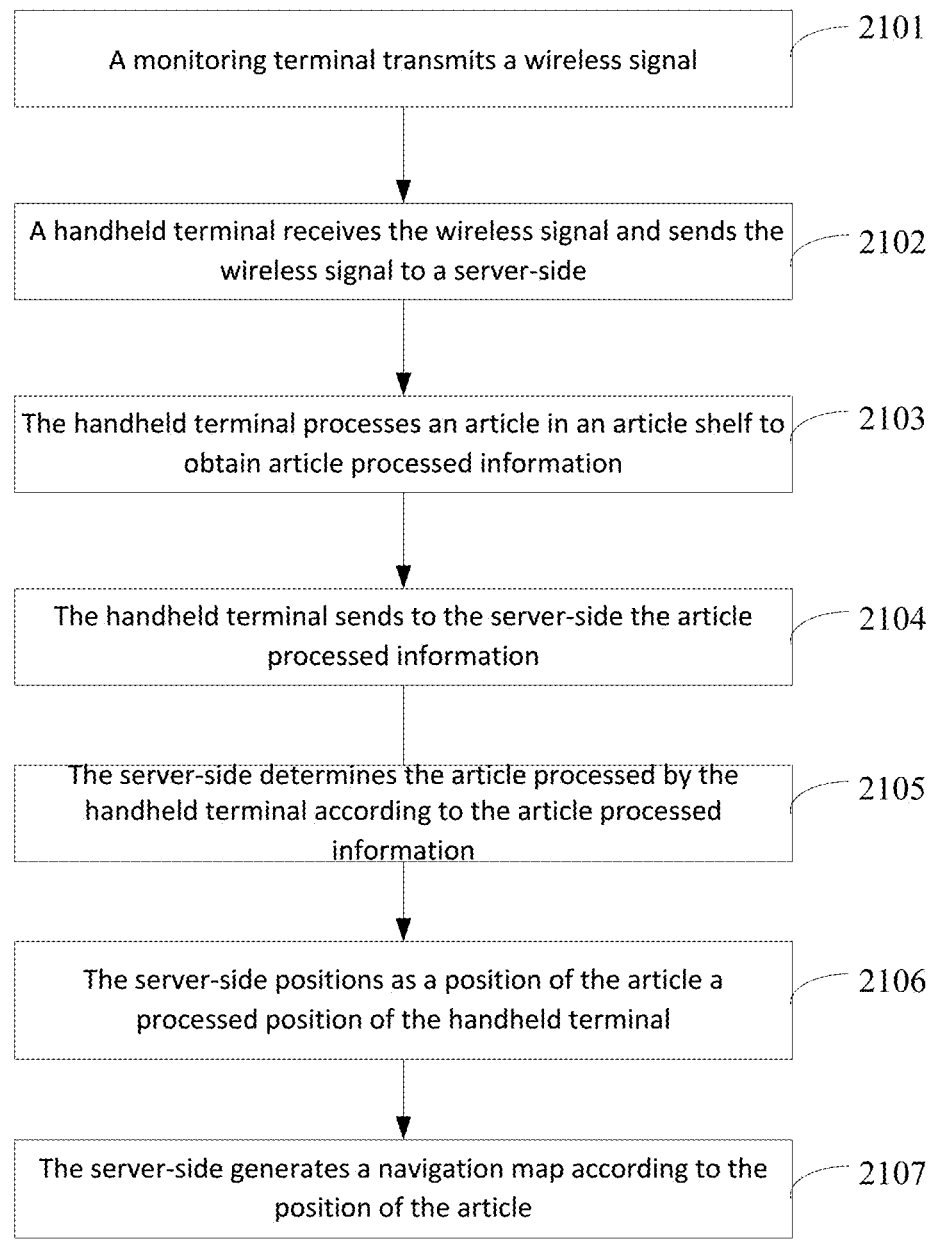
FIG. 21 is a flow chart of another embodiment of a map generation method according to an embodiment of the present application.

FIG. 21 is a flow chart of another embodiment of a map generation method provided by an embodiment of the present application, the method includes the following steps:

in step 2101: the monitoring terminal transmits the wireless signal;

in step 2102: the handheld terminal receives the wireless signal and sends the wireless signal to the server-side;

in step 2103: the handheld terminal processes the article in the article shelf to obtain the article processed information;

the article processed information may include the article identification information;

in step 2104: the handheld terminal sends to the server-side the article processed information;

in step 2105: the server-side determines the article processed by the handheld terminal according to the article processed information;

in step 2106: the server-side positions as the position of the article the processed position of the handheld terminal, according to the wireless signal received when the handheld terminal processes the article, and according to the position of the corresponding monitoring terminal;

in step 2107: the server-side generates the navigation map according to the position of the article.

The embodiment shown in FIG. 21 differs from the embodiment shown in FIG. 19 in that the handheld terminal receives the wireless signal transmitted by the monitoring terminal and sends the wireless signal to the server-side, other steps may be described in the above-described embodiments, which will not be repeated here again.

Figure 22:
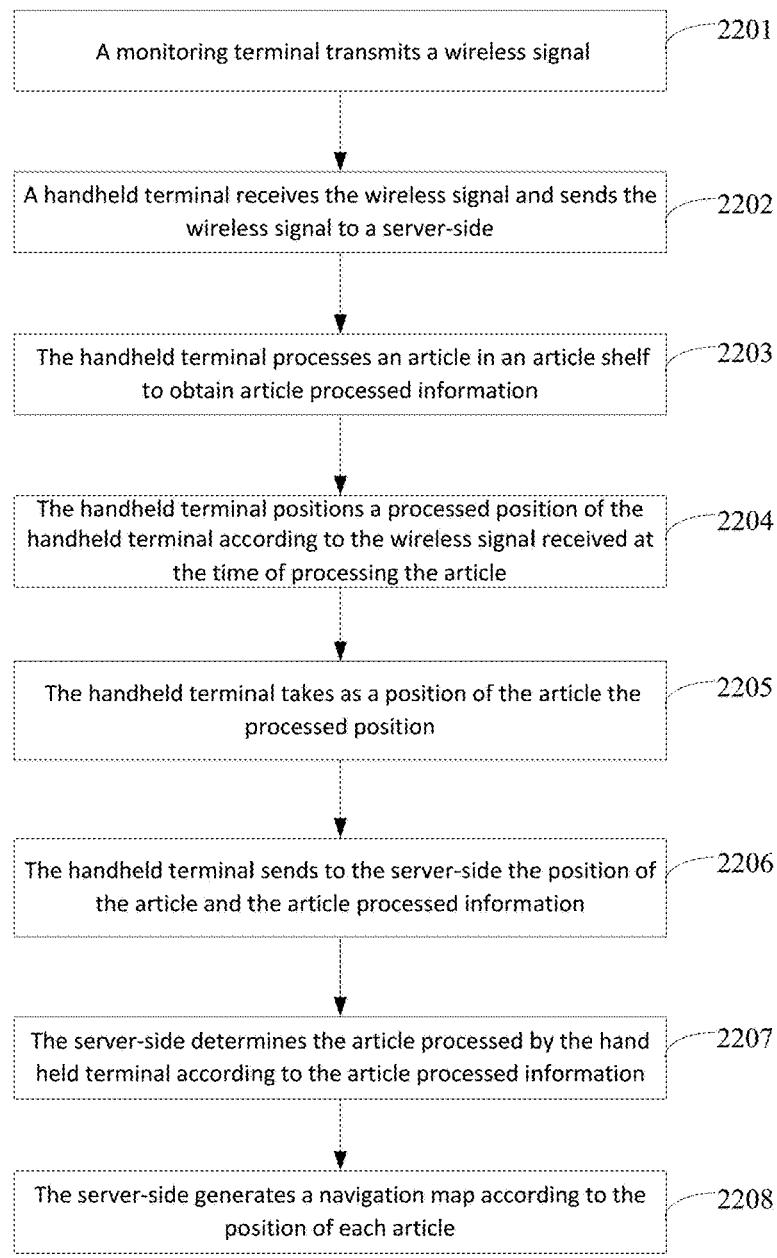
FIG. 22 is a flow chart of another embodiment of a map generation method according to an embodiment of the present application.

FIG. 22 is a flow chart of another embodiment of a map generation method provided by an embodiment of the present application, the method includes the following steps:

in step 2201: the monitoring terminal transmits the wireless signal;

in step 2202: the handheld terminal receives the wireless signal and sends the wireless signal to the server-side;

in step 2203: the handheld terminal processes the article in the article shelf to obtain the article processed information; the article processed information includes the article identification information;

in step 2204: the handheld terminal positions the processed position of the handheld terminal according to the wireless signal received at the time of processing the article and according to the position of the corresponding monitoring terminal;

in step 2205: the handheld terminal takes as the position of the article the processed position;

in step 2206: the handheld terminal sends to the server-side the position of the article and the article processed information;

in step 2207: the server-side determines the article processed by the hand held terminal according to the article processed information; and in step 2208: the server-side generates the navigation map according to the position of each article.

The embodiment shown in FIG. 22 differs from the embodiment shown in FIG. 21 in that the handheld terminal calculates the position of the article, and only uploads to the server-side the article position of the article, and the server-side may generate the navigation map according to the positions of the different articles, and realize automatic generation of the map, the specific calculation method and generation method may be described in the above-described embodiments, and will not be repeated here again.

Figure 23:
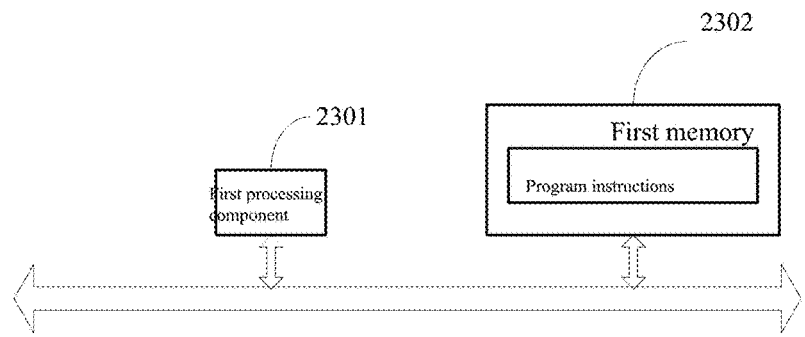
FIG. 23 is a schematic structural diagram of one embodiment of a server-side according to an embodiment of the present application.

In a possible design, as shown in FIG. 23, the embodiment of the present application also provides one embodiment of a server-side, the server-side includes a first processing component 2301 and a first memory 2302 connected to the first processing component 2301;

the first memory 2302 stores one or more sets of program instructions;

the first processing component 2301 is configured to call one or more sets of the program instructions of the first memory 2302 to perform the following operations:

receiving article processing information sent by a handheld terminal; wherein the article processing information is obtained by processing an article in an article shelf;

receiving a wireless signal sent by a monitoring terminal, wherein the wireless signal is transmitted by the handheld terminal;

determining the article processed by the handheld terminal according to the article processing information;

positioning as a position of the article the processed position of the handheld terminal, according to the wireless signal transmitted when the handheld terminal processes the article, and according to a position of a corresponding monitoring terminal; and generating a navigation map according to the position of the article.

Of course, the server-side may certainly also include other components, such as an input/output interface, a communication component, and the like.

Figure 24:
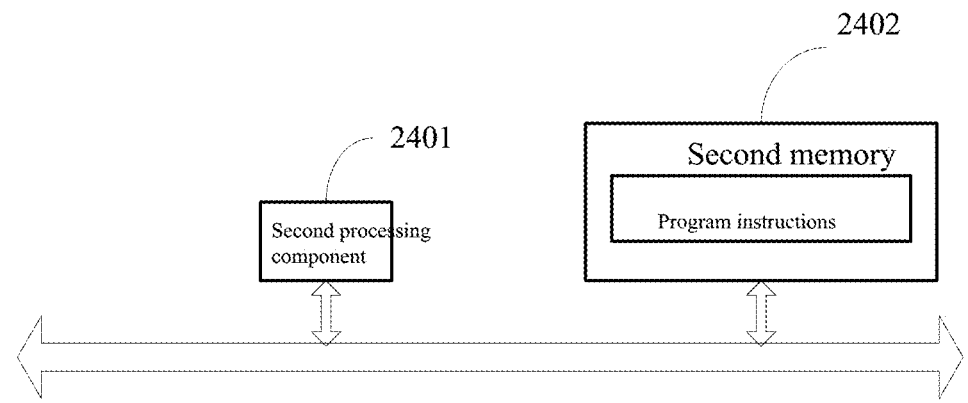
FIG. 24 is a schematic structural diagram of another embodiment of a server-side according to an embodiment of the present application.

In yet another possible design, as shown in FIG. 24, the embodiment of the present application also provides another embodiment of a server-side, the server-side includes a second processing component 2401 and a second memory 2402 connected to the second processing component 2401;
the second processing component 2401 is configured to call one or more sets of program instructions of the second memory 2402 to perform the following operations:
receiving article processed information sent by a handheld terminal; wherein the article processed information is obtained by scanning an article in an article shelf;
receiving a distance sent by a monitoring terminal; wherein the distance is the distance between the monitoring terminal and the handheld terminal, and calculated according to a wireless signal transmitted by the handheld terminal;
determining the article processed by the handheld terminal according to the article processed information;
positioning as a position of the article a processed position of the handheld terminal, according to the distance corresponded when the handheld terminal processes the article, and according to the position of the monitoring terminal sending the distance;
generating a navigation map according to the position of the article.

Of course, the server-side may certainly also include other components, such as an input/output interface, a communication component, and the like.

Figure 25:
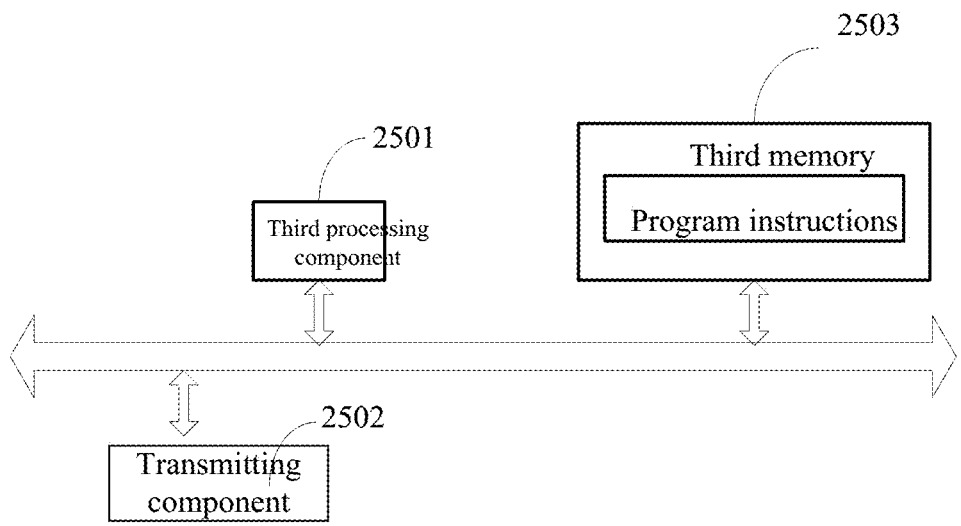
FIG. 25 is a schematic structural diagram of one embodiment of a handheld terminal according to an embodiment of the present application.

The embodiment of the present application also provides a handheld terminal, as described in FIG. 25, the handheld terminal may include a third processing component 250, as well as a transmitting assembly 2502 and a third memory 2503 which are connected to the third processing component 2501, respectively;
the third memory 2503 stores one or more sets of program instructions;
the third processing component 2501 is configured to call one or more sets of program instructions of the third memory 2503 to perform the following operations:
triggering the transmitting component 2502 to transmit a wireless signal;
processing an article in an article shelf to obtain article processed information, and transmitting the article processed information to the server-side; wherein the article processed information is configured to determine the article processed by the handheld terminal; the wireless signal is transmitted to the server-side through a monitoring terminal, and configured to position as a position of the article a processed position of a processed position of the handheld terminal; the position of the article is configured to generate a navigation map.

Of course, the server-side may certainly also include other components, such as an input/output interface, and the like.

In some embodiments, the transmitting component may be specifically a UWB chip. Using the UWB chip to transmit wireless signals and using a UWB signal to position the position of the handheld terminal may further improve positioning accuracy, reduce errors, have fast calculation speed and high real-time, which may further improve the efficiency of map generation.

In a practical application, the handheld terminal may be a portable handheld apparatus, such as the handheld terminal of a mobile phone or a scanning gun.

Figure 26:
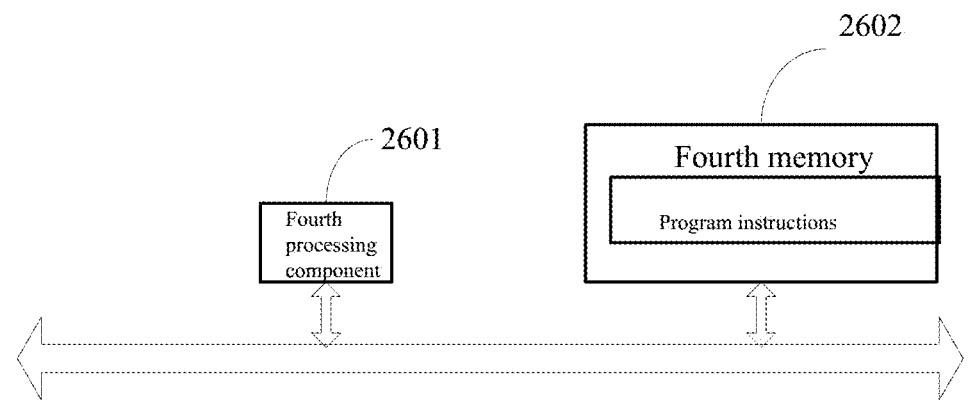
FIG. 26 is a schematic structural diagram of another embodiment of a server-side according to an embodiment of the present application.

In yet another possible design, as shown in FIG. 26, the embodiment of the present application also provides another embodiment of a server-side, the server-side includes a fourth processing component 2601 and a fourth memory 2602 connected to the fourth processing component 2601;
the fourth memory 2602 stores one or more sets of program instructions;
the fourth processing component 2602 is configured to call one or more sets of the program instructions of the fourth memory 2603 to perform the following operations:
receiving the wireless signal and the article processed information which are sent by a handheld terminal; the article processed information is obtained by processing an article in an article shelf; the wireless signal is transmitted by a monitoring terminal;
determining the article processed by the handheld terminal according to the article processed information;
positioning as a position of the article a processed position of the handheld terminal, according to the wireless signal received when the handheld terminal processes the article, and according to the position of a corresponding monitoring terminal, and generating a navigation map according to the position of the article.

Of course, the server-side may certainly also include other components, such as an input/output interface, a communication component, and the like.

Figure 27:
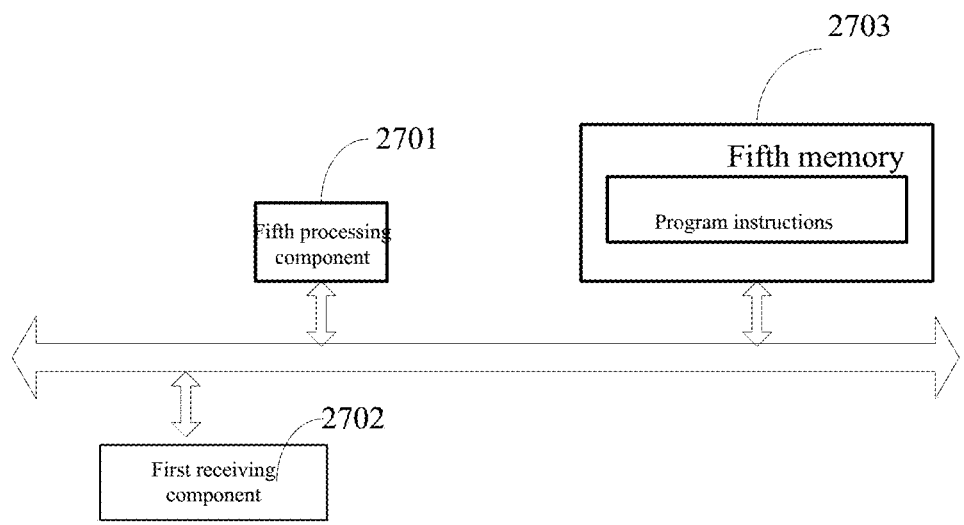
FIG. 27 is a schematic structural diagram of another embodiment of a handheld terminal according to an embodiment of the present application.

The embodiment of the present application also provides a handheld terminal, as described in FIG. 27, the handheld terminal may include a fifth processing component 2701, as well as a first receiving assembly 2702 and a fifth memory 2703 which are connected to the fifth processing component 2701, respectively;
the fifth memory 2703 stores one or more sets of program instructions;
the fifth processing component 2701 is configured to call one or more sets of the program instructions of the fifth memory 2703 to perform the following operations:
triggering the first receiving component 2702 to receive a wireless signal transmitted by a monitoring terminal;
processing an article in an article shelf to obtain article processed information and sending the article processed information to the server-side;
positioning as a position of the article a processed position of the handheld terminal, according to the wireless signal received when the handheld terminal processes the article, and according to a position of the corresponding monitoring terminal, and generate a navigation map according to the position of the article.

Figure 28:
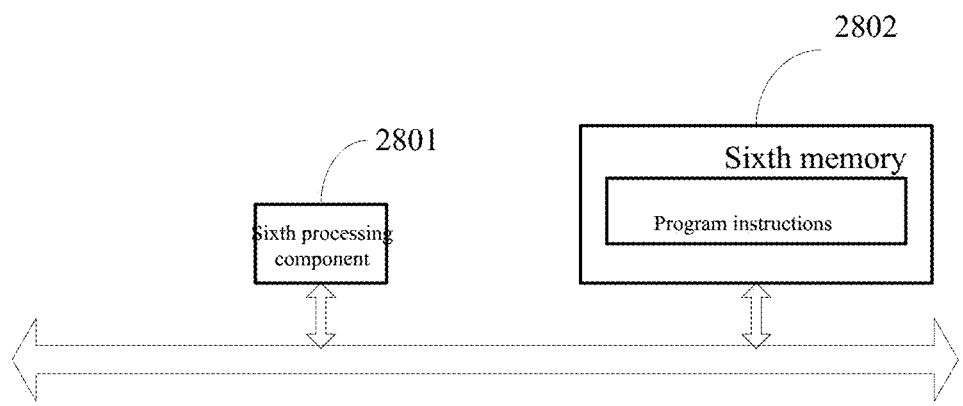
FIG. 28 is a schematic structural diagram of another embodiment of a server-side according to an embodiment of the present application.

In yet another possible design, as shown in FIG. 28, the embodiment of the present application also provides another embodiment of a server-side, the server-side includes a sixth processing component 2801 and a sixth memory 2802 connected to the second processing component 2801;
the sixth memory 2802 stores one or more sets of program instructions;
the sixth processing component 2802 is configured to call one or more sets of the program instructions of the sixth memory 2803 to perform the following operations:
receiving a position of an article sent by a handheld terminal and sending article processed information to the server-side;
determining the article processed by the handheld terminal according to the article processed information; and generating a navigation map according to the position of the article.

Wherein the article processed information is obtained by processing an article in an article shelf, a position of the article is a processed position of the handheld terminal, which is positioned according to a wireless signal received at the time of processing the article and according to a position of a corresponding monitoring terminal.

Of course, the server-side may certainly also include other components, such as an input/output interface, a communication component, and the like.

Figure 29:
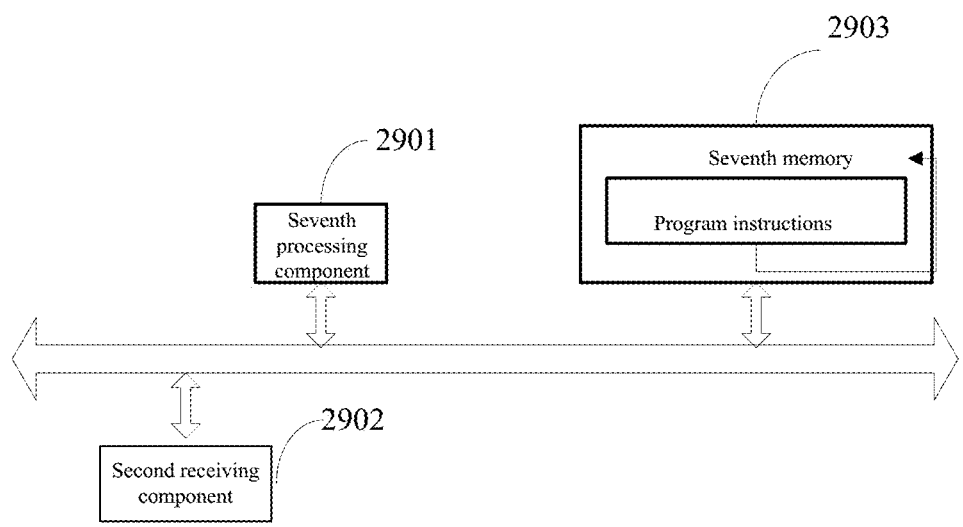
FIG. 29 is a schematic structural diagram of another embodiment of a handheld terminal according to an embodiment of the present application.

The embodiment of the present application also provides a handheld terminal, as described in FIG. 29, the handheld terminal may include a seventh processing component 2901, as well as a second receiving assembly 2902 and a seventh memory 2903 which are connected to the seventh processing component 2903, respectively;

the seventh memory 2903 stores one or more sets of program instructions;

the seventh processing component 2901 is configured to call one or more sets of the program instructions of the seventh memory 2903 to perform the following operations:

triggering the second receiving component 2902 to receive a wireless signal transmitted by a monitoring terminal;

processing an article in an article shelf to obtain article processed information;

positioning as a position of the article a processed position of the handheld terminal according to a wireless signal received at the time of processing the article and according to a position of a corresponding monitoring terminal, sending to the server-side the position of the article and the article processed information; whereby the server-side may determine the article processed by the handheld terminal according to the article processed information, and generate a navigation map according to the position of the article.

In a typical configuration, each of the above processing components may include one or more processors to execute instructions. Of course, the processing components may be implemented by one or more Application Specific Integrated Circuits (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components, and configured to implement the methods described above.

The memory may be realized in form of any kind of volatile storage device and non-volatile storage device or the combination thereof, for example, Static Random Access Memory (SRAM), Electrically-Erasable Programmable Read Only Memory (EEPROM), Erasable Programmable Read Only Memory (EPROM), Programmable Read Only Memory (PROM), Read Only Memory (ROM), a magnetic memory, a flash memory, a magnetic disk or an optical disk.

For example, certain terms in the specification and claims are configured to refer to specific components. It will be understood by those skilled in the art that a hardware manufacturer may use different terms to refer to the same component. The present specification and claims do not serve as a means of distinguishing components by differences of names, but rather take as a distinguishing criterion functional difference in the components. As used in the specification and claims, the term "include" is an opening term and should be construed as "including but not limited to". "approximately" means that within an acceptable range of errors, those skilled in the art are able to solve the technical problem and substantially achieve the technical effect within a certain range of errors. In addition, the term "coupled" here contains any direct and indirect electrical coupling means. Thus, if a first apparatus described herein is coupled to a second apparatus, it means that the first apparatus may be electrically coupled directly to the second apparatus or indirectly by other means or coupling means to the second apparatus. The subsequent description of the description is the preferred embodiments of the present application, and is taken as the purpose of illustrating a general principle of the present application and is not intended to limit the scope of the present application. The protection scope of the present application is subject to those defined in the appended claims.

It is also to be understood that the term "include", "consist of" or any other variant thereof is intended to encompass a non-exclusive inclusion such that a commodity or system including a series of elements includes not only those elements but also other elements that are not explicitly listed, or also includes elements inherent in this commodity or system. In the absence of more restrictions, the elements defined by the statement "including a . . . " do not preclude the presence of additional identical elements in the commodity or system that includes the elements.

The foregoing description shows and describes a plurality of preferred embodiments of the present application, but as noted above, it is to be understood that the present application is not limited to the forms disclosed herein and should not be construed as an exclusion of other embodiments, other combinations, modifications, and the environments may be modified within the construed scope of the application herein, by above teachings or techniques or knowledge of the related art. The changes and modifications may be made by those skilled in the art without departing from the spirit and scope of the present application, and intended to be within the scope of the appended claims.

What is claimed is:

1. A map generation system, comprising, a server-side, a handheld terminal and a wireless apparatus; wherein the wireless apparatus is arranged in each article shelf, each wireless apparatus corresponds to one article; the handheld terminal is configured to scan each article in the article shelf and send scanning information to the server-side; the server-side is configured to take as a position of the article a position of the wireless apparatus corresponding to a scanned article according to the scanning information, and generate a navigation map according to the position of each article; wherein the wireless apparatus comprises a first class apparatus and a second class apparatus, a position of the first class apparatus is known; and wherein the system further comprises a first control apparatus; the first class apparatus and the second class apparatus are configured to upload the received wireless signal to the first control apparatus, respectively; the first control apparatus is configured to upload to the server-side the wireless signals received by the first class apparatus and the second class apparatus respectively; the server-side specifically takes as the known apparatus the first class apparatus and the second class apparatus of which the position has been determined; determines the wireless signal received by the known apparatus and sent by the second class apparatus of any which the position is not determined, from the wireless signal uploaded by the first control apparatus and received by the first class apparatus and the second class apparatus respectively; and positions the position of the second class apparatus of any which the position is not determined, according to the position of the known apparatus and according to the wireless signal received by the known apparatus and sent by the second class apparatus of any which the position is not determined.

2. The system according to claim 1, wherein each wireless apparatus corresponds to one article and one label; the label is configured to display article-related information of the corresponding article thereof;

the handheld terminal is further configured to scan the label corresponding to the article while scanning each article in the article shelf;

the server-side takes as the position of the article the position of the wireless apparatus corresponding to the scanned article according to the scanning information, which is specific as follows:

searching the corresponding relation between different labels and different wireless apparatuses according to the scanning information, and taking as the position of the article the position of the wireless apparatus corresponding to the label of the scanned article.

3. The system according to claim 2, wherein the label is an electronic label, each wireless apparatus is integrated in the corresponding electronic label thereof;

the corresponding relation between the wireless apparatus and the electronic label is uploaded to the server-side after each wireless apparatus is configured to be connected to the server-side;

the server-side stores the corresponding relation between each wireless apparatus and the electronic label.

4. The system according to claim 1, wherein an apparatus information code is provided in each wireless apparatus;

the handheld terminal is further configured to scan the wireless apparatus corresponding to the article while scanning each article in the article shelf; the scanning information comprises the apparatus information code;

the server-side takes as the position of the article the position of the wireless apparatus corresponding to the scanned article according to the scanning information, which is specific as follows:

the server-side takes as the position of the scanned article the position of the wireless apparatus corresponding to the apparatus information code according to the apparatus information code in the scanning information.

5. The system according to claim 1, wherein the handheld terminal is also configured to position a position of the handheld terminal obtained when the handheld terminal does not scan, according to a wireless signal of the wireless apparatus received when the scanning is not performed and according to the position of the wireless apparatus, and take as a position of an article shelf passage the position of the handheld terminal, and upload the position of the article shelf passage to the server-side;

the server-side is specifically configured to determine the position of each article shelf according to the position of each wireless apparatus, and generate the navigation map according to the position of each article shelf, the position of each article and the position of each article shelf passage.

6. The system according to claim 1, wherein the handheld terminal is further configured to upload to the server-side the wireless signal of the wireless apparatus received when the scanning is not performed;

the server-side is specifically configured to position a position of the handheld terminal obtained when the handheld terminal does not scan, according to the wireless signal of the wireless apparatus received when the handheld terminal does not scan and according to the position of the wireless apparatus, and take as the position of the article shelf passage the position of the handheld terminal; determine the position of each article shelf according to the position of each wireless apparatus; and generate the navigation map according to the position of each article shelf, the position of each article and the position of each article shelf passage.

7. The system according to claim 1, wherein a plurality of the first class apparatuses is provided, the plurality of the first class apparatuses are arranged in an indoor preset area and are not positioned at the same straight line and the same plane;

the second class apparatus is specifically arranged in each article shelf;

the server-side takes as the position of the article the position of the second class apparatus corresponding to the scanned article specifically according to the scanning information.

8. A map generation system, comprising a server-side, a handheld terminal and a wireless apparatus; wherein the wireless apparatus is arranged in each article shelf; the handheld terminal is configured to scan each article in the article shelf, position the scanning position when the handheld terminal scans each time, according to a wireless signal of the wireless apparatus received at each time of scanning and according to a position of the wireless apparatus, take as a position of the article scanned by the handheld terminal the scanning position when the handheld terminal scans each time, and upload to the server-side the position of the article; the server-side is configured to generate a navigation map according to the position of each article; wherein the wireless apparatus comprises a first class apparatus and a second class apparatus, a position of the first class apparatus is known; the server-side is further configured to take as a known apparatus the first class apparatus and the second class apparatus of which the position has been determined, and position a position of the second class apparatus of any which the position is not determined, according to a position of the known apparatus and according to the wireless signal received by the known apparatus and sent by the second class apparatus of any which the position is not determined; the handheld terminal specifically positions as the position of the article scanned by the handheld terminal the scanning position when the handheld terminal scans each time, according to the wireless signal of the first class apparatus and the second class apparatus received at each time of the scanning and according to the position of the first class apparatus and/or the second class apparatus obtained from the server-side, and uploads to the server-side the position of the article.

9. The system according to claim 8, wherein each article in each article shelf corresponds to one wireless apparatus;

the handheld terminal positions the scanning position when the handheld terminal scans each time, according to the wireless signal of the wireless apparatus received at each time of the scanning, and according to the position of the wireless apparatus, which is specific as follows:

the handheld terminal determines the wireless apparatus closest to the handheld terminal according to the wireless signal of the wireless apparatus received at each time of scanning, and positions the position closest to the wireless apparatus as the scanning position when the handheld terminal scans.

10. The system according to claim 8, wherein the handheld terminal is also configured to position as a position of an article shelf passage a position of the handheld terminal obtained when the handheld terminal does not scan, according to the wireless signal of the wireless apparatus received when the scanning is not performed and according to the position of the wireless apparatus, and upload the position of the article shelf passage to the server-side;

the server-side is specifically configured to determine the position of each article shelf according to the position of each wireless apparatus, and generate the navigation map according to the position of each article shelf, the position of each article and the position of each article shelf passage.

11. The system according to claim 8, wherein the system further comprises a first control apparatus;

the first class apparatus and the second class apparatus are configured to upload the received wireless signal to the first control apparatus, respectively;

the first control apparatus is configured to upload to the server-side the wireless signals received by the first class apparatus and the second class apparatus respectively;

the server-side specifically takes as a known apparatus the first class apparatus and/or the second class apparatus of which the position has been determined, determines the wireless signal received by the known apparatus and sent by the second class apparatus of any which the position is not determined, from the wireless signal uploaded by the first control apparatus and received by the first class apparatus and the second class apparatus respectively, and positions the position of the second class apparatus of any which the position is not determined, according to the position of the known apparatus and according to the wireless signal received by the known apparatus and sent by the second class apparatus of any which the position is not determined.

12. The system according to claim 8, wherein the system further comprises a second control apparatus arranged on an indoor ceiling according to a preset arrangement;

the second control apparatus is configured to upload to the server-side the wireless signal received by the second control apparatus and sent by the wireless apparatus;

the server-side is further configured to position the position of the wireless apparatus according to the wireless signal received by the second control apparatus and sent by the wireless apparatus and according to the position of the second control apparatus;

the handheld terminal specifically positions as the position of the article scanned by the handheld terminal the scanning position when the handheld terminal scans each time, according to the wireless signal of the wireless apparatus received at each time of the scanning and according to the position of the wireless apparatus obtained from the server-side, and uploads to the server-side the position of the article.

13. A map generation system, comprising a server-side, a handheld terminal and a monitoring terminal; the monitoring terminal is arranged in an indoor place with a known position;

the handheld terminal is configured to transmit a wireless signal, process an article in an article shelf to obtain article processed information, and send to the server-side the article processed information;

the monitoring terminal is configured to receive the wireless signal and send to the server-side the wireless signal;

the server-side is configured to determine the article processed by the handheld terminal according to the article processed information, position a processed position of the handheld terminal according to the wireless signal transmitted when the handheld terminal processes the article and according to a position of the corresponding monitoring terminal; take as a position of the article the processed position; and generate a navigation map according to the position of the article;

wherein the server-side is further configured to position an unprocessed position of the handheld terminal, according to the wireless signal transmitted when the handheld terminal does not process the article, and according to the position of the corresponding monitoring terminal; take as a position of an article shelf passage the unprocessed position;

the server-side generates a navigation map according to the position of the article, which is specific as follows:

generating a category distribution sub-map according to the position of the article and the category of the article;

drawing the article shelf according to the position of the article, and drawing the article shelf passage according to a position of the article shelf passage, to generate an article-shelf distribution sub-map corresponding to each article category, for each article category in the category distribution sub-map;

generating an article distribution sub-map corresponding to each article shelf, according to the position of the article, for each article shelf in the article-shelf distribution sub-map; and establishing an associated relation among the category sub-map, the article-shelf distribution sub-map, and the article distribution sub-map to generate the navigation map.

14. The system according to claim 13, wherein the handheld terminal processes the article in the article shelf to obtain the article processed information, which is specific as follows:

the article in the article shelf article is scanned to obtain the article processed information, the article processed information is scanning information obtained by scanning.

15. The system according to claim 13, wherein the server-side generates the navigation map according to the position of the article and the position of the article shelf passage, which is specific as follows:

determining a navigation map boundaries, and generating a navigation map within the navigation map boundaries according to the position of the article and the position of the article shelf passage.

* * * * *